[19] United States Patent
Hodjat et al.

[11] Patent Number: 6,144,989
[45] Date of Patent: Nov. 7, 2000

[54] ADAPTIVE AGENT-ORIENTED SOFTWARE ARCHITECTURE

[75] Inventors: Babak Hodjat, Mountain View; Christopher J. Savoie, Cupertino, both of Calif.; Makoto Amamiya, Fukuoka, Japan

[73] Assignee: Dejima, Inc., San Jose, Calif.

[21] Appl. No.: 09/183,764

[22] Filed: Oct. 30, 1998

Related U.S. Application Data

[60] Provisional application No. 60/089,394, Jun. 15, 1998.

[51] Int. Cl.[7] ........................................ G06F 13/00
[52] U.S. Cl. ............................. 709/202; 706/10
[58] Field of Search ................ 709/202; 706/10

[56] References Cited

U.S. PATENT DOCUMENTS

| 5,734,897 | 3/1998 | Banks ........................................ 707/202 |
| 5,890,146 | 3/1999 | Wavish et al. ............................. 706/46 |

*Primary Examiner*—Kenneth R. Coulter
*Attorney, Agent, or Firm*—Fliesler Dubb Meyer & Lovejoy LLP

[57] ABSTRACT

Method and agent network architecture for processing a subject message, where each agent has a view of its own domain of responsibility. An initiator agent which receives a user-input request and does not itself have a relevant interpretation policy, queries its downchain agents whether the queried agent considers such message to be in its domain of responsibility. Each queried agent recursively determines whether it has an interpretation policy of its own that applies to the request, and if not, further queries its own further downchain neighboring agents. The further agents eventually respond to such further queries, thereby allowing the first-queried agents to respond to the initiator agent. The recursive invocation of this procedure ultimately determines one or more paths through the network from the initiator agent to one more more leaf agents. The request is then transmitted down the path(s), with each agent along the way taking any local action thereon and passing the message on to the next agent in the path. In the event of a contradiction, the network is often able to resolve many of such contradictions according to predetermined algorithms. If it cannot resolve a contradiction automatically, it learns new interpretation policies necessary to interpret the subject message properly. Such learning preferably includes interaction with the user (but only to the extent necessary), and preferably localizes the learning close to the correct leaf agent in the network.

31 Claims, 20 Drawing Sheets

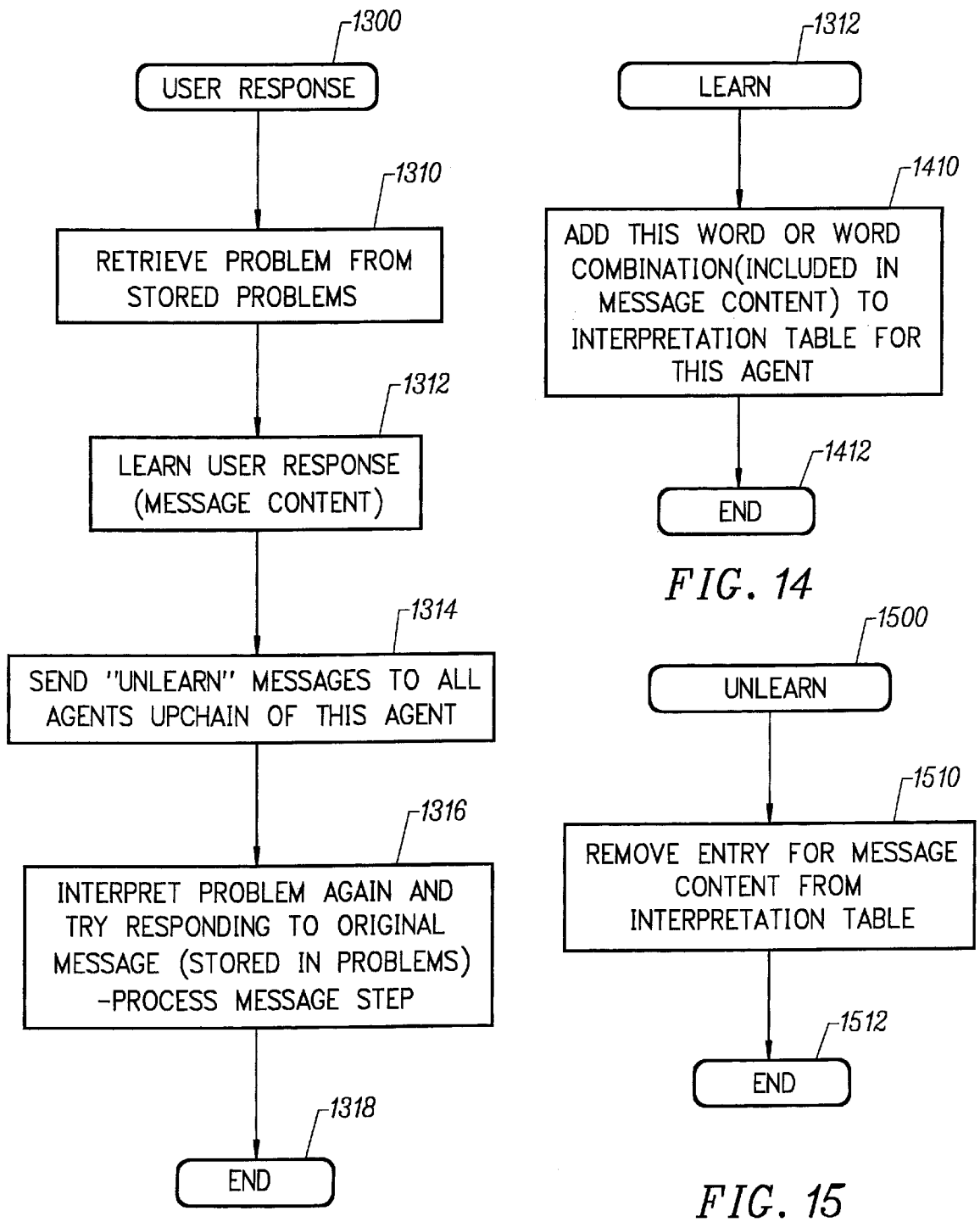

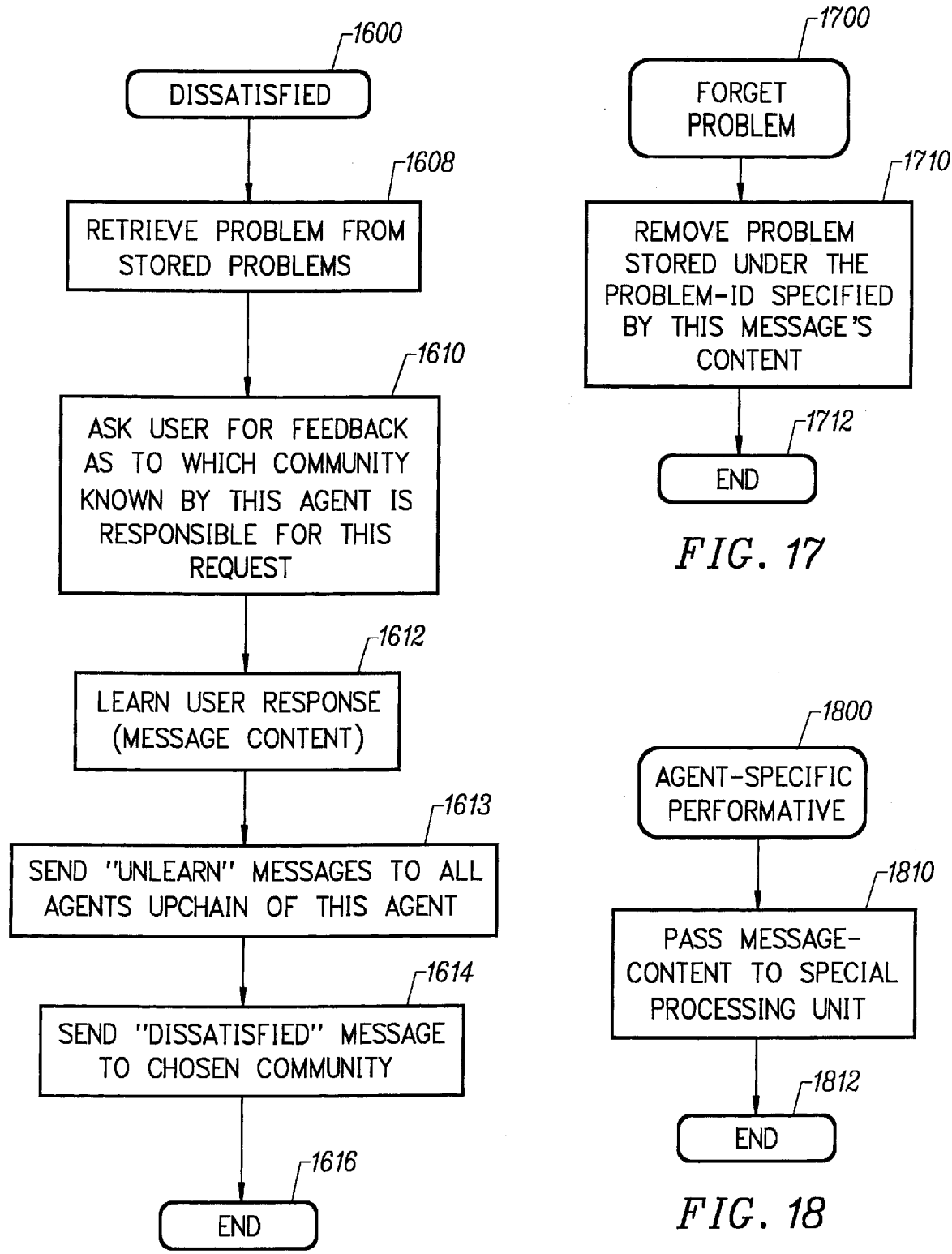

ADAPTIVE AGENT-ORIENTED SOFTWARE ARCHITECTURE

CLAIM OF PRIORITY

This application claims the benefit of U.S. Provisional Application No. 60/089,394, filed Jun. 15, 1998 (Attorney Docket No. DEJI-1000sup0WSW), which is incorporated herein by reference.

COPYRIGHT DISCLAIMER

A portion of the disclosure of this patent document contains material which is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever.

BACKGROUND

1. Field of the Invention

The invention relates to user-machine interfaces, and more particularly, to software methods and techniques for implementing an agent-oriented architecture which is useful for user-machine interfaces.

2. References

The following documents are all incorporated by reference herein.

T. Kuhme, Adaptive Action Prompting—A complementary aid to support task-oriented interaction in explorative user interfaces. Report #GIT-GVU-93-19, Georgia Institute of Technology, Dept. of Computer Science, Graphics, Visualization, and Usability Center, 1993.

L. Balint, Adaptive Dynamic Menu System. Poster Abstracts HCI International '89, Boston, Sep. 18–22, 1989.

A. Cypher. Eager: Programming Repetitive Tasks By Example. Proc. CHI '91, pp. 33–39, 1991.

R. Beale, A. Wood, Agent-based interaction, Proceedings of HCI '94 Glasgow, 1995, pp. 239–245.

A. Wood, "Desktop Agents", School of Computer Science, University of Birmingham, B.Sc. Dissertation, 1991.

Clarke, Smyth, "A Cooperative Computer Based on the Principles of Human Cooperation", International Journal of Man-Machine Studies 38, pp.3–22, 1993.

N. Eisenger, N. Elshiewy, MADMAN—Multi-Agent Diary Manager, ESRC-92-7i (Economic & Social Resource Council) Internal Report, 1992.

T. Oren, G. Salomon, K. Kreitman, A. Don, "Guides: Characterizing the Interface", in The Art of Human-Computer Interface Design, Brenda Laurel (ed.), 1990 (pp.367–381).

F. Menczer, R. K. Belew, Adaptive Information Agents in Distributed Textual Environments, Proceedings of the Second International Conference on Autonomous Agents (Agents '98), Minneapolis, Minn., May 1998.

P. Brazdil, M. Gams, S. Sian, L. Torgo, W. van de Velde, Learning in Distributed Systems and Multi-Agent Environments, http://www.ncc.up.pt/~1torgo/Papers/LDSME/LDSME-Contents.html (visited 1998).

B. Hodjat, M. Amamiya, The Self-organizing symbiotic agent, http://www__al.is.kyushu-u.ac.jp/~bobby/1stpaper.htm, 1998.

P. R. Cohen, A. Cheyer, M. Wang, S. C. Baeg, OAA: An Open Agent Architecture, AAAI Spring Symposium, 1994, http://www.ai.sri.com/~cheyer/papers/aaai/adam-agent.html (visited 1998).

S. Franklin, A. Graesser, Is it an Agent or just a Program? A Taxonomy for Autonomous Agents, in: Proceedings of the Third International Workshop on Agents Theories, Architectures, and Languages, Springer-Verlag, 1996, http://www.msci.memphis.edu/~Frankin/AgentProg.html (visited 1998).

B. Hayes-Roth, K. Pfleger, P. Lalanda, P. Morignot, M. Balabanovic, A domain-specific Software Architecture for adaptive intelligent systems, IEEE Transactions on Software Engineering, April 1995, pp.288–301.

Y. Shoham, Agent-oriented Programming, Artificial Intelligence, Vol. 60, No. 1, pages 51–92, 1993.

M. R. Genesereth, S. P. Ketchpel, Software Agents, Communications of the ACM, Vol. 37, No. 7, July 1994, pp. 48–53, 147.

A. Cheyer, L. Julia, Multimodal Maps: An Agent-based Approach, http://www.ai.sri.com/~cheyer/papers/mmap/mmap.html, 1996.

T. Khedro, M. Genesereth, The federation architecture for interoperable agent-based concurrent engineering systems. In International Journal on Concurrent Engineering, Research and Applications, Vol. 2, pages 125–131, 1994.

P. Brazdil and S. Muggleton: "Learning to Relate Terms in Multiple Agent Environment", Proceedings of Machine Learning—EWSL—91, pp. 424–439, Springer-Verlag, 1991.

S. Cranefield, M. Purvis, An agent-based architecture for software tool coordination, in Proceedings of the Workshop on Theoretical and Practical Foundations of Intelligent Agents, Springer, 1996.

T. Finin, J. Weber, G. Wiederhold, M. Genesereth, R. Fritzson, D. McKay, J. McGuire, S. Shapiro, C. Beck, Specification of the KQML Agent-Communication Language, 1993 (hereinafter "KQML 1993"), http://www.cs.umbc.edu/kqml/kqmlspec/spec.html (visited 1998).

Yannis Labrou and Tim Finin, A Proposal for a new KQML Specification, TR CS-97-03, February 1997, Computer Science and Electrical Engineering Department, University of Maryland Baltimore County, http:rewww.cs.umbc.edu/~jklabrou/publications/tr9703 .pdf R. R. Korfhage, Information Storage and Retrieval, John Wiley & Sons, June 1997.

M. Mitchell. An Introduction to Genetic Algorithms. MIT Press, 1996.

D. C. Smith, A. Cypher, J. Spohrer, KidSim: Programming Agents without a programming language, Communications of the ACM, Vol. 37, No. 7, pages 55–67, 1994.

3. Description of Related Art

Most human-machine interfaces in use today are relatively complicated and difficult to use. Frequently this is a consequence of the growing number of features to which the interface is expected to provide easy access.

Users usually have the following problems with current interfaces:

Prior to selecting an action, users have to consider whether the machine provides an appropriate action at all. It would therefore be desirable if the interface could provide feedback to the user.

It is difficult to access the actions users already know about. It would therefore be desirable if the user could freely express his or her needs without being bound to a limited set of conventions preset by the interface.

Users have to imagine what would be an appropriate action to proceed with in order to perform a certain task of the machine domain. It would therefore be desirable if the interface could guide users through the many options they may have at any stage of the interaction.

User interfaces that adapt their characteristics to those of the user are referred to as adaptive interfaces. These interactive software systems improve their ability to interact with a user based on partial experience with that user. The user's decisions offer a ready source of training data to support learning. Every time the interface suggests some choice, the human either accepts that recommendation or rejects it, whether this feedback is explicit or simply reflected in the user's behavior.

The following general features may be desirable in a user interface:

Natural Expression: The user should be able to express his or her intentions as freely and naturally as possible.

Optimum Interaction: Interaction should be limited to the situations in which the user is in doubt as to what she/he can do next or how she/he can do it, or the system is in doubt as to what the user intends to do next. Note here that lack of interaction or feedback from the system is not necessarily desirable. Interaction is considered optimum if it occurs where it is required, no more often and no less often.

Adaptability: Adaptability could be about the changing context of interaction or application, but more importantly, the system should be able to adapt to the user's way of expressing her/his intentions. Two main issues that are taken into account in this regard are generalization and contradiction recovery.

Generalization: An adaptable system in its simplest form will learn only the instance that it has been taught (implicitly or explicitly). Generalization occurs when the system uses what it has learned to resolve problems it deems similar. The success and degree of generalization, therefore, depend on the precision of the similarity function and the threshold the system uses to distinguish between similar and dissimilar situations.

Contradiction: A system that generalizes may well overgeneralize. The moment the system's reaction based on a generalization is in a manner the user does not anticipate, the system has run into a contradiction. The resolution of this contradiction is an integral part of the learning and adaptability process.

Ease of change and upgrade: The system designer should easily be able to upgrade or change the system with minimum compromise to the adaptation the system has made to users. Change should preferably be possible even at run-time (i.e., on the fly).

Various attempts have been made to reduce the navigation effort in menu hierarchies:

Random access to menu items (e.g., key shortcuts).

Pointer setting strategies for pop-up menus provide for a faster access to a certain menu item, often the most recently or most frequently used.

Offering user assistance in selecting valid and appropriate items (e.g., grey-shading of disabled menu-items).

Action prompting according to previously selected objects (object-specific menus or dynamically exchanged control panels).

Reorganization of menus according to user-specific usage patterns.

Automating iterative patterns in interaction (for example, the Eager system, which is a Programming-By-Example system that anticipates which action the user is going to perform next).

Most human-computer interfaces today are programmed in standard sequential or object-oriented software. Another software paradigm exists, however, which has not heretofore been used effectively for human-machine interfaces. Under this paradigm, which is known generally as an agent-based software architecture, a given task is divided up into several sub-tasks and assigned to different "agents" in the system. "Agents" are communicating concurrent modules, each of which handles a part of the decision-making process. If the agents are capable of learning, they are referred to as adaptive agents.

Some examples of situations in which agent-based interaction have been used are as follows:

Agents can be used to allow the customized presentation of information. These agents preprocess the data and display it in a way that can be unique for each individual user.

Agents can act as tutors or guides, supplementing user's knowledge with their own. These assist the current task by providing alternative views and additional relevant information.

Agents can be used for the adaptive search and retrieval of information.

One predominant approach to the use of Agents in user interaction has been to concentrate a large bulk of the interaction responsibilities in a single agent, thus reverting to a centralized architecture. Nevertheless many real world problems are best modeled using a set of cooperating intelligent systems. Our society, for example, consists of many interacting entities. If we are interested in modeling some aspects of our society, it would be desirable to structure our model in the same way. As another example, since data often originates at different physical locations, centralized solutions are often inapplicable or inconvenient. In addition, using a number of small simple adaptive agents instead of one large complicated one may simplify the process of solving a complicated problem. In other words, agents collectively exhibit emergent behavior, where the behavior of the agent population as a whole is greater than the sum of its parts.

SUMMARY OF THE INVENTION

The invention, roughly described, involves a computer-implemented method for processing a subject message, by a network of agents each of which has a view of its own domain of responsibility. An initiator agent which receives a user-input request and does not itself have a relevant interpretation policy, queries its downchain agents whether the queried agent considers such message, or part of such message, to be in its domain of responsibility. Each queried agent recursively determines whether it has an interpretation policy of its own that applies to the request, and if not, further queries its own further downchain neighboring agents. The further agents eventually respond to such further queries, thereby allowing the first-queried agents to respond to the initiator agent. The recursive invocation of this procedure ultimately determines a path, or a set of paths, through the network from the initiator agent to one or more leaf agents. The request is then transmitted down each given path, with each agent along the way taking any local action thereon and passing the message on to the next agent in the path. In the event of a contradiction, the network is often able to resolve many of such contradictions according to predetermined automatic algorithms. If it cannot resolve a contradiction automatically, it learns new interpretation policies necessary to interpret the subject message properly.

Such learning preferably includes interaction with the user (but only to the extent necessary), and preferably localizes the learning as close to the correct leaf agent in the network as possible. Preferably, though, the learning takes place prior to the leaf agent itself

BRIEF DESCRIPTION OF THE DRAWINGS

FIG. 13 is a flowchart of the method performed by an agent of the main object class in response to receipt of a USER-RESPONSE performative.

FIG. 14 is a flowchart detail of a learning step in FIG. 13.

FIG. 15 is a flowchart of the method performed by an agent of the main object class in response to receipt of an UNLEARN performative.

FIG. 16 is a flowchart of the method performed by an agent of the main object class in response to receipt of a DISSATISFIED performative.

FIG. 17 is a flowchart of the method performed by an agent of the main object class in response to receipt of a FORGET-PROBLEM performative.

FIG. 18 is a flowchart of the method performed by an agent of the main object class in response to receipt of an AGENT-SPECIFIC performative.

DETAILED DESCRIPTION

Figure 1:
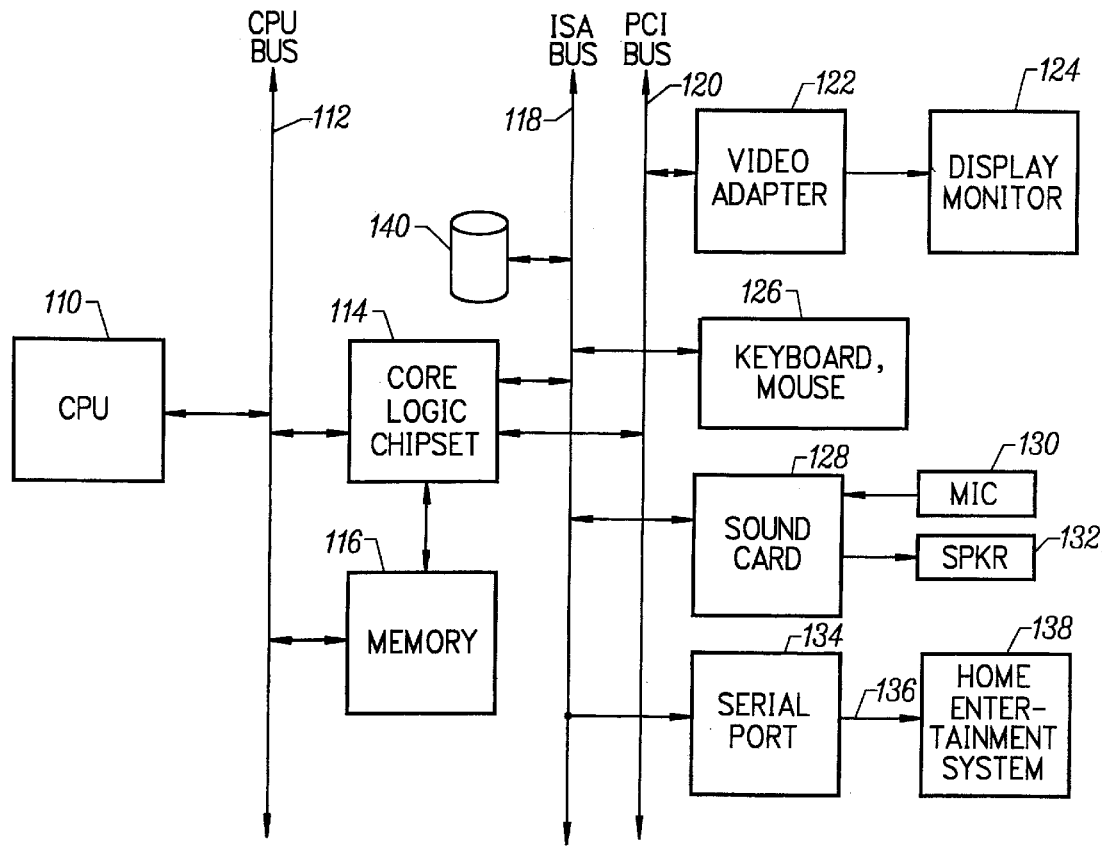
FIG. 1 is a simplified symbolic block diagram of a computer system on which software implementing the present invention can be operated.

The methods and techniques of the present invention can be implemented in software on almost any type of computer system, microcomputer or embedded processor. As an illustration, FIG. 1 is a simplified symbolic block diagram of one type of computer system on which software implementing the present invention can be operated. The system of FIG. 1 includes a CPU 110, which may be, for example, a Pentium® microprocessor available from Intel Corporation, Santa Clara, Calif. The CPU 110 is connected to a CPU bus 112, which is connected further to a core logic chip set 114 and a memory array 116. The core logic chip set 114 also connects to the memory array 116. The core logic chip set 114 is further connected both to an ISA bus 118 and a PCI bus 120. A standard video adapter 122 is connected to the PCI bus 120, and further drives a display monitor 124. A keyboard and a mouse 126 are connected via well-known means to the ISA bus 118. The ISA bus 118 is also connected to a standard sound card 128, which is connected further to a microphone 130 and a speaker 132 used for user voice interaction. The system of FIG. 1 further has a serial port 134 which is connected to the ISA bus 118, and which has an output 136 connected to a serial control input of a machine 138, which may, for example, be a home entertainment system. The system of FIG. 1 further includes a hard disk drive 140 which is connected to the ISA bus 118 as well. As it pertains to the present invention, the purpose of the system of FIG. 1 is to control the home entertainment system 138 in response to user interaction occurring via the display monitor 124, the keyboard and mouse 126, the microphone 130 and the speaker 132.

In operation, when the user interface is activated, software stored on the hard disk 140 is brought into memory 116, either entirely or as needed to perform the functions of the system.

Figure 2:
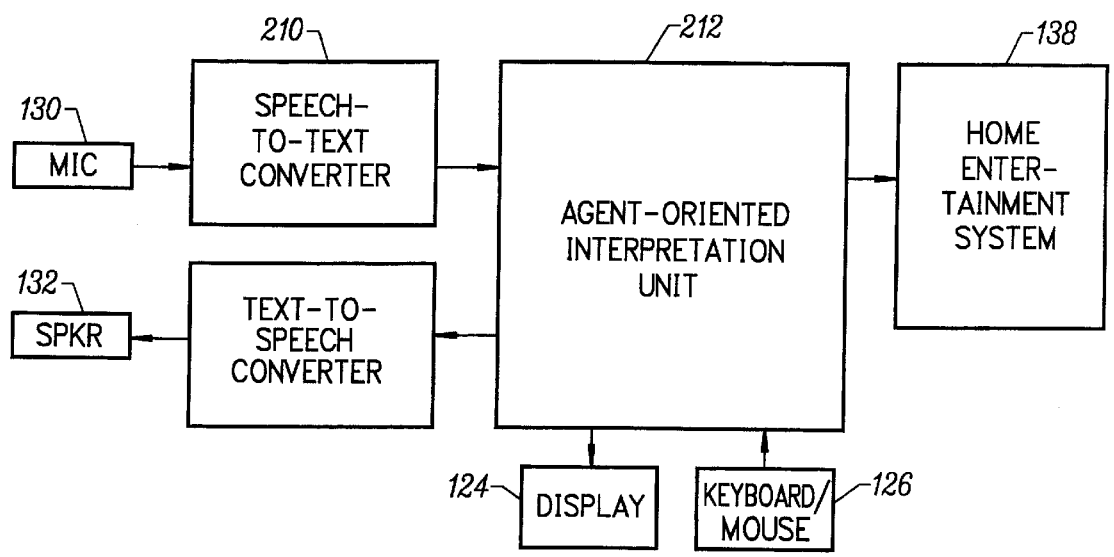
FIG. 2 is an overall block diagram of the software architecture used in the system of FIG. 1.

FIG. 2 is an overall block diagram of the software architecture used in the system of FIG. 1. It comprises a speech-to-text converter 210 which receives input from the microphone 130, and provides textual output to an agent-oriented interpretation unit 212. The speech-to-text converter 210 can be a conventional software product, such as "Naturally Speaking" by Dragon Systems, Newton, Mass. It communicates with the agent-oriented interpretation unit 212 via standard Windows95® and Windows NT® messaging services. The agent-oriented interpretation unit 212 further has an output connected to the speaker 132, via a standard text-to-speech converter 213. The speaker 132 is used for providing feedback to the user. Agent-oriented interpretation unit 212 further has an output which drives the control input of the home entertainment system 138. It further communicates with the display 124 and keyboard/mouse 126 as an alternative or backup means for communicating with the user.

Individual Agent Functions

Figure 3:
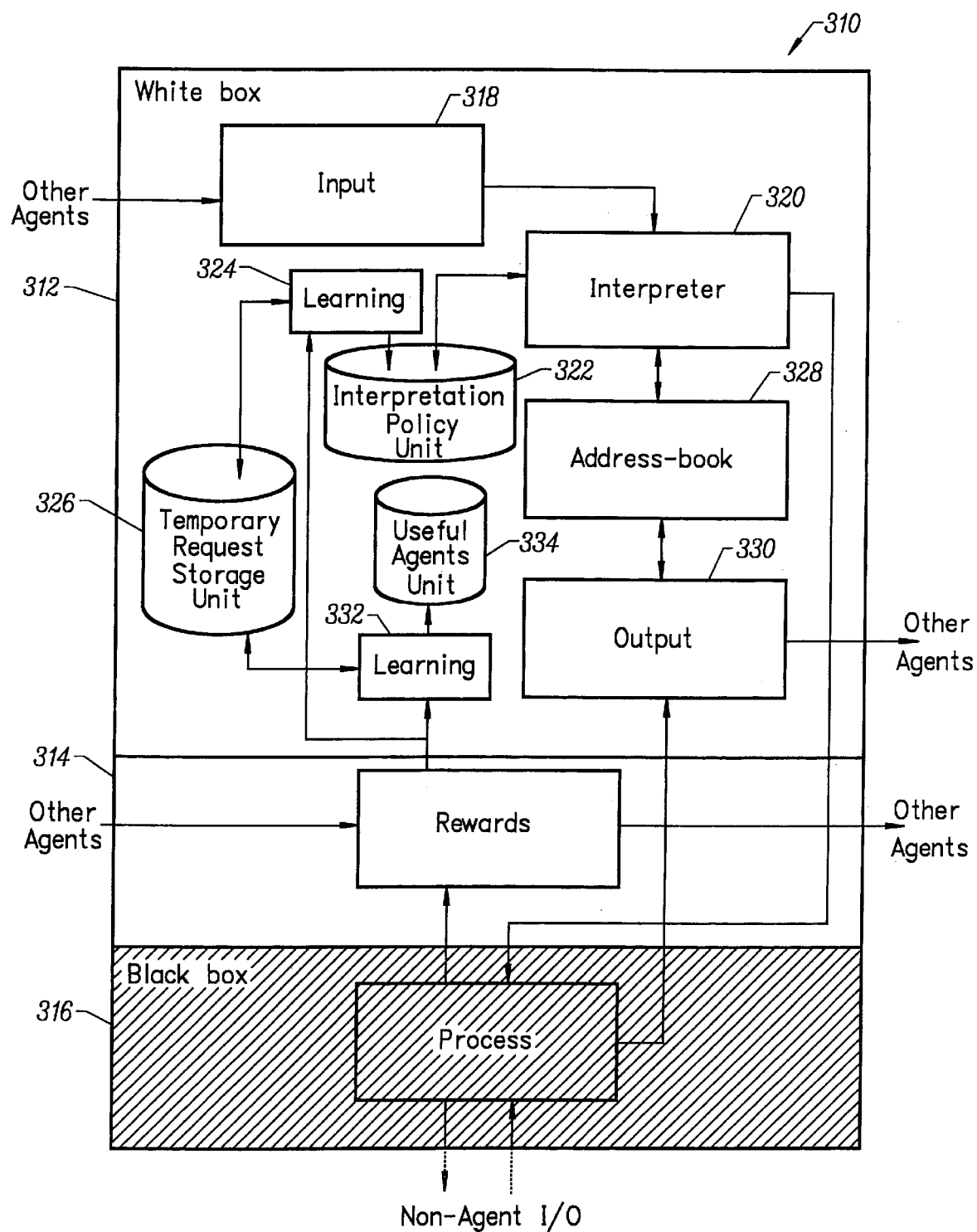
FIG. 3 illustrates basic functions of agents used in the present embodiment.

FIG. 3 illustrates the basic functions of the type of agents that are used in the present embodiment. In particular, an agent 310 comprises three major portions: a communications unit 312, a rewards unit 314, and a specialized processing unit 316. In embodiments which are not adaptive (do not learn), the rewards unit 314 can be omitted. The communications unit 312 and, if it exists, the rewards unit 314, together constitute a "white box" portion of the agent, while the special processing unit 316 constitutes a "black box" portion of the agent. The communications unit 312 and rewards unit 314 are referred to as the "white box" because, as will be apparent below, their internal functions are visible to other agents with which the agent 310 communicates. Special processing unit 316 is referred to as a "black box" because its functions are unimportant to, and therefore hidden from, the inter-agent communication mechanism of the system.

The primary responsibility of the communications unit 312 is to facilitate communicative functions of the agent, including interpretation of messages and routing of messages to other agents. It comprises an input unit 318, which receives input messages from other agents. These messages may be in an extended form of a standard agent communication language, such as KQML. KQML is described in the above-incorporated KQML 1993 reference. The extensions are described below. As used herein, the term "message" includes, among other things, queries, commands, and responses to queries.

Input unit 318 performs some preliminary processing on the input message and passes it to an interpreter 320. The interpreter 320 decides whether the input message is within the domain of responsibility of the agent 310. As used herein, a message is considered to be within the domain of responsibility of a given agent if: (a) the message, or part of it, is within the given agent's local domain of responsibility (i.e., the special processing unit 316 of the agent 310 has itself been assigned the responsibility to take some action in response to the message, or in response to part of the message), and/or (b) the message, or part of it, is within the given agent's downchain domain or responsibility (i.e., the agent 310 knows of one or more further agents to whom the message should be routed). Note that it is possible for an agent 310 to forward a message to more than one further agent, thus creating competition among agents.

The interpreter unit 320 refers to an interpretation policy unit 322 to determine whether the input message is within the domain of responsibility of the agent 310. The interpretation policy unit 322 can be, for example, a table containing various words or tokens in the message that the agent 310 is assigned to recognize. This table also indicates what the agent 310 should do in response to a message containing a token that the agent has recognized. Preferably, but not essentially, some predetermined set of policies is reprogrammed into the interpretation policy unit 322 for each agent by the designer of the system, in order to ensure that the system will be functional from the beginning. In addition, for agents which are adaptive, the interpretation policy unit also receives interpretation policies from the rewards unit 314 via a learning module 324. At the time of the system reset, the information in the interpretation policy unit 322 reverts back to the basic hard-coded start-up information. The interpretation policy stored in unit 322 therefore includes a preset knowledge base, as well as a learned knowledge base. In a system intended for use with different users, several learned knowledge bases are acquired on a per-user basis. The learning module 324 is responsible for contradiction resolution in knowledge base entries with regard to feedback received on the processing of previous requests. Previous requests, and their ultimate disposition within the agent 310, are also stored in a temporary request storage unit 326 in anticipation of their feedback.

The interpreter unit 320 further communicates with an address book 328, which maintains an address list of other agents known by the agent 310 to be useful, or known by the agent 310 to have a capability of processing certain input that cannot be processed by the agent 310. An agent 310 may pass messages to other agents when the agent 310 has received a message that it does not know how to handle (e.g., a query for which there is no entry in the interpretation policy unit 322), or when the agent 310 has processed a message and one or more new messages have been generated as a result. In the embodiment described herein, every agent has an address, and there is a special name-server unit (not shown). The name-server unit provides agents with their unique addresses at run time, so that new agents can be introduced to the system at run time. The address list kept in the address book 328 should be dynamic, and therefore adaptive. It may be limited, in the sense that unwanted or intruding agents may be kept out. It may also contain information (such as performance or accuracy statistics) on agents that normally send their requests to the agent 310 (sometimes referred to herein as "upstream agents"). In may ways, the address book 328 can be thought of as an extension of the interpretation policy unit 322, and therefore in some embodiments, the two units are implemented as a single module.

The address book 328 communicates with a useful agents unit 334, which stores a knowledge base of useful agents in much the same way that the interpretation policy unit 322 stores the interpretation policies for the interpreter 320. In addition to entries preprogrammed by the system designer, the useful agents unit 334 also contains entries which have been learned and stored there by the learning unit 332 in response to feedback from the rewards unit 314 and entries which have been added due to receipt of a Register message from another agent.

The agent 310 also includes an output unit 330 which is responsible for sending requests or outputs to other agents using the address book 328. In one embodiment, the output unit 330 adds a confidence factor to certain of the messages that it outputs based on the interpretations that were made to resolve or redirect input messages. As set forth in more detail below, confidence factors can be used when the agent 310 has chosen from suggestions made by competing agents who have responded to queries from the agent 310.

The rewards unit 314 processes two kinds of feedback: incoming and outgoing. An agent 310 is responsible for distributing and propagating rewards. that have been fed back to it. Such rewards might originate from, for example, a special purpose agent (not shown in FIG. 3) which determines whether user input constitutes feedback regarding the acceptability or unacceptability of the system's response to a particular input message. When a reward reaches the agent 310, rewards unit 314 determines for itself what portion of the incoming reward it deserves and how much should be propagated on to other agents. The rewards unit 314 provides feedback to the learning unit 324 in response to such rewards, so that the interpreter 320 can update its interpretation policy. The rewards unit 314 also provides feedback in response to such rewards to the learning unit 332 to assist the address book 328 in adapting to the needs and specifications of other agents. In addition, in agents whose special processing unit 316 can benefit from feedback, the rewards unit 314 can provide feedback here as well.

The rewards propagated through the agent network might in some embodiments be direct quantifications of user states. In most embodiments, however, the rewards will constitute interpretations of user actions made by an agent which is responsible for such interpretations.

The special processing unit 316 is the portion of agent 310 that does the local work for which the agent 310 is responsible, other than routing. For some agents in a particular embodiment, particularly some agents that are located deep in the interior of the agent network, their role is mainly to direct requests to the appropriate agents and learn or resolve contradictions that may occur at their juncture. For these agents, the special processing unit 316 is extremely simple or omitted entirely. The special processing unit 316 is sometimes referred to herein as a "black box" because the designer of the system can use whatever method he or she deems suitable to implement the local processes unique to the requirements of a given agent. The only constraint placed on the special processing unit 316 is that it is preferably limited to the facilities provided by the communications unit 312 for its communications with other agents.

The special processing unit 316 is used primarily by agents which interact outside of the agent network. Agents responsible for user I/O are examples of such agents. These agents generally generate requests or initiate reward propagation in the agent network, or simply output results.

Another example of a special processing unit 316 is an existing conventional non-agent-oriented program which has been "agentified". Programs can be "agentified" by adding a communications unit such as 312 (and optionally a rewards unit such as 314) as a transducer to mediate between the existing program and other agents. Transducers are described in, for example, the above-incorporated Software Agents paper, by Genesereth, et al. One advantage of using a transducer to "agentify" an existing program is that the transducer requires no knowledge of the preexisting program other than its communication behavior. Other approaches to agentification (wrapper and rewriting) are discussed in the above-incorporated Software Agents paper, by Genesereth, et al.

Interconnection of Agents

The agent-oriented interpretation unit 212 (FIG. 2) includes a number of agents similar to that of FIG. 3, each having a domain of responsibility. In one embodiment, the agents are organized as a hierarchy. The top-level agent acts as an input agent, receiving messages from the speech-to-text converter 210. The messages propagate down the hierarchy to the (hopefully) proper leaf agent, with each agent along the way performing an adaptive routing function.

In another embodiment, the agents in the agent-oriented interpretation unit 212 are interconnected in a way that does not meet the strict definition of a hierarchy. That is, for example, in some cases more than one intermediate agent can transmit a message to a single leaf agent. As another example, agents further down in the structure can transmit requests back up to other agents that are higher up (closer to the input agent). In some embodiments, the arrangement of agents might, for example, satisfy the definition of a hyperstructure, as described in the above-incorporated Self-Organizing Symbiotic Agent paper. In general the arrangement of agents in the agent-oriented interpretation unit 212 can be described as a network. It will be appreciated that hyperstructures and hierarchies are special cases of a network. Furthermore, a simple chain of agents is a special case of a hierarchy and a single agent is a special case of a chain of agents. All these forms and others are considered herein to be kinds of networks.

The different agents in the network are "interconnected" with each other in the sense that agents receive queries and commands only from a predetermined subset of other agents (referred to herein as "upchain" agents) in the network, and agents transmit queries and commands only to another subset of agents (referred to herein as "downchain" agents) in the network. Both subsets are adaptable in the sense that new agents coming online can ask to be added to the list of downchain agents for their prospective upchain neighbors, (via an ADVERTISE performative, for example), and agents already in a subset can ask to be removed (via an UNADVERTISE performative, for example). Because the agent network topology is not restricted in any way, one agent can be both upchain and downchain of another agent.

If desired in a particular embodiment, the agents in an agent network can be grouped into agent communities. A "community" contains one or more agents, all having the same domain of responsibility. In a degenerate case, an agent by itself also constitutes a community of only the one agent. Various embodiments can employ different conventions for communicating between communities of agents. For example, in one embodiment, a query is performed only of an entire community of agents, not of any single agent within the community. Responses may come from the individual agents in the community or, in an embodiment, only from the community as a whole. Thus, as used herein, an agent which is part of a community of agents can be queried, in an appropriate embodiment, by querying the community of which it is part. That is, the querying of a group of agents is considered herein to include the querying of one or more agents within the group. Note that other types of agent groupings are possible in a given embodiment, other than communities. Note also that in a given embodiment, not all agents having the same domain of responsibility need to be within the same community.

When designing a network such as that in the interpretation unit 212, the software as a whole can be thought of as a society, striving to satisfy a set of requests. The input requests are therefore propagated, processed by agent modules that may in turn create requests to other agents. Preferably the designers of the system will devise an initial breakdown of the overall responsibilities of the network, to break down the system as they feel suitable. Hierarchies of agents are possible and agents can be assigned to be responsible for the minutest processes in the system. It is advisable (but not essential) that each agent be kept simple in its responsibilities and be limited in the decisions it needs to make to enhance its learning abilities. Too great a proliferation of simple agents is not always advisable either, however, as the overhead of the white box should be taken into consideration.

In some embodiments, agents can be replaced at run-time with other more complete agents. The replacement can even be a hierarchy or network of new agents (sub-agents) breaking down the responsibilities of their predecessor. This feature provides for the incremental design and evaluation of software.

It is desirable that each agent's responsibilities and actions be clearly defined at design time. As mentioned above, it is also desirable that many aspects of the white box units be preset for each agent according to its definition. To have a working system from the beginning, the designers should pre-define the preliminary communication links between the agents at design time. It should be noted that these communications might change through time, for instance in the case of the introduction of newer agents. Thus, one important phase in the design of software with this methodology will be to determine the participating agents and their capabilities; even though the precise details of how they will eventually communicate with each other may not be known at design time.

Special Purpose Agents

In a typical agent network, many agents have a common structure and follow similar internal routines. However, some special purpose agents may be used depending on the application, for example, agents directly involved with initiating requests to the system, or an agent which interprets the actions of the user as different levels of reward. Some of these special-purpose type agents will now be described.

Input Agents. Inputs to the system may be from more than one source. In such systems, one or a network of special purpose input agents might be included, which unify inputs from different sources into one request, and/or determine commands that all fall into a single request set. For example, if the user's natural language ("NL") input is: "Information on this" and the mouse is then pointed at an item on the display, an input agent might perform the function of unifying these two inputs as a single request.

Interactive input could benefit also from the use of input agents to determine the end of an input stream. For instance in NL input a phrase (e.g., Do! or Please!), or a relatively long pause, could determine the end of the stream. A different policy here would be to interpret the input in real-time and redirect it to the appropriate agent.

Feedback Agents. Any adaptive system needs a reward feedback that tells it how far from the optimum its responses have been. This reward could be explicitly input to the system, or implicitly judged by the system itself from input responses. In an embodiment with implicit rewarding, a feedback agent could be responsible for the interpretation of the input behavior and translating it into rewards. The criteria to use depends on the system. For instance in an interactive software application, a repeat of a command, remarks indicating satisfaction or dissatisfaction, user pause between requests or other such input could be translated into rewards to different output.

Some embodiments have more than one feedback agent depending on different judgment criteria, and a hyper-structure or hierarchy might be designed to create the rewards.

In addition to normal agents and special purpose agents, the interpretation unit 212 also includes a name server unit to make possible the dynamic introduction of new agents to the system. Each new agent obtains its name (or address) from this name server so that conflicts do not occur and so agents can be referred to throughout the system. Input requests or commands to the system are tagged with a request-id (and further with the user-id of the user that has issued them, because interpretation is done on a per-user basis), and rewards fed back to the system incorporate the request-id to which the reward belongs.

Agent Network Embodiment

Figure 4:
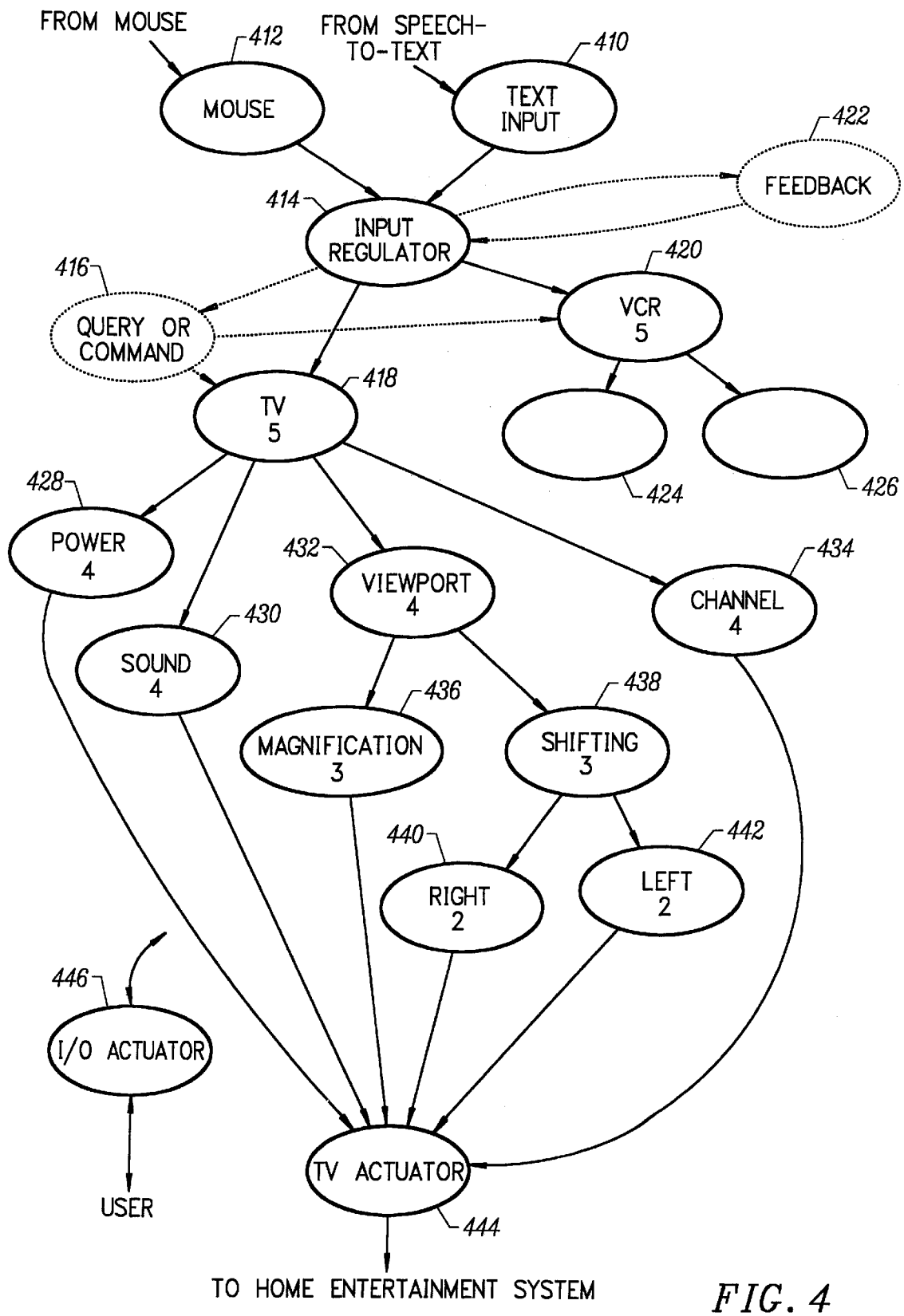
FIG. 4 is a partial diagram of a network of agent communities within the agent-oriented interpretation unit in FIG. 2.

FIG. 4 is a partial diagram of the network of agent communities within the agent-oriented interpretation unit 212 (FIG. 2). In FIG. 4, each oval represents an agent community (each of which in the present embodiment contains only one agent), or an actuator. Since all of the agent communities shown in FIG. 4 contain exactly one agent, the terms "agent" and "community" are used interchangeably herein when describing this figure. The arrows interconnecting the agents in the network of FIG. 4 indicate the direction in which queries and commands are transmitted. Responses travel in the opposite direction. The direction of transmission of other types of messages, such as registration and advertising messages, is not shown in FIG. 4.

In FIG. 4, input from the speech-to-text converter 210 is received by a Text Input agent 410, whereas input from the mouse 126 is received by a Mouse agent 412. The agents 410 and 412 are special-purpose agents, and each performs the function of receiving non-agent I/O, converting it to agent format and providing it to an Input Regulator agent 414. The Text Input agent 410 also performs the function of determining when a request or command from the user is complete enough for the interpretation unit 212 to attempt an interpretation. The Text Input agent 410 is an "originator" of certain commands propagating through the network of FIG. 4. It originates such messages in response to the input that it receives from the speech-to-text converter 210. The Text Input and Mouse agents 410 and 412 also can omit many of the more sophisticated communication functions of the basic agent, since they do not need to receive input from other agents, they do not need to learn, and they are preprogrammed to transmit all incoming messages to a single destination agent. Thus, for example, the Text Input and Mouse agents 410 and 412 can omit the input unit 318, the rewards unit 314, and all of the learning capability of the agent as shown in FIG. 3. Alternatively, generalized, full-featured agents can be used, although certain functions of the agents will never be utilized and certain other functions would be added. The non-agent I/O for the Text Input and Mouse agents 410 and 412 is performed by the specialized processing unit 316 (FIG. 3) of the respective agent.

(As used herein, a given message, signal or event is "responsive" to a predecessor message, signal or event if the predecessor signal or event influenced the given signal or event. If there is an intervening processing element or time period, the given message, event or signal can still be "responsive" to the predecessor signal or event. If the intervening processing element combines more than one message, signal or event, the output of the processing element is considered "responsive" to each of the message, signal or event inputs. If the given message, signal or event is the same as the predecessor message, signal or event, this is merely a degenerate case in which the given message, signal or event is still considered to be "responsive" to the predecessor message, signal or event.)

The Input Regulator 414 is a special-purpose agent which performs the functions of unifying the inputs from the Text Input agent 410 and the Mouse agent 412. It is upchain of a TV agent 418, a VCR agent 420 and a Feedback agent 422. The Input Regulator may also be upchain of other agents or agent communities (not shown) which are responsible for other portions of the home entertainment system 138. When the Input Regulator agent 414 formulates a query, it transmits the query to all of its downchain neighbors 416, 418, 420 and 422.

FIG. 4 also shows a Query or Command agent 416, upchain of TV agent 418 and VCR agent 420, and downchain of Input Regulator agent 414. It is shown in the figure with broken lines, however, because it is intended only to illustrate an option for a different embodiment of an agent network. It is not actually present in the embodiment described herein. In one embodiment that includes such an agent, its purpose is to determine whether a message originating from the Text Input agent 40 reflects a query from the user as to a current status of a setting in the home entertainment system 138 (e.g., "Is the power on yet?"), or a command (e.g., "Turn the t.v. on"). The domain of responsibility of the Query Or Command agent 416 includes that of the TV agent 418, because it is upchain of the TV agent 418. It also includes that of VCR agent 420, for the same reason. In an embodiment which does not have a separate Query or Command agent, such as the embodiment described herein, the function of distinguishing user queries from user commands can instead be included in the Text Input agent 410.

Feedback agent 422 is a special-purpose agent which determines whether the input message carries an implicit or explicit judgement from the user about the acceptability or unacceptability of the system's response to a previous user request. As with Query or Command agent 416, Feedback agent 422 is shown with broken lines because it is only optional to break this function out into a separate agent. In the present embodiment, the feedback detection function, which takes the form of user dissatisfaction detection, is included in the Text Input agent 410 itself.

In one embodiment which does have a separate Feedback agent 422, this agent never responds to a query from the Input Regulator 414, or if it does, it responds with an extremely low priority such that it will never be selected. Instead, once the Feedback agent 422 believes it has received feedback from the user, it transmits a REWARD command to the Input Regulator 414 for propagation throughout the rest of the network. REWARD commands issued by the Feedback agent 422 carry a "THIS-IS-YOURS" performative, or alternatively carry performatives specific to reward propagation.

The VCR agent 420 is upchain of a number of other agents, only two of which (424 and 426) are shown in FIG. 4. The VCR subnetwork is shown in FIG. 4 only for illustration purposes to emphasize that the decision-making responsibility of Input Regulator 414 includes routing of a message to one of several subnetworks responsible for different components in the home entertainment system 138. The VCR subnetwork need not be further described herein.

The TV agent 418 is upchain of a Power agent 428, a Sound agent 430, a Viewport agent 432, and a Channel agent 434. The Viewport agent 432 in turn is upchain of a Magnification agent 436 and a Shifting agent 438. Shifting agent 438 is upchain of a Right agent 440 and a Left agent 432. The Power, Sound, Magnification, Right, Left and Channel agents 428, 430, 436, 440, 442 and 434, respectively, are all upchain of a special purpose TV Actuator agent 444, whose special processing unit 316 (FIG. 3) functions to unify all of the commands from all of its upchain neighbors and to provide them, through the non-agent I/O port (FIG. 3) to the home entertainment system 138 via a single serial port 134 (FIG. 1). The Power, Sound, Magnification, Right, Left and Channel agents 428, 430, 436, 440, 442 and 434, respectively, also store, in their Special Processing Units 316, the current value of the various settings of the home entertainment system 138 for which they are responsible. For example, Sound agent 430 includes a register for storing the current volume setting so that it can properly answer a user query about the current volume setting. TV Actuator 444 is a highly degenerate agent, omitting many of the functions shown in FIG. 3. For example, the following could be omitted: learning unit 324, interpretation policy unit 322, useful agents unit 334, temporary request storage unit 326, learning unit 332 and rewards unit 314. A different embodiment might retain some or all of these elements, and simply never use them. Alternatively, the TV Actuator 444 can be thought of (and programmed as) a non-agent process.

Communication Among Agents

The various agents in the agent-oriented interpretation unit 212 receive and reply to messages using a conventional declarative knowledge representation language known as KIF (Knowledge Interchange Format), a conventional communication language KQML (Knowledge Query and Manipulation Language) and a library of formal ontologies defining the vocabulary of various domains. KQML is described in the KQML 1993 reference incorporated above. KQML is a standard language for programs to use to communicate attitudes about information, such as querying, stating, believing, requiring, achieving, subscribing, and offering. KQML messages (also called "performatives") include a number of fields, including a message-content field and a field indicating what the recipient is supposed to do with the information in the message-content field. The present embodiment extends KQML by adding a number of new performatives as follows. These performatives are all general and therefore pre-implemented in the white box modules of these agents.

REGISTER

Agents need to register themselves with each other to be able to send messages to one another. Unlike other agent-based systems, in the present embodiment, all agents need not be aware of all other agents and registration may be much more distributed and localized. In particular, each agent need only register with its upchain and downchain neighbors. Each agent, upon receiving a REGISTER message, adds the registering agent's name and address to its address book. Registration may take place at run time. The REGISTER performative is itself conventional.

ADVERTISE and UNADVERTISE

Agents advertise their domains of responsibility in order to draw requests from other agents. When an agent receives an ADVERTISE message it updates its interpretation policy so as to redirect certain requests to the advertising agent. This information is removed from the interpretation policy once an UNADVERTISE message is received. An ADVERTISE message indicates a community to which the advertising agent belongs. For example, an ADVERTISE message from Viewport agent 432 to TV agent 418 might say, "I want to receive all input messages containing the words Viewport, Magnify, Shift, Left, or Right." If the agent receiving this message already knows of another agent that wants to receive all of the same messages, then it will add the newly advertising agent to the community already containing the prior agent. If the recipient agent does not recognize such a community in its current interpretation policy, it may add it as a new community. This allows for more than one agent to be members of an interpretation community of another agent. The ADVERTISE or UNADVERTISE performatives themselves are conventional.

THIS-IS-YOURS

When an agent is successful in interpreting a message (i.e., the agent has made a routing determination for the message), the message must be forwarded to an agent in the interpreted community. The performative under which this message is forwarded is called THIS-IS-YOURS. The receiving agent knows that if it cannot interpret this message, then the point of contradiction is itself. For example, assume the Input Regulator agent 414 receives "TV to the right" from the text-input agent 410, and Input Regulator agent 414 has an interpretation policy that all messages containing the word "TV" should be routed to TV community 418. Then Input Regulator agent 414 will forward the message to an agent in that community. In the present example, we only have one agent per community so a THIS-IS-YOURS performative with the input message as its content will be sent to the TV agent 418.

IS-THIS-YOURS?, IT-IS-MINE, NOT-MINE and MAYBE-MINE

As previously mentioned, the interpretation of input is distributed over the network of agents so there may well be situations in which an agent cannot directly interpret a message and will have to query the communities it knows and wait for their response. If an agent cannot itself interpret a received message (i.e., has no interpretation policy that applies to the message), then it queries each of its downchain communities using an IS-THIS-YOURS performative. If an agent receiving such a performative has an interpretation policy for the message, the agent responds with an IT-IS-MINE performative. An agent will have an interpretation policy for a message if the message (or part of it) is within its own local domain of responsibility or the agent knows that the message (or part of it) is within the domain of responsibility of one of the agent's downchain neighbors. In this sense the term "domain of responsibility" is defined recursively.

If the agent receiving the IS-THIS-YOURS performative does not have an interpretation policy for the message, and none of its own downchain neighbors (if any) have such a policy, then the agent responds with a NOT-MINE performative. If the agent receiving the IS-THIS-YOURS performative has more than one further downchain agent claiming the message in a contradictory manner, then the agent responds with a MAYBE-MINE performative.

COMMIT and DISSATISFIED

These performatives are used to force the system to resolve contradictions experienced by the system. In adaptive embodiments, contradiction plays an important role in learning. Pinpointing the agent which is responsible for a contradiction and resolving it there ensures a correct distribution of responsibilities in the agent network. In the present embodiment, contradictions occur in the following cases:

1. When an agent that has received a THIS-IS-YOURS message cannot interpret it itself and all of its communities upon being queried respond with NOT-MINE messages.
2. When an agent that has received a THIS-IS-YOURS message cannot interpret it and more than one of its communities upon being queried responds in contradictory manner with an IT-IS-MINE message.
3. When the user expresses dissatisfaction with a response from the system.

The first two of these cases can implicate the COMMIT performative, whereas the third case implicates the DISSATISFIED performative.

As previously mentioned, one of the functions of the Text Input agent 410 in FIG. 4 is to determine when it has received enough of an input message from the user in order for the system to try interpreting it. For example, the Text Input agent 410 might be programmed to send the input message as it then stands down to the Input Regulator agent 414 with a THIS-IS-YOURS performative after every word spoken by the user until the interpretation is successful. Normally, if an input message results in either of contradiction situations (1) or (2) above, then the message simply dissipates after the Input Regulator 414 receives its replies back from all of its downchain neighbors. No action is taken by the system, which simply awaits more input. The next message transmitted down by the Text Input agent 410 is longer with the addition of the user's next word, which hopefully will enable an interpretation. At some point, however, the user might imply or express a desire for the system to respond to the input thus far. In this case Text Input agent 410 sends the input message as it then stands down to the Input Regulator agent 414 with a COMMIT performative. Note that in one embodiment, the COMMIT performative is implemented as a THIS-IS-YOURS performative with a COMMIT flag set.

If the pending contradiction is at the Input Regulator 414 when the COMMIT performative is issued, then the Input Regulator 414 proceeds to resolve the contradiction. Any predefined contradiction resolution procedure can be programmed into the system. It is most desirable, however, if it includes a step of querying the user directly, preferably as a last resort. For example, if the Input Regulator 414 has a contradiction because all of its downchain neighbors have returned NOT-MINE, then the Input Regulator 414 can ask the user whether the input message refers to a TV or a VCR function. The Input Regulator 414 then adjusts its interpretation policy 322 in accordance with the user's response. By involving the user in this way, both the interaction and the learning is limited to the point of contradiction. Unnecessary interaction is thereby reduced, and a correct distribution of learning across the agent network is ensured.

After the Input Regulator 414 resolves its contradiction, it sends the message on down to its resolved downchain neighbor with a COMMIT performative. If the Input Regulator 414 was not the point of contradiction (that is, that the Input Regulator 414 already had an interpretation of the input message), then in this case too, the Input Regulator 414 sends the input message to the interpreted downchain neighbor with a COMMIT performative. The COMMIT performative propagates down a chain of agents in the network, forcing each agent in the chain which has a contradiction, to resolve its contradiction and pass the COMMIT performative on to the next agent in the chain. The overall contradiction resolution process may well involve several user interactions in which the system asks the user for a decision.

The actual contradiction resolution procedure used in the Input Regulator agent 414 is described in more detail below with respect to FIG. 24. All other agents in the network of FIG. 4 use the same contradiction resolution procedure, although in a different embodiment, different agents can use different contradiction resolution procedures. Since more than one agent in the network needs to be able to query the user, all of the agents route such queries through a common I/O Actuator 446 which controls the I/O port through which such user interaction occurs. In one embodiment, this user interaction takes place via the keyboard 126 and display 124. In another embodiment, it takes place via the speaker 132 and microphone 130. In yet another embodiment, it takes place via components of the home entertainment system 138.

The DISSATISFIED performative is used not when the system determines for itself that a contradiction has occurred (contradiction cases (1) and (2) above), but when an outside authority, such as the user, informs the system that a contradiction has occurred (contradiction case (3) above). In this case, the system does not have a pending contradiction internally, but rather, has already taken some action in response to the user's prior input. (For this reason the agent sensing user dissatisfaction typically precedes the DISSATISFIED performative with a RESTORE performative in order to undo the most recent action taken.) Since the system does not know where the contradiction point is in the agent network, it queries the user at each step in the chain until a leaf agent is reached. For example, if the Input Regulator 414 (or the Feedlock agent 422, in an appropriate embodiment) recognizes user dissatisfaction in an input message, for example by the presence of the exclamation, "Wrong!", then it asks the user a question such as "Do you mean TV or VCR?" If the user responds "TV", then the Input Regulator 414 learns that messages having characteristics of the input message that resulted in the user dissatisfaction, belong to TV agent 418 and not VCR agent 420. Input Regulator 414 then passes the erroneously interpreted message on down to TV agent 418, with a DISSAT- ISFIED performative. TV agent 418 then queries the user, "Do you mean power, sound, viewport or channel?" When the user responds, the TV agent 418 learns the new interpretation policy as did Input Regulator 414, and passes the erroneously interpreted message on further to the designated downchain neighbor with the DISSATISFIED performative. This process continues until the correct leaf agent is reached and the desired action is taken.

The user interaction which the various agents perform in response to the DISSATISFIED performative can take place via the same I/O Actuator 446 as is used for contradiction resolution in response to the COMMIT performative.

UNLEARN

When the user resolves a contradiction by interacting with the agent at a contradiction point, that agent learns this contradiction resolution as a new interpretation policy. For example, the Input Regulator agent 414 might learn that input messages containing certain words should be routed to the TV agent 418. As a rule, each agent that learns a new interpretation policy should ask all agents it knows to "unlearn" that policy. An UNLEARN performative translates to: "If you are interpreting this message, and the interpretation is that this message belongs to me, then un-learn this interpretation policy." Not all embodiments need to implement the UNLEARN performative, but those that do will be better able to localize these learned policies in the agents which are most appropriate for each policy. Such localization of learning helps to keep interpretation policy databases small, thereby increasing the speed with which such databases are searched by each agent and the responsiveness and performance of the overall system.

LEARN

The LEARN performative, which is conventional but included here for completeness, is used by agents teaching each other agents global abstractions such as "more" and "too".

FORGET-PROBLEM

Normally, when an agent receives an IS-THIS-YOURS? query, and either passes it on to its downchain agents or replies to the upchain source of the query, the agent remembers that it has already handled this message. As previously mentioned, the agent stores such problems in temporary request storage unit 326 (FIG. 3), together with the problem-I.D. In this way, when the agent receives a subsequent THIS-IS-YOURS message, for example, the agent does not need to refigure its interpretation or propagate the message on to downchain neighbors which have already rejected ownership of the message.

Problem storage differs from learned interpretation policies in that stored problems, and any stored resolution of such problems, do not influence the interpretation of any new message spoken by the user, even if the text of the new message is identical to the text of the stored problem. Rather, all reference to stored problems occurs by problem-I.D. FORGET-PROBLEM differs from LEARN/UNLEARN also in that whereas LEARN/UNLEARN takes place in response to the resolution of contradictions, problem storage occurs regardless of the resolution of, or even the presence of, contradictions. Still further, problems are stored in the temporary request storage unit 326 only temporarily.

In the present embodiment, agents delete locally stored problems only upon receipt of a FORGET-PROBLEM performative referencing the problem I.D. to be deleted, and Text-Input agent 410 originates a FORGET-PROBLEM performative referencing the most recent problem-I.D. whenever it is about to originate a new problem. This policy is believed to be the best policy for managing the size of each agent's temporary request storage unit 326 database. In another embodiment a different policy can be used, such as by deleting stored problems whenever the agent receives a THIS-IS-YOURS, COMMIT or DISSATISFIED performative identifying the same problem-I.D.

In some situations, the user will ask the system to abort processing of a particular request. For example, after starting to state a request, the user might stop and say, "Scratch that" or "Nevermind". If the Text Input agent 410 (or some other agent charged with this responsibility) recognizes such a desire then it immediately deletes the temporarily stored problem from its temporary request storage unit 326 and then forwards the problem-I.D. to its downchain neighbors with a FORGET-PROBLEM performative. Each of the downchain neighbors deletes the identified problem from its own temporary request storage unit 326, if it was there, and forwards the problem-I.D. on to its own downchain neighbors with a FORGET-PROBLEM performative, and so on. In one embodiment, an agent does not pass the FORGET-PROBLEM message on to its downchain neighbors if the problem-I.D. was not present in its own temporary request storage unit 326. In another embodiment, an agent which did have the problem-I.D. in its temporary request storage unit 326, passes the message on to only those of its downchain neighbors which it knows have previously received the problem designated by the problem-I.D.

Object-Oriented Agent Network Implementation

The agent-oriented interpretation unit 212 (FIG. 2) is implemented in one embodiment using an object-oriented programming language such as Java. A main object class is defined that includes methods and data structures that are common to the great majority of agents in the network. Certain of the special-purpose agents, such as Feedback agent 422, Query Or Command agent 416, Text Input agent 410 and the various actuators in the network, are objects that have been subclassed from the main object class in order to allow certain methods of the main object class to be replaced, and others added, so that the agent can perform the specific functions of its special purpose. In an embodiment, all of the agents in the network represent objects in separate subclasses, because despite their great similarities, they all differ from each other slightly. For example, each is programmed separately to send REGISTER and ADVERTISE messages to different neighboring agents, depending on their location in the network as pre-determined by the system designer. As another example, each agent is pre-programmed with its own default set of interpretation policies. As yet another example, each agent is programed separately with its own "black box" procedures, if any. In this sense all agents in the network might be considered special purpose agents. Other object-oriented and non-object-oriented implementations for the agent network will also be apparent to the reader.

Figure 5:
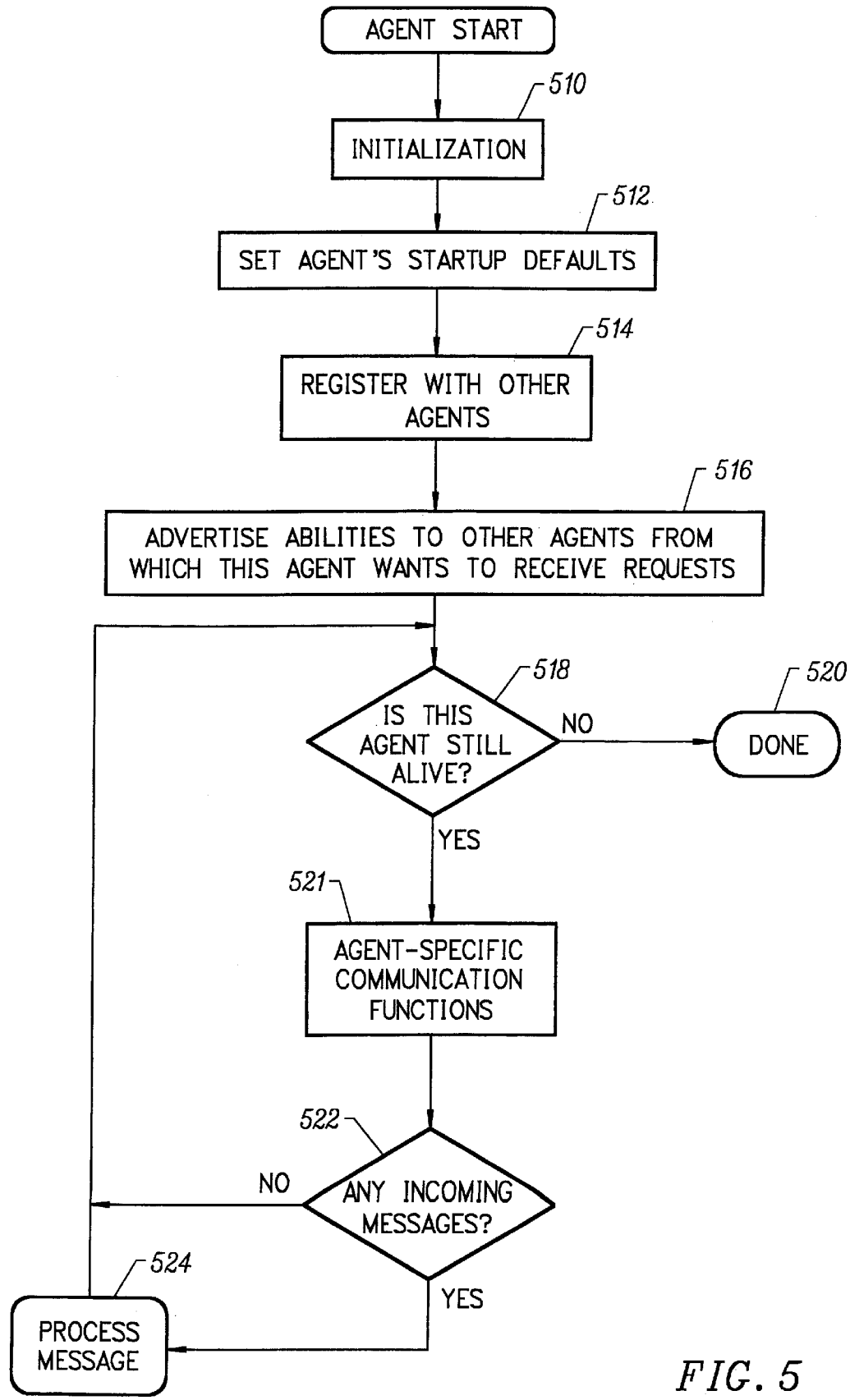
FIG. 5 is a flowchart of an AGENT START method of the main object class.

FIG. 5 is a flowchart of an AGENT START method of the main object class, which is executed whenever an agent comes on-line. The flowcharts included herein should be considered symbolic rather than literal, describing an implementation at a level which is considered most helpful to the reader. It will be appreciated that an embodiment often can perform the various steps of a flowchart in a sequence different than that shown, or in some cases in parallel with other steps.

Referring to FIG. 5, in a step 510, the agent first performs any initialization required. In embodiments in which the agent name is not hard-coded, this step can include contacting a name server to obtain a name for this agent.

In step 512, the agent then sets any of its start-up defaults. In step 514, the agent registers itself with all of the other agents which are to be its upchain and downchain neighbors. This is accomplished by transmitting a REGISTER performative to each of such neighbors, with the agent's name as the message content.

In a step 516, the agent advertises its abilities to other agents from which this agent wants to receive requests. This is accomplished by, for example, sending a message to all of the agent's prospective upchain neighbors with an ADVERTISE performative, and a preprogramed list of words or tokens. If the upchain neighbor later receives an input message containing any of the words or tokens identified by the advertising agent, it will include the advertising agent as one of those to which the message will be routed.

After step 516, the agent enters an event loop which periodically checks for new events directed to the agent. In a step 518, the agent first determines whether it is still alive. If not, then in step 520, the agent terminates its operations. If the agent is still alive, then in a step 521, the agent performs any agent-specific communication functions. In the main object class for the agents in the agent network, there are no agent-specific communication functions and therefore step 521 performs no functions. As will be seen below, certain special purpose agents which do need to perform special communication functions, do so in a procedure which substitutes for this step 521. In a step 522, the agent then determines whether it has received any incoming messages. If not, then the agent goes back to sleep and returns to step 518. If it has received incoming messages, then it proceeds to a PROCESS MESSAGE step 524 further described hereinafter. After the message is processed, then the agent again goes to sleep and control again is returned to step 518.

Figure 6:
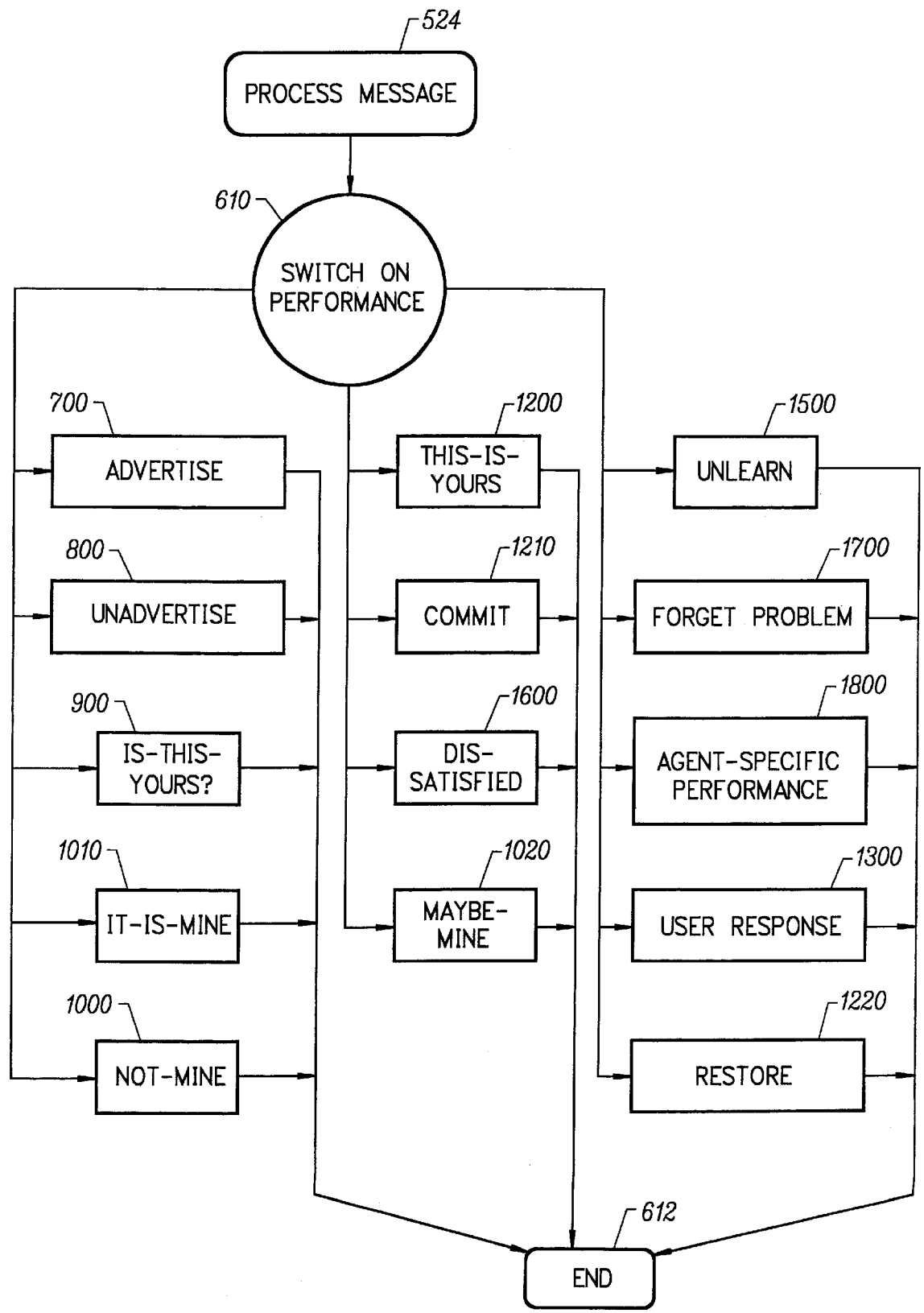
FIG. 6 is a flowchart of the PROCESS MESSAGE step in FIG. 5.

FIG. 6 is a flowchart of the PROCESS MESSAGE step 524 of FIG. 5. In a step 610, the agent executes an appropriate method in accordance with the performative of the message it has received. Such performatives and their corresponding FIG. 6 step numbers are:

ADVERTISE 700
UNADVERTISE 800
IS-THIS-YOURS? 900
IT-IS-MINE 1010
NOT-MINE 1000
THIS-IS-YOURS 1200
COMMIT 1210
DISSATISFIED 1600
MAYBE-MINE 1020
UNLEARN 1500
FORGET-PROBLEM 1700
AGENT-SPECIFIC PERFORMATIVE 1800
USER-RESPONSE 1300
RESTORE 1320

An agent may also be able to handle other performatives, but these are omitted from FIG. 6 for purposes of clarity. After a method specific to the performative of the received message is executed, the PROCESS MESSAGE step 524 terminates (step 612).

Figure 7:
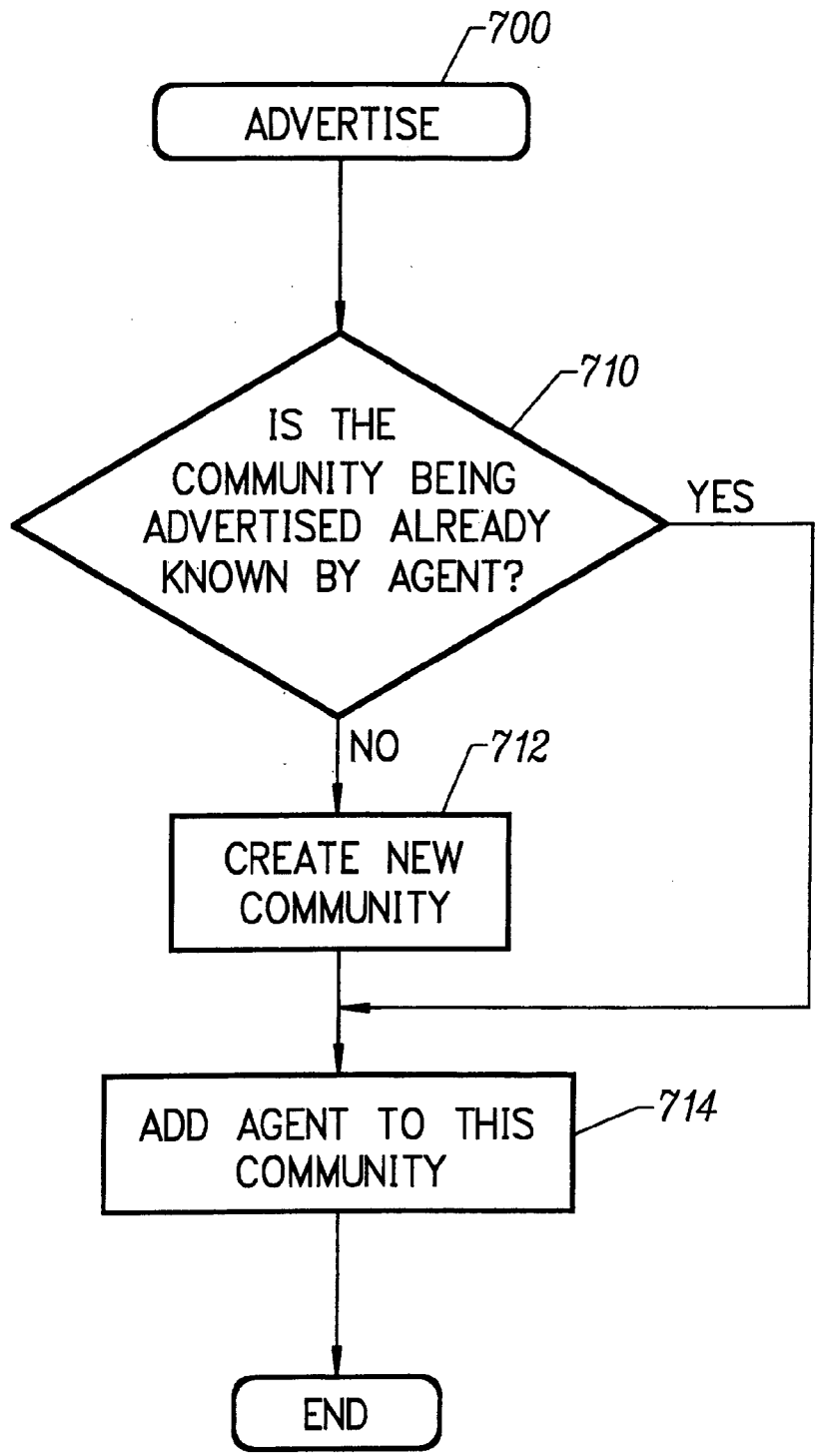
FIG. 7 is a flowchart of the method performed by an agent of the main object class in response to receipt of an ADVERTISE performative.

FIG. 7 is a flowchart of the method performed by an agent of the main object class in response to receipt of an ADVERTISE performative (step 700). In a step 710, the agent determines whether the community being advertised is already known by the agent. If not, then in a step 712, the agent creates a new community in its address book for agents having the characteristics designated in the received ADVERTISE message. If the community being advertised is already known by the agent, then step 712 is skipped. In step 714, the advertising agent is then added to the specified community in the agent's address book 328.

Figure 8:
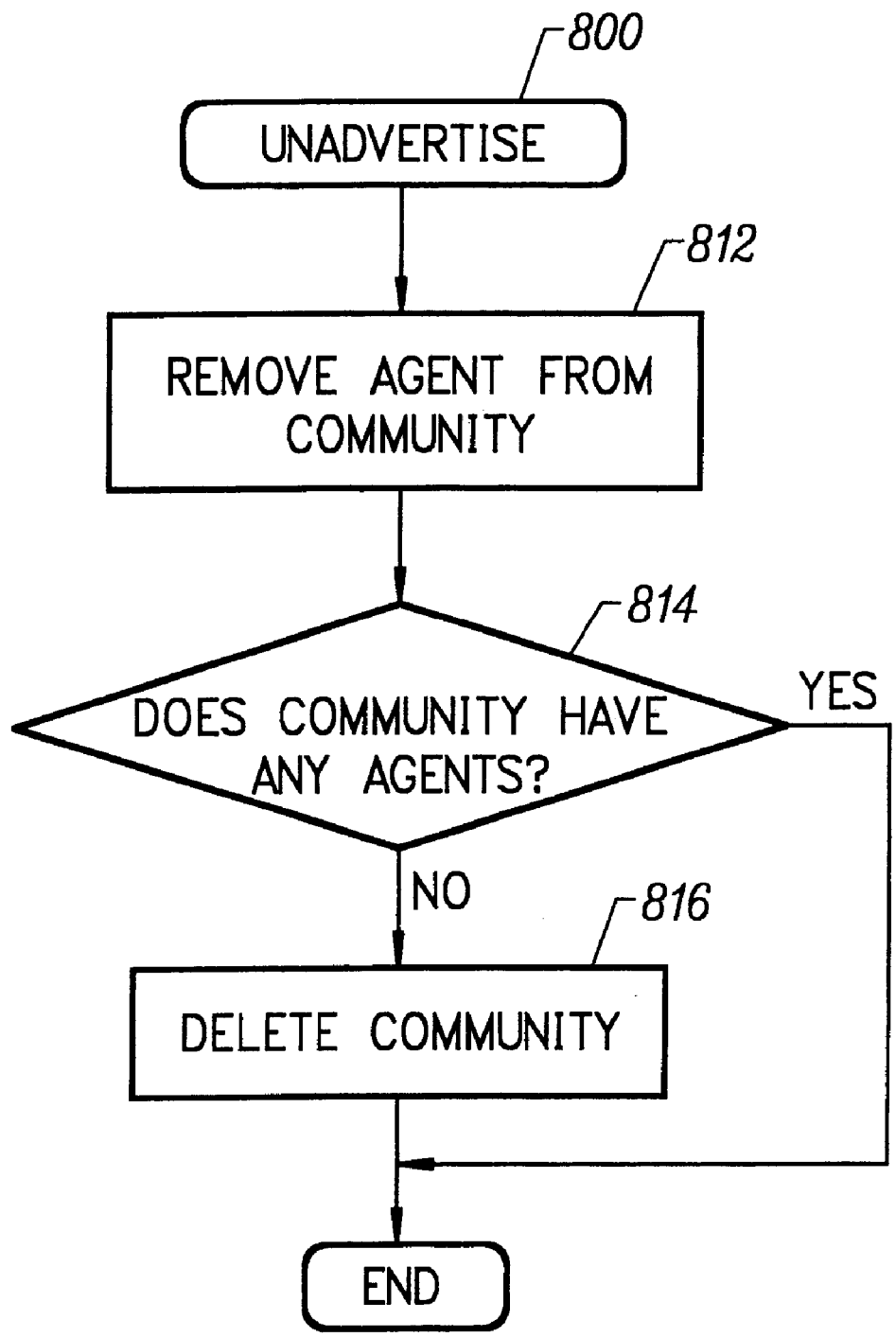
FIG. 8 is a flowchart of the method that the agent uses in response to receipt of an UNADVERTISE performative.

FIG. 8 is a flowchart of the method that the agent uses in response to receipt of an UNADVERTISE performative. In a step 810, the agent removes the unadvertising agent from its community as stored in the receiving agent's address book 328. In step 812, the receiving agent determines whether the community has any more agents. If so, then the UNADVERTISE method terminates. If not, then in a step 816, the agent deletes the community from the address book 328 before terminating the method.

Figure 9:
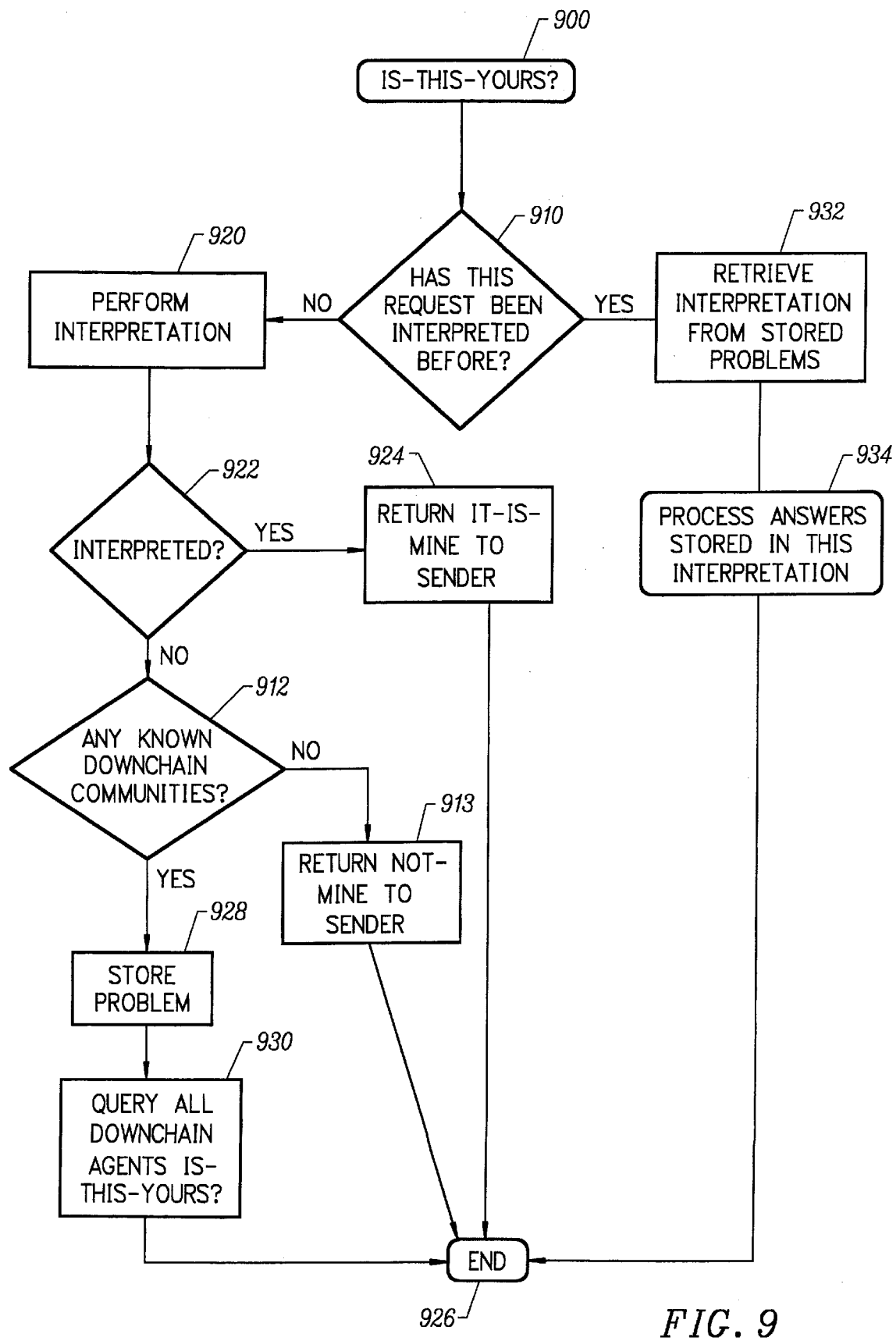
FIG. 9 is a flowchart of the method performed by an agent of the main object class in response to receipt of an IS-THIS-YOURS? performative.

FIG. 9 is a flowchart of the method performed by an agent of the main object class in response to receipt of an IS-THIS-YOURS? performative (step 900). When the agent receives such a message, it first checks its temporary request storage unit 326 to determine whether it has previously interpreted the subject message (step 910). If not, then in step 920, it performs an interpretation of the message. The interpretation involves two tests: first the agent determines whether the message is within its own local domain of responsibility (e.g., by determining whether the input message contains certain words or tokens in response to which this agent needs to take local action), and if not, then second, the agent determines whether it has a stored interpretation policy (e.g., a further routing) for the input message. In step 922, if the interpretation was successful, then in step 924, the agent returns IT-IS-MINE to the upchain neighbor which sent the IS-THIS-YOURS? performative (step 924). The method then terminates (step 926).

If in step 922, it is determined that the interpretation performed in step 920 was unsuccessful (that is, the agent does not claim the input message for itself and also does not have an interpretation policy for the message), then in step 912, the agent checks its address book 328 to determine whether it has any downchain communities. If not then it returns NOT-MINE to its upchain neighbor (step 913). If the agent does have downchain neighbors, then in step 928, the agent stores the problem in its temporary request storage unit 326. It then queries all of its downchain agents with the same IS-THIS-YOURS? performative (step 930). The method then terminates (step 926).

Returning to step 910, if the message subject of the IS-THIS-YOURS? performative has previously been interpreted by this agent, as indicated in the agent's temporary request storage unit 326, then in step 932, the agent retrieves the interpretation from the temporary request storage unit 326. The temporary request storage unit 326 stores not orny the problems that have been seen by this agent, but also the responses that have been returned by all of the agent's downchain neighbors. In step 934, the agent executes a PROCESS ANSWERS step as described below with respect to FIG. 11. The procedure then ends (step 926).

Figure 10:
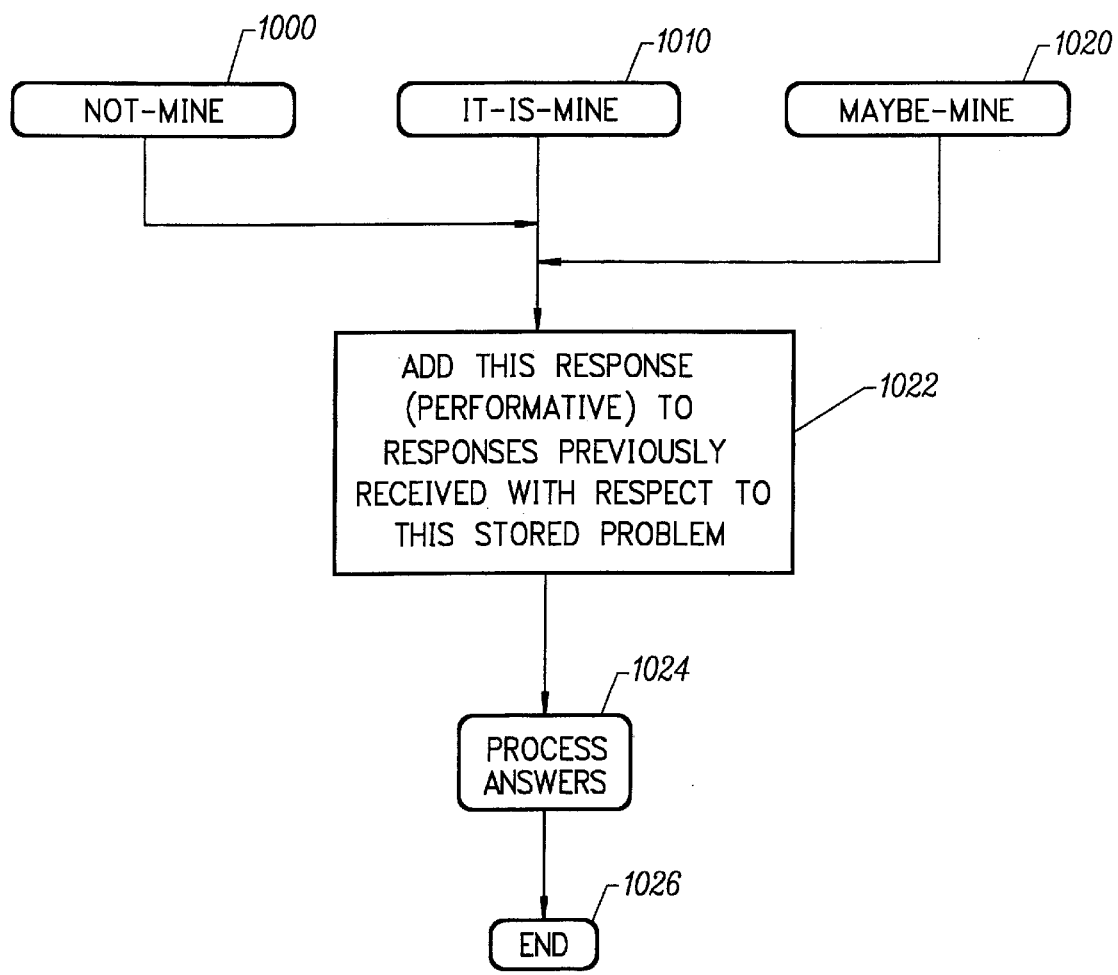
FIG. 10 is a flowchart of the method executed by an agent of the main object class when it receives any of three possible query responses.

FIG. 10 is a flowchart of the method executed by an agent of the main object class when it receives any of the three possible responses (NOT-MINE, IT-IS-MINE AND MAYBE-MINE) to an IS-THIS-YOURS? query that the agent previously sent to its downchain neighbors. In a step 1022, the agent first adds the response (i.e., the performative) to any responses that it previously received with respect to this stored problem. The responses are stored in the agent's temporary request storage unit 326. In a step 1024, the agent then executes a PROCESS ANSWERS procedure described hereinafter. The method then ends (step 1026).

Figure 11:
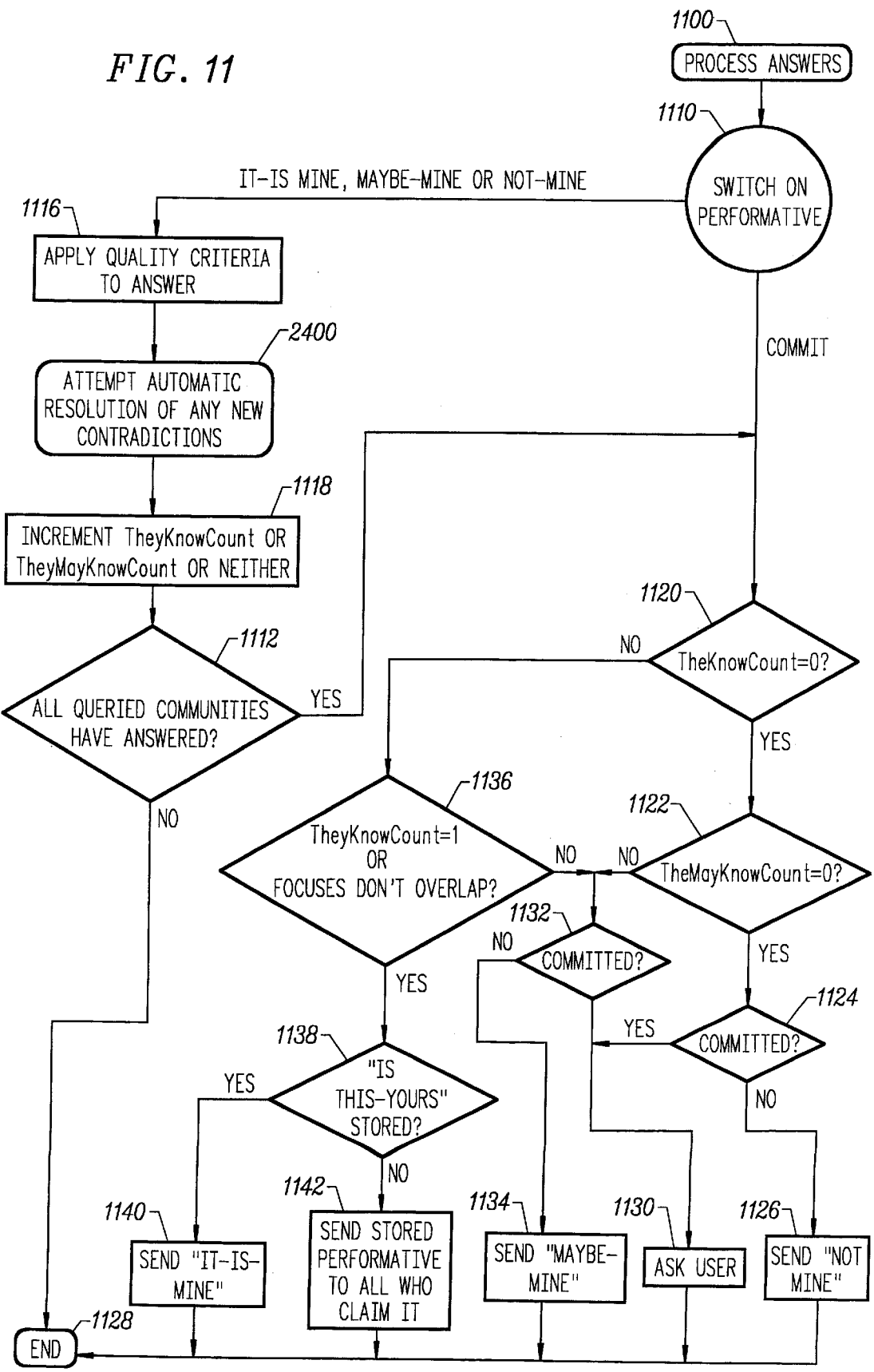
FIG. 11 is a flowchart detail of the PROCESS ANSWERS step in FIGS. 9, 10, 12 and 13.

FIG. 11 is a flowchart of the PROCESS ANSWERS step 1100, corresponding to steps 934, 1024, 1244 and 1316 in FIGS. 9, 10, 12 and 13 respectively. The PROCESS ANSWERS routine, among other things, determines which downchain agents, if any, are eligible to receive the message. An agent considers a downchain agent to be eligible if the downchain agent has responded to an IS-THIS-YOURS? query of the downchain agent, with a response that claims the message with some level of quality that is sufficient for this agent. That is, query responses which claim a message can do so with varying degrees of confidence, and the agent receiving the response can apply its own quality criteria to a given response to determine for itself whether it considers the agent which sent that response to be eligible to receive the message. Each responding agent can communicate its level of confidence to its upstream querying agent through the use of, for example, a confidence level field in the response message. In addition, a response which carries with it an indication of a contradiction at or beyond the responding agent (for example, where the response message is a MAYBE-MINE performative, rather than an IT-IS-MINE performative) can also be used by the querying agent in its application of quality criteria to the response. In other words, the term "confidence level", as used herein, includes not only explicit confidence values which in a given embodiment might be returned as part of query response messages, but also other indications of the quality of the response which might be suggested or indicated by other means (such as by reference to the specific performative used in the response message).

Referring to FIG. 11, in step 1110, the PROCESS ANSWERS routine begins by switching on the performative which caused the agent to enter this routine (referred to herein as the entry performative). If the performative was IT-IS-MINE, MAYBE-MINE, or NOT-MINE, then in step 1116, the quality criteria established for the present agent is applied to the response. In the present embodiment, no action at all is taken in step 1116. In another embodiment, step 1116 rejects certain IT-IS-MINE and MAYBE-MINE responses which have a very low quality level, essentially by replacing them with NOT-MINE performatives.

In step 2400, the agent determines whether the new response creates a contradiction with any previously received response. Note that even if two downchain agents both claim a message with an IT-IS-MINE performative, there still may be no contradiction if, for example, each claims a different part of the message. For example, if the input message is "TV and VCR On," then no contradiction is created in the Input Regulator agent 414 when both TV agent and VCR agent claim the message. Both need to receive it ultimately.

In order to accommodate multiple non-contradictory claimants of a message, the concept of "focus" is introduced. Each agent which claims ownership of a message, returns, with its IT-IS-MINE or MAYBE-MINE performative, an indication of which part or parts of the message caused the agent to claim the message. The indication of a particular part or parts of a message which caused an agent to claim the message, is referred to as the "focus" of the claim. The focus of the claim can be either a contiguous or discontiguous part of the message. If the message was actually claimed by two or more further downchain agents, then the agent preparing the IT-IS-MINE or MAYBE-MINE response specifies a focus given by the union of the parts of the message claimed by the further downchain agents.

Step 2400 utilizes focus, as well as other techniques described below with respect to FIG. 24, to attempt to resolve any new contradictions.

In step 1118, the agent increments a variable referred to herein as TheyKnowCount if the newly received response is, and after steps 1116 and 2400 remains, a THIS-IS-MINE performative. The agent also increments variable TheyMayKnowCount if the newly received response is (still) a MAYBE-MINE performative. Then, in step 1112, it is determined whether all queried communities have answered. If one or more communities have not yet answered, then the PROCESS ANSWERS routine ends (step 1128) to await further responses. In the present embodiment, an agent considers the first response that it receives from an agent in a given community to constitute the community's response. Subsequent responses from agents within that community, if any, are ignored. In a different embodiment, or in different agents within the same embodiment, different policies may be employed for determining whether a sufficient response has been received from a downchain agent or community.

If in step 1112 all queried communities have now answered, or if the performative which caused the agent to enter the PROCESS ANSWERS routine was a COMMIT performative, then flow continues at step 1120.

In step 1120, if TheyKnowCount equals zero, then in step 1122, it is determined whether TheyMayKnowCount also equals zero. If so then, in step 1124, if the performative which caused the agent to enter the PROCESS ANSWERS routine was not a COMMIT performative (i.e. it was a response to an IS-THIS-YOURS query or a response to a THIS-IS-YOURS performative), then in step 1126, the agent sends a NOT-MINE performative to the upchain neighbor which sent the problem. The routine then ends (step 1128). If in step 1124 the performative which caused the agent to enter the PROCESS ANSWERS routine was a COMMIT performative, then the agent has a situation in which it is required to determine which of its downchain neighbors, all of whom have rejected the current message, is to nevertheless receive the message. Accordingly, in step 1130, the agent asks the user to resolve the contradiction. The routine then terminates (step 1128), the user's response entering through the USER RESPONSE performative handled in step 1300 (FIG. 6).

If TheyKnowCount equals zero (step 1120) but TheyMayKnowCount not equals zero (step 1122), then in step 1132, it is determined whether the entry performative was a COMMIT performative. If so, then in step 1130, the agent again asks the user to resolve the contradiction arising from more than one MAYBE-MINE query response. The routine then ends (step 1128). If in step 1132 the entry performative was not a COMMIT performative, then in step 1134, the agent returns MAYBE-MINE to its upstream querying agent. The routine then ends (step 1128).

If in step 1120 it is determined that TheyKnowCount does not equal zero, then in step 1136 it is determined whether TheyKnowCount equals 1. If so, then there is no contradiction because exactly one downchain neighbor has claimed the subject message unconditionally. If the subject message carried an IS-THIS-YOURS performative (step 1138), then in step 1140, the agent returns IT-IS-MINE to its upchain querying agent. The routine then ends (step 1128). If in step 1138 the message carried something other than an IS-THIS-YOURS performative, for example a THIS-IS-YOURS performative, then in step 1142, the agent passes the message on to all of its downchain neighbors who have claimed it. The routine then ends (step 1128). If in step 1136, more than one downchain agent has claimed the subject message with an IT-IS-MINE performative, but the focuses of the claims do not overlap, then there is no contradiction. The agent either sends an IT-IS-MINE performative to an upchain querying agent (step 1140), or sends the stored performative to all claiming downchain agents (step 1142) just as if exactly one downchain agent had claimed the message with an IT-IS-MINE performative.

If more than one downchain agent has claimed the message with a sufficient level of quality to satisfy the present agent (TheyKnowCount greater than one), and the focuses of the claims overlap (step 1136), then a contradiction is indicated. Control transfers to step 1132, described above. If the entry performative was a COMMIT performative, then again the system asks the user (step 1130) to resolve the contradiction and the routine ends (step 1128). If the entry performative was not a COMMIT performative, then again, instead of resolving the contradiction at this time, the agent simply returns a MAYBE-MINE performative to the upchain sender of the IS-THIS-YOURS message (step 1134). The routine then ends (step 1128). The agent does not try to resolve the contradiction at this stage because, for example, this agent might not be in any of the final message paths as ultimately determined.

Figure 12:
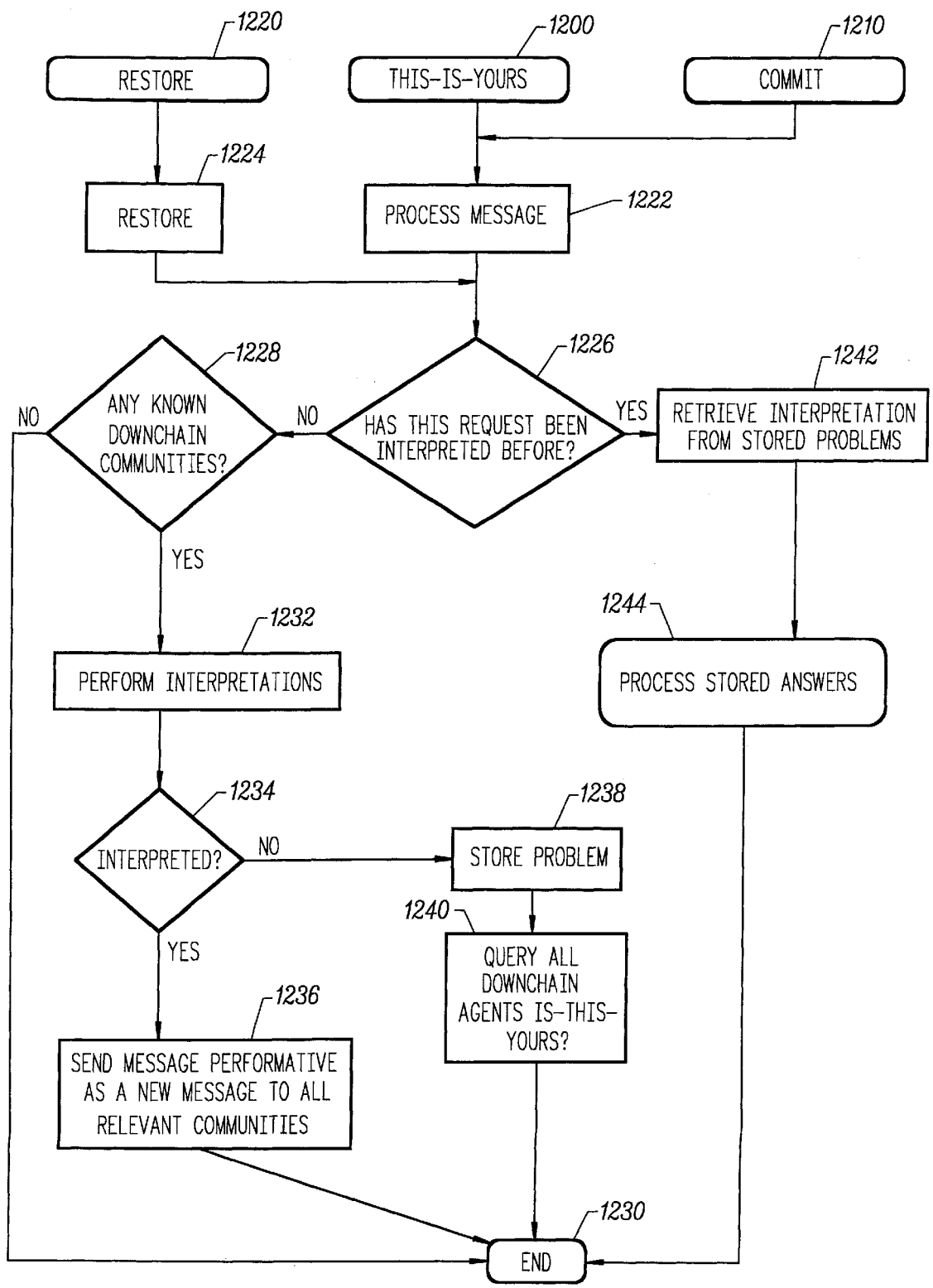
FIG. 12 is a flowchart of the method performed by an agent of the main object class in response to receipt of a RESTORE, THIS-IS-YOURS or COMMIT performative.

FIG. 12 is a flowchart of the method performed by an agent of the main object class in response to receipt of a RESTORE, THIS-IS-YOURS or COMMIT performative. If the performative of the input message is THIS-IS-YOURS or COMMIT, then in step 1222, the agent processes the message in accordance with its black box procedures in the special processing unit 316. Other than routing and learning, this is the step in which the local work of the agent, if any, takes place. If the performative of the input message was RESTORE, then in step 1224, the agent performs its black box RESTORE process, undoing whatever action it took most recently. A RESTORE performative might be issued, for example, if the user expresses a desire to undo the most recent action, or if the user expresses dissatisfaction with the system's response to the most recent command.

In all cases after the agent-specific steps 1222 or 1224 are taken, the white box routing steps shown in the remainder of FIG. 12 take place. In particular, in step 1226, the agent first determines whether the input message has previously been interpreted by this agent. This involves checking the temporary request storage unit 326. If not, then in step 1228, the agent determines whether it has any further downchain communities. If not, then the procedure of FIG. 12 ends (step 1230). The agent has done its own work and has no further downchain agents who might have their own work to perform in response to the input message. If in step 1228 it is determined that the agent does have downchain communities, then in step 1232, the agent attempts to interpret the message. As with step 920 (FIG. 9), this involves checking the interpretation policy unit 322 to determine whether the input message fits the criteria of any preprogrammed or learned interpretation policy. Unlike step 920, however, there is no need for step 1232 to recognize interpretation policies calling for the current agent to perform local work. In step 1234, if the interpretation was successful (i.e., the agent knows of a subset (proper or improper) of its downchain agents which are interested in receiving the message), then in step 1236, the agent sends the message performative (RESTORE, THIS-IS-YOURS or COMMIT) to all of the relevant communities identified in the interpretation policy. The procedure of FIG. 12 then ends (step 1230). Each of the agents receiving performatives in accordance with step 1236 typically will handle it in accordance with this same FIG. 12 procedure.

If in step 1234 the agent does not have an interpretation policy for this message, then the agent stores the problem in its temporary request storage unit 326 (step 1238) and queries all of its downchain agents with an IS-THIS-YOURS? performative (step 1240). The procedure of FIG. 12 then ends (step 1230). Any responses will come through the procedures of FIGS. 6, 10 and 11.

Returning to step 1226, if the agent determines that it has previously interpreted the message subject of the RESTORE, THIS-IS-YOURS? or COMMIT performative, then in step 1242, the agent retrieves all of the answers that it has stored in its temporary request storage unit 326 in conjunction with this problem. In step 1244, the agent executes the PROCESS ANSWERS routine described above with respect to FIG. 11. The procedure of FIG. 12 then ends (step 1230).

FIG. 13 is a flowchart of the method performed by an agent of the main object class in response to receipt of a USER-RESPONSE performative. This is the performative with which the I/O Actuator 446 (FIG. 4) sends user responses back to the agent originating a user interaction request such as in step 1130 (FIG. 11). Both the message to the I/O Actuator 446 and its response, processed in FIG. 13, include a reference to the problem-I.D. stored in the agent's temporary request storage unit 326. Thus, in step 1310, after receipt of a USER-RESPONSE performative, the agent retrieves the problem from its temporary request storage unit 326. In step 1312, the agent learns the user response in a manner described hereinafter with respect to FIG. 14. In a step 1314, the agent transmits UNLEARN performatives to all agents upchain of the present agent, so as to localize the learning in the present agent.

In step 1316, the agent then interprets the problem again and attempts to respond to the original message (as stored in the temporary request storage unit 326). This is accomplished by providing the problem ID again to the PROCESS MESSAGES routine of FIG. 6. The procedure then ends (step 1318).

FIG. 14 is a flowchart detail of step 1312 (FIG. 13), indicating one simple learning technique. In particular, in step 1410, the agent merely adds the word or word combination or other token, which was included in the message content, to the interpretation table 322 for this agent. In other embodiments, much more sophisticated learning algorithms can be programmed. In step 1412, the procedure ends.

FIG. 15 is a flowchart of the method performed by an agent of the main object class in response to receipt of an UNLEARN performative. The UNLEARN performative is sent, for example, by downchain agents performing a step such as 1314 (FIG. 13). As set forth in step 1510, the UNLEARN procedure merely involves removing the entry for the message content from the current agent's interpretation table 322. The current agent does not need to forward the UNLEARN performative to its own upchain agents. In step 1512, the procedure ends.

FIG. 16 is a flowchart of the method performed by an agent of the main object class in response to receipt of a DISSATISFIED performative. In a step 1608, the agent first retrieves the current problem from its stored problems. In step 1610, the agent then asks the user, through user interaction, for feedback as to which community known by this agent is to be responsible for the subject message. In step 1612, after the user has responded, the agent learns the new interpretation policy by storing the user response in the agent's interpretation policy unit 322. In step 1613, as in step 1314 (FIG. 13), the agent sends an UNLEARN performative to all of the agent's upchain neighbors. In step 1614, the agent then passes the DISSATISFIED performative down to the neighboring community that has been chosen by the user. In step 1616, the procedure ends.

FIG. 17 is a flowchart of the method performed by an agent of the main object class in response to receipt of a FORGET-PROBLEM performative. In step 1710, the agent simply removes the problem stored under the problem-I.D. specified by this message's content, from its temporary request storage unit 326. In step 1712, the procedure ends.

FIG. 18 is a flowchart of the method performed by an agent of the main object class in response to receipt of an AGENT-SPECIFIC performative. While a pure implementation of the black box/white box might be preferred theoretically, in practical applications, it is often necessary to transmit commands to a particular agent's special processing units 326, even though that might require knowledge of certain procedures or data internal to the special processing unit 316. In an embodiment, the system permits such commands through the use of an AGENT-SPECIFIC performative. As shown in FIG. 18, in step 1810, the white box portion of the agent simply passes the message content on to the agent's special processing unit 316. The procedure then ends (step 1812).

Figure 19:
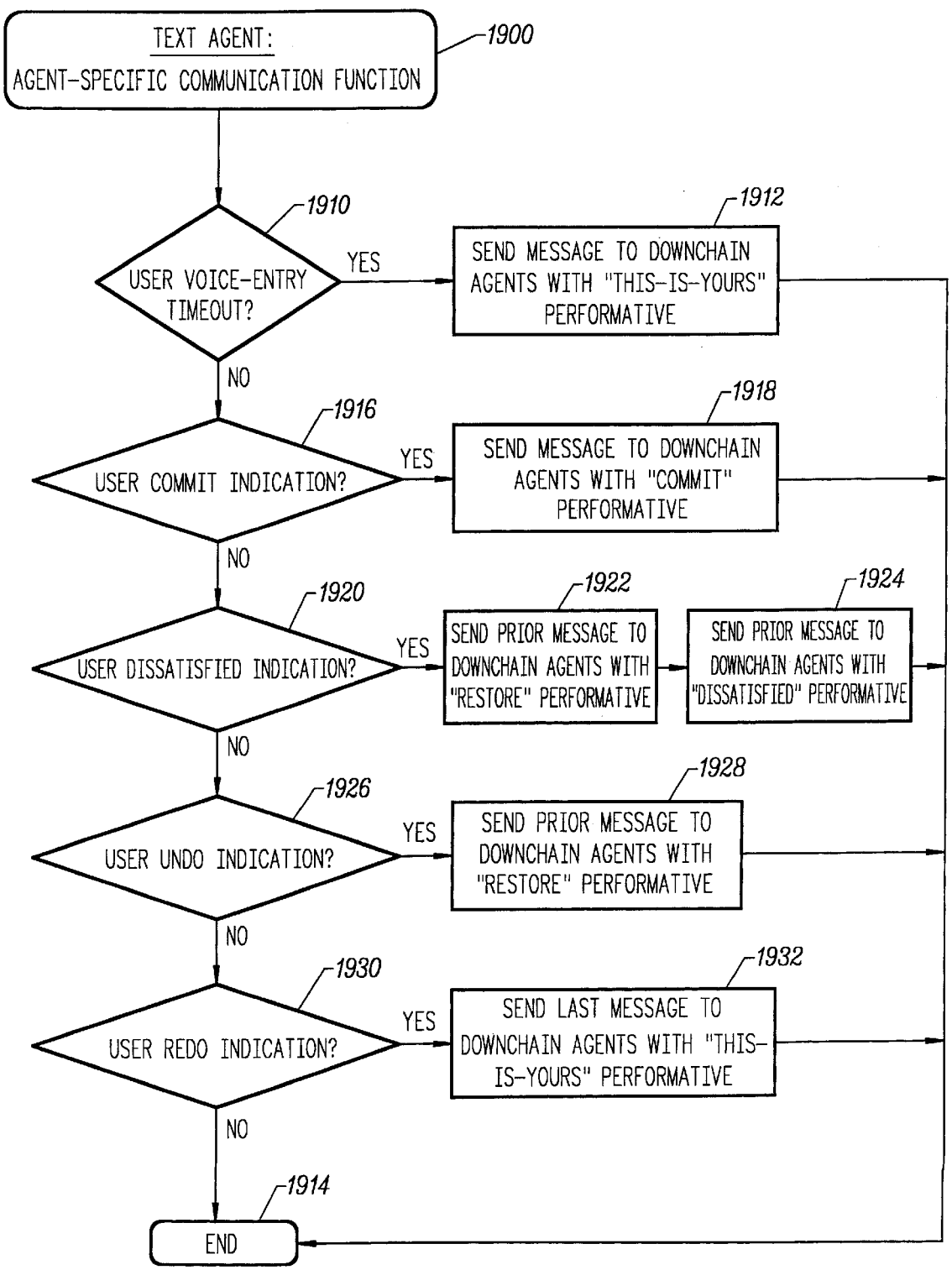
FIG. 19 is a flowchart of the agent-specific communication functions which can be performed by a text input agent.

As previously mentioned, the agent network of FIG. 4 includes certain agents which are instantiations of objects in special object classes which extend the main object class. Indeed in one embodiment, all agents in the network are instantiations of objects in special object classes which extend the main object class. One of such agents, in particular the Text Input agent 410 (FIG. 4), will now be described. This agent differs from other agents in the network not only in its list of neighboring agents, but also in the functions that it performs in the agent-specific communication functions step 521 of FIG. 5. FIG. 19 is a flowchart of the agent-specific communication functions 1900 performed by Text Input agent 410.

It will be recalled that the agent-specific communication functions take place within the event loop of FIG. 5. Whenever the Text Input agent 410 awakens, in step 1910, it first determines whether there has been a user voice-entry timeout. In particular, the agent determines whether a predetermined pause period has expired, without any further changes or input from the user. If so, then in step 1912, the Text Input agent 410 sends the input message, as it currently stands, to all of its downchain neighbors with a THIS-IS-YOURS performative. The step 1900 then ends (step 1914). It will be appreciated that the Input Regulator agent 414, which is the only agent downchain of Text Input agent 410, will respond to this message by attempting an interpretation, and querying its own downchain agents, all as described above.

Returning to FIG. 19, if a user voice-entry timeout has not yet occurred, but the user has otherwise indicated (for example, by pressing the enter key on a keyboard) that he or she wishes to commit the message as it currently stands (step 1916), then in step 1918, the Text Input agent 410 sends the message as it currently stands to all of its downchain agents with a COMMIT performative. Again, the only downchain agent, Input Regulator 414, responds as described previously. The step 1900 then ends (step 1914).

If no user voice-entry timeout has occurred, and no user commit indication has been detected, then in step 1920, the Text Input agent 410 determines whether the user has indicated dissatisfaction with the response of the system to the user's most recent query or command. If so, then in step 1922, the Text Input agent 410 sends the prior message to its downchain agents with a RESTORE performative, to cause the system to undo its incorrect action, and then in step 1924, the Text Input agent 410 again sends the prior message to its downchain agents, this time with a DISSATISFIED performative. Step 1900 then ends (step 1914).

If no user voice-entry timeout has occurred, and no user commit indication has been detected, and no user dissatisfaction indication has been indicated, then a step 1926, Text Input agent 410 determines whether the user has indicated a desire to undo the previous action. If so, then in step 1928, the Text Input agent 410 sends the prior message to its downchain agents with a RESTORE performative, similarly to step 1922. However, the Text Input agent 410 does not follow this with a DISSATISFIED performative. Instead, step 1900 then ends (step 1914). If no user voice-entry timeout has occurred, and no user commit indication has been detected, nor has any user dissatisfaction been indicated or an undo command been indicated, then in step 1930, the Text Input agent 410 determines whether the user has requested that the previous action be redone. If so, then in step 1932, the Text Input agent 410 sends the last message to its downchain agents with a THIS-IS-YOURS performative, thereby causing the system to repeat the most recent action. Step 1900 then ends (step 1914).

Typical Network Message Flow

Most of the flowcharts described above represent object class methods of individual agents. The overall functioning of the agent network as a whole results from intercommunication among the agents and the performance, internally to each agent, of methods such as those described above. In order to better explain the overall functioning of the agent network as a whole, FIGS. 20, 21, 22 and 23 are flowcharts describing the sequence of operation that the network of FIG. 4 performs in response to certain typical user voice input. These flowcharts are not intended to cover all possible sequences of events, but rather, illustrate some common or typical sequences.

Figure 20:
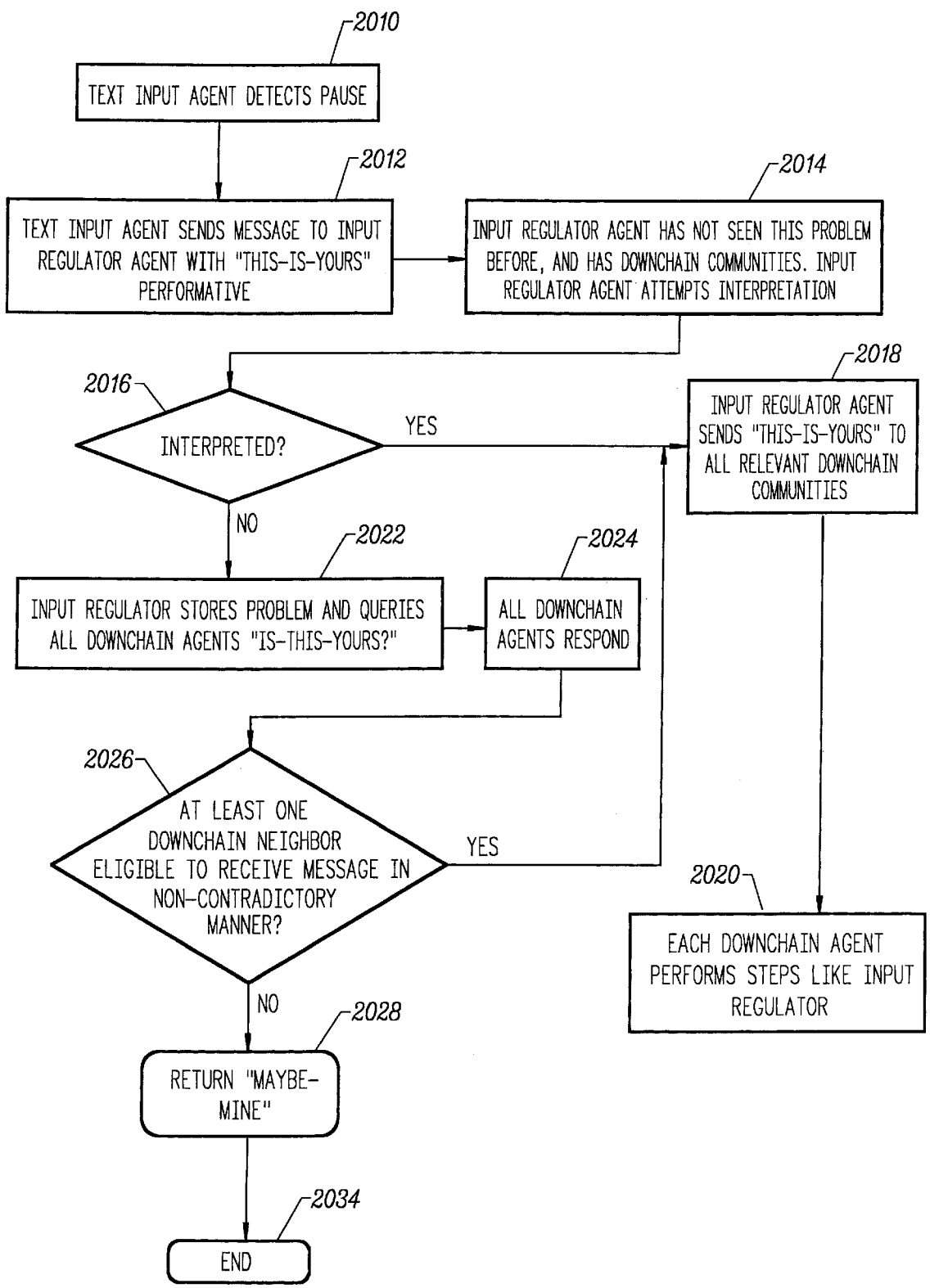
FIGS. 20, 21, 22 and 23 are flowcharts describing the sequence of operation that the network of FIG. 4 performs in response to certain typical user voice input.

Referring to FIG. 20, the flowchart begins when the Text Input agent 410 (FIG. 4) detects a pause in the user's voice input (step 2010). In step 2012, in accordance with step 1912 (FIG. 19), the Text Input agent sends the input message as it currently stands to the Input Regulator agent 414 with a THIS-IS-YOURS performative. In step 2014, it is assumed that the Input Regulator agent 414 has not seen this problem before (step 1226, FIG. 12), and does have downchain communities (step 1228, FIG. 12). Accordingly, the Input Regulator agent 414 attempts an interpretation (step 1232, FIG. 12).

In step 2016, the Input Regulator agent 414 determines whether it was able to interpret the input message (step 1234, FIG. 12). If so, then in step 2018, the Input Regulator 414 sends THIS-IS-YOURS to all relevant downchain communities identified in the interpretation policy (see step 1236, FIG. 12). In step 2020, each agent downchain of the Input Regulator agent 414 which receives such a THIS-IS-YOURS performative, recursively performs steps similar to those of FIG. 20 as described herein.

If in step 2016 the Input Regulator agent did not have an interpretation policy for this input message, then in step 2022, the Input Regulator agent 414 stores the problem in its temporary request storage unit 326 (FIG. 3) and queries all of its downchain agents with an IS-THIS-YOURS? performative (steps 1238 and 1240, FIG. 12).

Eventually, all of the agents downchain of the Input Regulator agent 414 respond to the query (step 2024). Each response passes through the Input Regulator agent's procedure implementing FIGS. 10 and 11 herein, including the application of quality criteria (step 1116) and attempts to automatically resolve contradictory claims of ownership (step 2400). The contradiction resolution attempt at this stage follows automated contradiction resolution algorithms only; the user is not yet asked for a resolution if the automated procedures fail. After all agents respond, in step 2026, the Input Regulator agent 414 determines whether it has received one or more non-contradictory claims of ownership from its downchain agents (see steps 1120 and 1136, FIG. 11). If it has, then the flow returns to step 2018, in which the Input Regulator agent sends THIS-IS-YOURS to all relevant downchain neighbors (step 1142 in FIG. 11). Each downchain neighbor then recursively performs steps similar to those of FIG. 20 as described herein.

If in step 2026 there are multiple contradictory claimants, then in step 2028, the Input Regulator agent 414 merely returns MAYBE-MINE (see step 1134, FIG. 11) to the Text Input agent 410. Receipt of a NOT-MINE performative from an agent in response to a THIS-IS-YOURS performative indicates that a contradiction has occurred. Another embodiment could use a different performative for this purpose, such as CONTRADICTION, but in the present embodiment the MAYBE-MINE performative is available and has no other meaning when received in response to a THIS-IS-YOURS performative. Upon receipt of MAYBE-MINE, in step 2034, the procedure ends and the input message is simply ignored.

Figure 21:
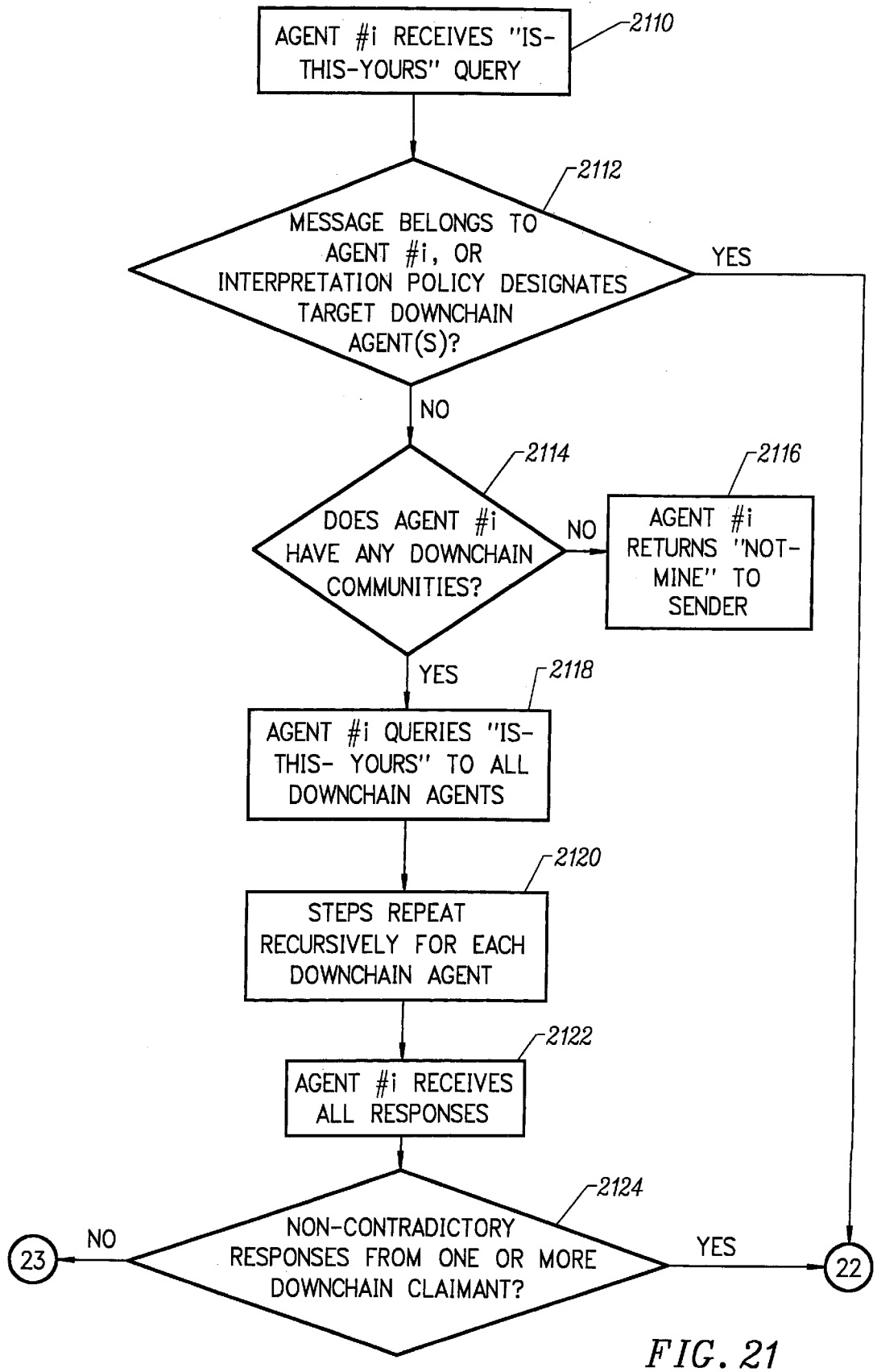
Figure 22:
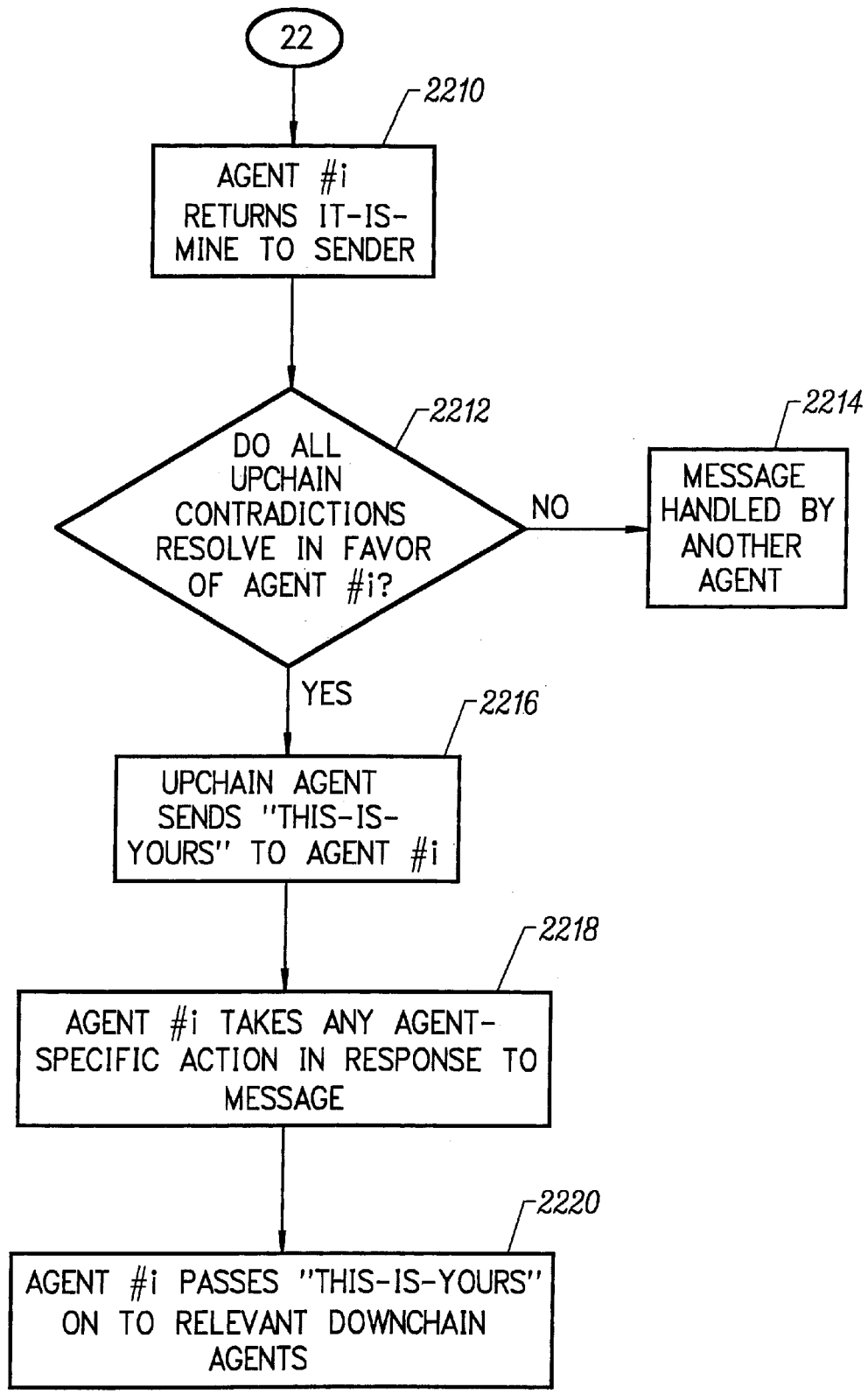
Figure 23:
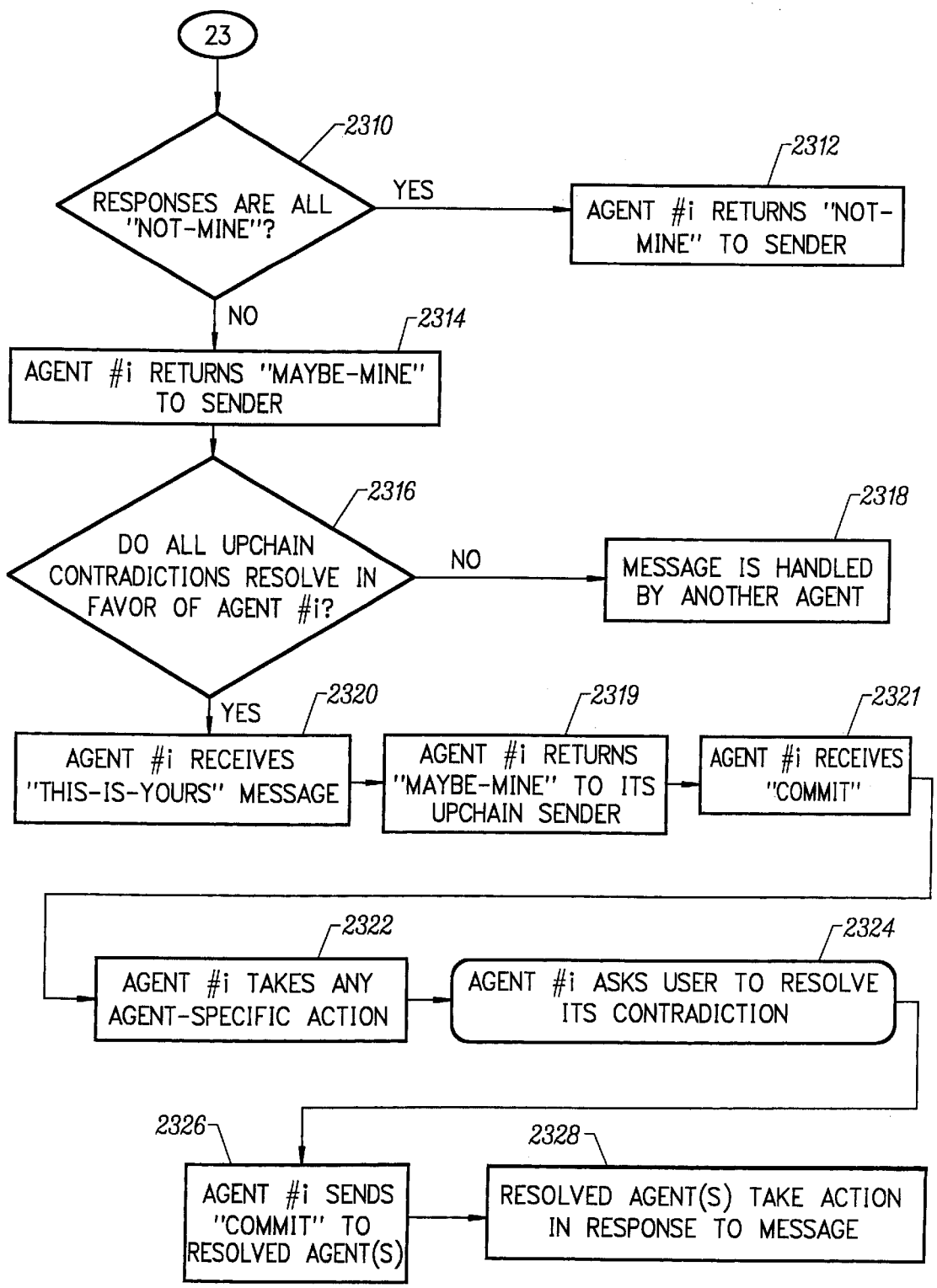

FIGS. 21, 22 and 23 describe the process that takes place in the various agents downchain of the Input Regulator agent 414, between the time that the Input Regulator agent 414 transmits IS-THIS-YOURS? performatives to its downchain neighbors (step 2022) and the time that all downchain neighbors respond (step 2024). These flowcharts 21–23 are not necessarily limited to what happens within a single agent. In a step 2110, the agent receives the query from its upchain sender. Initially, the agent will be TV agent 418 or VCR agent 420 (FIG. 4), but the flowcharts of FIGS. 21, 22 and 23 apply to any downchain agent in the network. Thus, the subject agent is referred to in these flowcharts as agent #i.

In a step 2112, the agent determines whether the message is within its own local domain of responsibility, or it knows of a downchain agent or agents who should receive the message. If so, then control transfers to the flowchart of FIG. 22, described hereinafter. If the agent does not claim the message for itself, and does not have any interpretation policy (preprogrammed or learned) stored which fits the input message, then in step 2114, the agent determines whether it has any downchain communities. If not, then in step 2116, the agent returns NOT-MINE to its upchain sender. (See step 913 in FIG. 9.) If the agent does have downchain communities, then in step 2118, it queries all its downchain communities with an IS-THIS-YOURS? performative (step 930 in FIG. 9). In step 2120, these steps repeat recursively in each downchain agent. Eventually, in step 2122, Agent #i has received all responses from its downchain agents, applying quality criteria to each response and attempting to automatically resolve contradictory claims of ownership (steps 1116 and 2400 in FIG. 11). In step 2124, Agent #i determines whether it is left with non-contradictory responses from one or more of its downchain agents claiming the message or parts of the message. If so, then control transfers to the flowchart of FIG. 22. If not, then control transfers to the flowchart of FIG. 23.

Referring to FIG. 22, in step 2210, now that Agent #i has received non-contradictory responses from one or more downchain claimants, it returns IT-IS-MINE to its upchain sending agent (FIG. 9, step 940). All of the agents in the path back up to the agent which initiated the IS-THIS-YOURS? query, in this case Input Regulator 414, perform actions similar to those set forth herein with respect to Agent #i.

The Input Regulator agent 414 transmitted its query because it had received a THIS-IS-YOURS performative from its own upchain neighbor (Text Input agent 410) in step 2022 (FIG. 20), and it had no applicable interpretation policy. After all agents downchain of the Input Regulator agent 414 have responded (step 2024), if all contradictory claims of ownership were resolvable automatically, then the Input Regulator agent sends a THIS-IS-YOURS performative to all relevant downchain communities (step 2018). One of the responses being considered by Input Regulator agent 414 might be from an agent in the path leading to Agent #i, and any resolution of contradictory claimants may or may not resolve in favor of that path. Any agents between Input Regulator agent 414 and Agent #i in the path may also have multiple claimants to resolve, and these decisions may or may not resolve in favor of the path leading to Agent #i. Returning to FIG. 22, therefore, in step 2212, the system by this process determines whether all contradictions occurring upchain of Agent #i resolve in favor of the path leading to Agent #i. If not, then in step 2214, the message will be handled by some other agent in the network (using steps such as those beginning in step 2216). If so, then eventually, in step 2216, Agent #i's upchain neighbor will eventually send a THIS-IS-YOURS performative to Agent #i. In step 2218, Agent #i takes any agent-specific action in response to the input message (as in step 1224 or 1222, FIG. 12), and in step 2220, it passes THIS-IS-YOURS on to other relevant agents downchain of Agent #i. This is the manner in which the network determines the correct path(s) to the correct ultimate leaf agent(s), and then causes each agent in the path to perform any agent-specific functions that it needs to perform in response to the message.

As mentioned, in step 2124 (FIG. 21), if the messages received from Agent #i's downchain neighbors, either all decline the message or claim the message in a contradictory manner, and the contradictions were not resolvable automatically, then control passes to the flowchart of FIG. 23. In step 2310, if all of the responses were NOT-MINE performatives, indicating that all downchain neighbors have declined the message, then in step 2312, Agent #i returns NOT-MINE to its upchain sender. Agent #i therefore will not be in any ultimately chosen path for the present input message (unless the user explicitly selects the path through the use of DISSATISFIED).

If in step 2310 Agent #i's received responses are not all NOT-MINE's, then more than one of Agent #i's neighbors have claimed the message in a contradictory manner. Depending on the quality criteria employed by Agent #i, such claims might include both MAYBE-MINE performatives received as well as IT-IS-MINE performatives received, or may be limited to only IT-IS-MINE performatives received. In any event, in step 2314, an agent which has received contradictory claims of ownership from its downchain neighbors returns MAYBE-MINE to its upchain sender (see step 1134, FIG. 11). Agent #i does not ask the user to resolve its contradiction at this time, in part because the ultimately chose path(s) for the input message might not even include Agent #i.

Eventually, as with step 2212 in FIG. 22, the system determines whether Agent #i is to be within a path of action for the input message. All upchain contradictions would have to be resolved in favor of a path leading to Agent #i for Agent #i to eventually receive the message. If that is not the case (step 2316), then in step 2318, the message is eventually handled by other agents. If Agent #i is eventually determined to be within the path for the input message (or within one of several paths for the input message), then in step 2320, it will soon receive the input message from its upchain neighbor with a THIS-IS-YOURS performative (step 2320). However, since the agent has a contradiction that it is unable to resolve through its automatic algorithms, the agent merely returns MAYBE-MINE to its upchain sender (step 2319). The system then awaits further user input.

If the user has finished inputting, and the system nevertheless has not taken action, the user may issue a COMMIT. It is assumed that the COMMIT performative eventually reaches Agent #i (step 2321). Agent #i takes any agent-specific action that is required (step 2322), and proceeds to resolve the contradiction indicated by the responses that it previously received in step 2024 to its IS-THIS-YOURS? queries. Agent #i resolves its contradiction by interacting with the user (step 2324). Then, in step 2326, it sends the message on to its resolved downchain agent(s) with the COMMIT performative. Each such downchain agent receiving the message takes appropriate action in response to the message, beginning at step 2218 of its own implementation of the flowchart of FIG. 22 (if that agent had previously received non-contradictory responses from one or more of its own downchain claiming neighbors), or at step 2321 of the flowchart of FIG. 23 (if that agent had previously received contradictory claims of ownership from its own downchain neighbors for this message).

Figure 24:
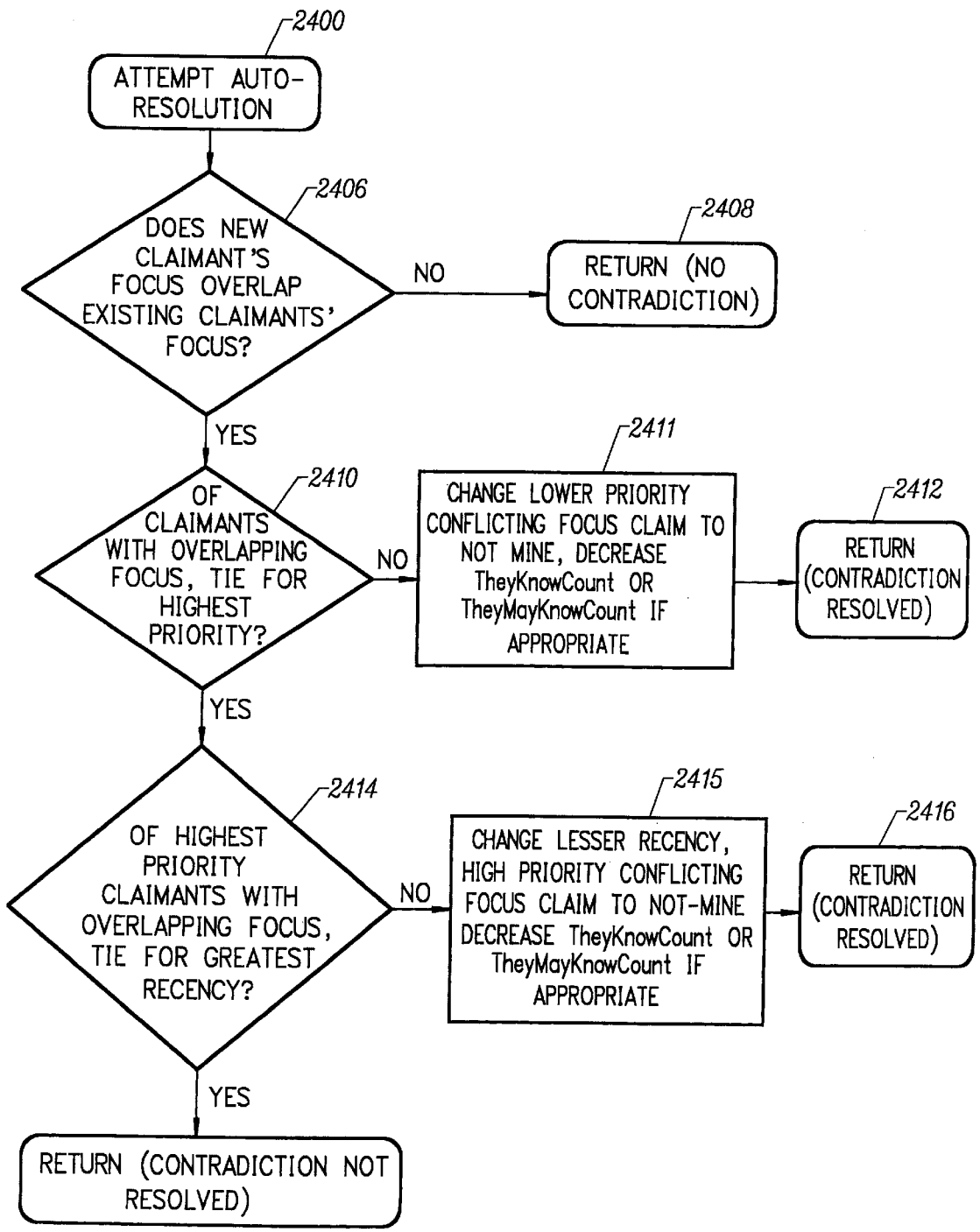
FIG. 24 is a detail of the steps taken by the agents in the network in FIGS. 20 and 23 to resolve multiple downchain claimants of a message.

FIG. 24 is a detail of the automatic steps taken by the agents in the network to resolve multiple downchain claimants of a message (step 2400 in FIG. 11). Different embodiments can use different algorithms to resolve such contradictions, and different agents within a single embodiment can use different algorithms to resolve such contradictions. However, it is desirable that all such algorithms do not interact with the user, reserving user interaction to situations in which the user evidences a desire for the system to respond despite the presence of contradictions that the system cannot resolve automatically (COMMIT performative, FIG. 11 step 1130).

In the algorithm of FIG. 24, it is assumed first that IT-IS-MINE and MAYBE-MINE responses from downchain neighbors that have been queried with an IS-THIS-YOURS? performative, carry with them an indication of the priority of the responding agent. In the present embodiment, agent priorities are preprogrammed into each agent object class. Example priorities are shown in FIG. 4, and it can be seen that agents which are closer (fewer hops) to the typical originator of IS-THIS-YOURS? queries (Input Regulator agent 414) have been assigned higher priorities than agents which are more distant (greater number of hops) from the originator agent. If an agent claims a message because of its own interpretation policy, then it passes its own priority level upchain with the IT-IS-MINE performative. If an agent claims a message only because one of its downchain agents has claimed the message, then the agent passes upchain the priority level that was specified in the downchain agent's IT-IS-MINE (MAYBE-MINE) performative. Thus, together with the choice of a performative MAYBE-MINE or IT-IS-MINE), the priority level returned with a query response indicates a confidence level with which the agent believes that it is the owner of the input message. Such indications of confidence not only can be used by upchain agents in determining whether to discard the claim of ownership, as previously described, but are also used in the contradiction resolution step of FIG. 24.

In particular, in step 2406, the agent first determines whether the focus of the newly received ownership claim (IT-IS-MINE or MAYBE-MINE) overlaps with the focus of any claim previously received. If not, then there is no contradiction and the routine returns (step 2408). If focuses do overlap, then in step 2410, the agent determines whether there is a tie, among all of its downchain neighbors claiming the message, for the highest priority level indicated by the responses with overlapping focuses. If not, then the agent whose response carried the highest priority level wins. The lower priority claim is changed in the agent's temporary request storage unit 326 to a NOT-MINE performative and, if that claim had previously caused either TheyKnowCount or TheyMayKnowCount to be incremented, such count is now decremented (step 2411). The routine then returns with the contradiction resolved (step 2412).

If there is a tie in priority levels among ownership claims with overlapping focus, then resolution continues at the next stage of the algorithm, determining which of the highest priority claimants with overlapping focus had received an input message most recently (step 2414). This stage of the algorithm is predicated on the observation that when a user makes a request related to one part of the home entertainment system 138, the user's next request is more likely than not to relate to the same component. For example, the user might say, "Turn the volume up!", followed by "Up!". If the first of these requests resolves eventually to leaf agent 430 in FIG. 4 (the Sound agent), then it is likely that the second of these requests also should be resolved to the same agent, rather than to Channel agent 434 in FIG. 4, for example. Accordingly, returning to FIG. 24, if in step 2414, the agent determines that of the two or more claiming agents with overlapping focus and having the highest priority, they are nevertheless distinguishable on the basis of recency, then in step 2415, the claim having weaker recency is changed to a NOT-MINE and TheyKnowCount or TheyMayKnowCount is (if appropriate) decremented. In step 2416 the routine returns with the contradiction having been resolved.

If neither of the first two stages of the contradiction resolution algorithm were able to resolve the contradiction, then in step 2418, the routine returns without having resolved the contradiction. If in the future a COMMIT performative forces the agent to resolve the contradiction, it will do so by asking the user which of its downchain neighbors should receive the input message (See step 1130, FIG. 11). This may be accomplished by, for example, offering the user the names or descriptions of such downchain neighbors. In one embodiment, the agent offers all of its downchain neighbors for selection. In another embodiment, the agent first narrows the choices to be offered to the user in accordance with one or more of the automatic tests of its contradiction resolution algorithm, such as the tests of steps 2410 and 2414. In any event, the user eventually responds and the system learns the response in accordance with the flowchart of FIG. 13.

EXAMPLE

As an example of system message flow, assume Text Input agent 410 (FIG. 4) detects a user voice-input message, "Picture to the right." It passes the message to the Input Regulator agent 414 with a THIS-IS-YOURS performative. Assuming the Input Regulator agent 414 has no interpretation policy for this input message, it sends an IS-THIS-YOURS? query to both the TV agent 418 and the VCR agent 420. The VCR agent 420 also cannot interpret the message, so it sends IS-THIS-YOURS? performatives on to each of its own downchain neighbors 424 and 426. After further communication among agents in the VCR subnetwork, eventually the VCR agent 420 receives NOT-MINE from all of its downchain neighbors. It therefore responds NOT-MINE to the Input Regulator agent 414.

In the meantime, TV agent 418 does have an interpretation policy for the input message, namely that all messages containing the word "Picture" are within the domain of responsibility of Viewport agent 432. It therefore returns IT-IS-MINE to the Input Regulator agent 414. Since the Input Regulator agent 414 has now received exactly one response claiming the input message (that from TV agent 418), it sends the message back to TV agent 418, this time with a THIS-IS-YOURS performative. TV agent 418 performs any special processing local to that agent (which in this case is none), and passes the THIS-IS-YOURS performative on to the viewport agent 432 in accordance with its interpretation policy. Viewport agent 432 performs any special processing local to that agent. Then, since the Viewport agent 432 does have downchain neighbors (Magnification and Shifting agents 436 and 438, respectively), and it does not yet know which if any of such neighbors should now receive the input message, it queries both of its downchain communities by sending them IS-THIS-YOURS? messages. It then waits until it has received responses from all agents it has queried.

The Magnification agent 436, not itself recognizing any word in the input message and not having any downchain communities (TV actuator does not count, because it has not advertised itself as having any particular domain of responsibility), responds with NOT-MINE. The Shifting agent community 438 does recognize the input message as belonging to the Right Agent 440 (because of the presence of the word "right" in the message text), so it claims the message by returning an IT-IS-MINE message to the Viewport agent 432. Viewport agent 432, which was the originator of the present query, has now received exactly one IT-IS-MINE response. It therefore knows that the message belongs to Shifting agent 438. It transmits the message again to Shifting agent 438, this time with a THIS-IS-YOURS performative. The Shifting agent 438 compares the input message to its stored list of problems (in temporary request storage unit 326), and determines that it has previously seen this problem and that the message belongs to Right agent 440. Thus, Shifting agent 438 retransmits the input message to Right agent 440 with a THIS-IS-YOURS performative. The Right agent 440, in its local processing step 1222 (FIG. 12), instructs TV Actuator 444 to cause the home entertainment system 138 to make the proper adjustment in response thereto.

Assume that Shifting agent 438 does not have a pre-existing interpretation policy which applies to the phrase, "TV to the right." In this case, upon receipt of the IS-THIS-YOURS? query from Viewport agent 432, instead of responding IT-IS-MINE, it responds NOT-MINE. Viewport agent 432 therefore receives all NOT-MINE's from its downchain neighbors, even though it has received a THIS-IS-YOURS performative from TV agent 418. This agent now has a contradiction. The agent therefore returns MAYBE-MINE to the TV agent 418, and this message is passed back up the chain to Text Input agent 410, where it dissipates with the system simply awaiting further input.

Assume that the user recognizes that the system is not going to perform the intended action, and issues a Commit indication. Text Input agent 410 recognizes this and transmits a COMMIT performative to Input Regulator agent 414. Input Regulator agent 414 has already seen the subject problem and previously determined that the message belongs to the TV subnetwork. It therefore passes the message on to TV agent 418 with a COMMIT performative. TV agent 418 also determines that it has seen the subject problem before and previously determined that the message belongs to the Viewport subnetwork. It therefore passes the message on to the Viewport agent 432 with a COMMIT performative. Viewport agent 432 also determines that it has previously seen the subject problem, and further that it has a contradiction. The COMMIT performative requires the Viewport agent 432 to resolve its contradiction. Since in this case the contradiction is in the form of NOT-MINE responses received from all of the Viewport agent's downchain communities, it interacts with the user to resolve the contradiction. For example, it asks the user, "Do you mean Magnification or Shifting?" The user answers "Shifting."

Upon receipt of the user's answer, the Viewport agent learns an interpretation policy such as (depending on the particular learning algorithm used), that input messages containing the word "Right" should be routed to the Shifting agent community 438. It then sends an UNLEARN performative to each upchain neighbor of Viewport agent 432. The only agent neighbor upchain of Viewport agent 432 is TV agent 418, which does not currently have an interpretation policy for messages containing the word "Right". TV agent 418 therefore ignores the UNLEARN message.

After learning the new interpretation policy and sending the UNLEARN message, Viewport agent 432 sends the message on to Shifting agent 438 with a COMMIT performative. Shifting agent 438 also has a contradiction, having previously received NOT-MINE responses from both of its downchain neighbors in response to its prior query on the subject problem. It therefore interacts with the user as above and determines that the message should be routed to the Right agent 440. Shifting agent 438 learns the new interpretation policy and sends an UNLEARN performative to its upchain neighbor, Viewport agent 432. Viewport agent 432 removes its previously learned interpretation policy in response to the UNLEARN performative, thereby eliminating a learning redundancy in the network and localizing the learned policy more closely to the ultimate proper leaf agent.

After learning the new interpretation policy and sending the UNLEARN message, Shifting agent 438 finally sends the message to Right agent 440 with the COMMIT performative. Right agent 440 acts on the message (step 1222, FIG. 12) in the only way it knows how, by sending an AGENT-SPECIFIC performative to TV Actuator 444 to cause it to move the viewport to the right by an increment. In this way the network learns, in a properly localized manner, that messages containing the words "Picture" and "Right" should be routed through TV agent 418 to Right agent 440.

Industrial Applicability

In conventional multi-agent systems, the problems of learning have been largely ignored. Designing agents that would learn about anything in the world goes against the basic philosophy of distributed artificial intelligence. This may be one reason why some conventional systems are ill-behaved (the more they learn, the slower they perform). By allowing the agents to adapt, refine and improve, automatically or under user control, a holistic system can be created in which the whole is significantly more than the sum of its parts.

In the embodiment described herein, the combination of machine learning and multi-agent systems has benefits for both. Multi-agent systems having learning capabilities can reduce cost, time, and resources and increase quality in a number of forms:

Ease of programming

Ease of maintenance

Widened scope of application

Efficiency

Coordination of activity

On the other hand machine learning in a multi-agent set-up becomes faster and more robust.

The agents described herein are adaptable in the following ways:

The ability of the system to accept new agents at run time,

The ability of each agent to adapt its behavior according to the feedback it receives (i.e., learning).

Viewing software as a network of Agents (considered as intelligent beings) can result in designs that are much different in structure and modularization than conventional multi-agent designs. Some of the benefits of this approach are noted here.

Flexibility: There is no rigid predetermination of valid input messages.

Parallelism: The independent nature of the agents creates a potentially parallel design approach. In particular, for example, different agents can run on different processors.

Multi platform execution: Agents can run and communicate over networks of computers (on the Internet for instance).

Runtime addition of new agents and thus incremental development of software.

Software additions by different designers: different designers can introduce different agents to compete in the software, making this design methodology attractive for commercial applications.

Reusability of agents.

Incremental design and evaluation.

Learning and Intelligence: The distributed nature of learning as described herein suggests a powerful adaptive software design that potentially breaks down an application to a network of simple learning modules.

Natural Language Processing: This work suggests a potentially powerful way of processing natural language input in a distributed and adaptive manner.

Sample Source Code

Set forth in Appendix I is sample Java code for the main object class used by the agents in the network of FIG. 4. Appendix II contains Java code illustrating the object class for a Text Input agent, such as agent 410 (FIG. 4). Appendix III contains Java code implementing the object class for an input regulator agent like Input Regulator agent 414 (FIG. 4). Appendix IV contains Java code illustrating the object class for a Menu agent, which implements a TV Actuator agent such as 444 (FIG. 4).

Figure 25:
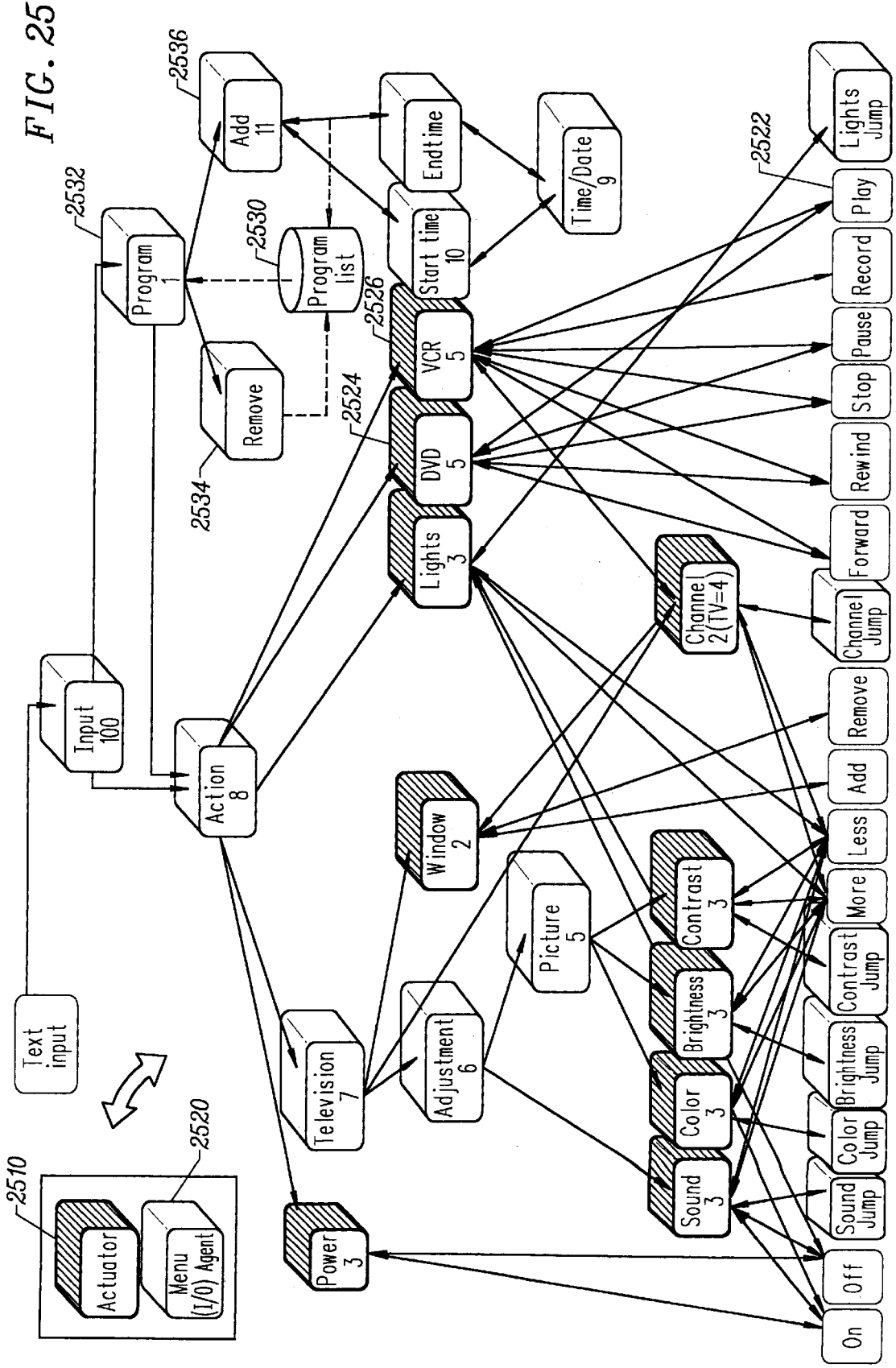
FIG. 25 is a partial diagram of an alternate network of agent communities within the agent-oriented interpretation unit of FIG. 2.

In addition, FIG. 25 illustrates an alternative agent network diagram for controlling the home entertainment system 138. In FIG. 25, the dark three-dimensional units communicate with both the actuator 2510 and the menu agent 2520, whereas the lighter shaded three-dimensional units communicate with the menu agent 2520 but not with the actuator 2510. The two-dimensional units are proxy agents only, and do not communicate with either the actuator 2510 or the menu agent 2520. They do perform interpretation functions, but the only local work they perform is to notify an upchain neighbor to perform relevant work. For example, the Play agent 2522, which is downchain of both the DVD agent 2524 and the VCR agent 2526, interprets "Play" commands for both the DVD and VCR agents. But when the Play agent 2522 finally receives a THIS-IS-YOURS performative, its black-box function merely requests the DVD agent 2524 or the VCR agent 2526, as the case may be, to activate the Play function of the home entertainment system 138. This request, which is communicated via an AGENT-SPECIFIC PERFORMATIVE, permits all DVD-related functions (and VCR-related functions) to be controlled and maintained in the black-box of a single agent (the DVD agent 2524 or the VCR agent 2526).

Program list 2530 in FIG. 25 is merely a small database which is accessible from the black-box software of Program agent 2532, Remove agent 2534, and Add agent 2536. The Program list 2530 contains user-programmed requests for actions to take place with respect to the home entertainment system 138 at specified future times.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. For example, although the embodiment described herein is shown implemented in software running on a single-processor computer system, it will be appreciated that other embodiments can run on multi-processor systems, or can be distributed across multiple computer systems or microcomputers communicating, for example, via TCP/EP. In addition, some or all agents can be implemented in hardware, rather than software. Other variations will be apparent. As another example, whereas the described embodiment attempts automatic contradiction resolution in response to each query response received from downchain agents, another embodiment could collect all responses and attempt automatic contradiction resolution only upon receipt of a COMMIT performative or its equivalent. The embodiments described herein were chosen in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

APPENDIX I
Sample Agent Class Prototype
Copyright © 1998 by Babak Hodjat
and Dejima Corporation

```java
// Agent class
package AAOSA3;
    import java.util.*;
    import java.awt.*;
    import java.beans.*;
    import borland.jbcl.ccntrol.*;
    public class Agent extends DecoratedFrame implements AgentEventListener, Runnable {
        private Vector listeners = new Vector() ; // list of listeners
        public synchronized void
            addAgentEventListener(AgentEventListener aEventListener) {
                        listeners.addElement(aEventListener) ;
        }
        public synchronized void
            removeAgentEventListener(AgentEventListener aEventListener) {
                        listeners.removeElement(aEventListener) ;
        }
        protected void notifyAgentEventListeners() {
                Vector 1 ;
                AgentEvent e = new AgentEvent(this) ;
                synchronized(this) { 1 = (Vector)listeners.clone() ; }
                for (int i=0 ; i < 1.size() ; i++) { // deliver the event
                    ((AgentEventListener)1.elementAt(i)).aEventFired(e) ;
                }
        }
        // deliver the agent event to registered listeners
        protected void notifyAgentEventListeners(AgentEvent e) {
                Vector 1 ;
                synchronized(this) { 1 = (Vector)listeners.clone() ; }
                for (int i=0 ; i < 1.size() ; i++) { // deliver the event
                    ((AgentEventListener)1.elementAt(i)).aEventFired(e) ;
                }
        }
        public void aEventWired(AgentEvent e) {
                Systemn.out.println( "Agent: AgentEvent received by " + name +
                                "from" + e.getSource() + " with args " + e.getArgObject()) ;
        }
        String name ;                                          // the agent's name
        public string getName()    { return name ; }
        public void setName(String Name) {
            String oldName = name ;
            name = Name ;
            changes.firePropertyChange ("name", oldName, name) ;
        }
        private PropertyChangeSupport changes = new PropertyChangeSupport(this) ;
        public Agent() { name = "Agent"; }
        public Agent (String Name) { name = Name ;
        public void process() { };    // perform the major processing function
        public void reset() { };    // reset the agent to a known state
        public void initialize() { };    // initialize the agent for processing
        // required by Runnable interface and Threads
        Thread runnit = new Thread() ; // start()ed in the process() method
        boolean stopped = false; // control flag
        public void stop() { } ;    // stop the agent thread
        public void run() { } ;    // body of thread
};
//************************
//
// AAOSAAgent class prototype.
// All AAOSAagents should be completed extensions of this class.
// AAOSAAgents don't send messages to themselves.
package AAOSA3;
    import java.util.*;
    public class AAOSAAgent extends Agent implements AAOSAConstants{
        static final String MY_NAME = "AAOSAAgent1";
        static final int MY_PRIORITY = 0;
        static final String MY_COMMUNITY = "AAOSAAgent";
/* The code in this comment should always begin any extensions of this class.
// registers should always be bothways (unless not using routing features).
//   Note that the agent name should be replaced.
        private static <AgentName> instance = null; //singleton
        //in Singleton design pattern, used to get single instance
        static public <AgentName> Instance() {
                    if (instance == null) {
                            instance = new <AgentName>("Input") ;
                    }
```

APPENDIX I
Sample Agent Class Prototype
Copyright © 1998 by Babak Hodjat
and Dejima Corporation

```
                    return instance;
            }
            public static synchronized void register(AgentEvent e) {
                            if (instance == null) instance = new <AgentName>() ;
                            if (!instance.knownAgents.containsKey(((Agent)e.getSource()).getName())) {
                                    instance.knownAgents.put(((Agent)e.getsource()).getName(), e.getsource ()) ;
                                    ((Agent)e.getSource()).addAgentEventListener(instance) ;
                                    instance.addAgentEventListener((Agent)e.getsource()) ;
                            } else System.out.println(instance.name + " did not register " +
((Agent)e.getSource()).getName()) ;
            }
*/
        int priority; //AAOSA Agent's priority level
        public AAOSAAgent() { super() ; name = MY_NAME; priority = MY_PRIORITY;}
        public AAOSAAgent(String Name) { super (Name) ; priority = MY_PRIORITY;} ;
        public AAOSAAgent(String Name, int Priority) { super(Name) ; priority = Priority;} ;
        Hashtable knownAgents = new Hashtable() ;    // agent name is key, agent object is value
        Hashtable communities = new Hashtable() ;    // domain name is key, vector of agent object is
value
        Hashtable problems = new Hashtable() ; // reguest-content is key, request message is value
        Hashtable learned = new Hashtable() ; // request-content is key, request meessage is value
        Hashtable explanations = new Hashtable() ; // agent name is key, explanaticn of agent's domain is
value
        Hashtable recency = new Hashtable() ; // agent name is key, recency of agent's delegation is
value
        AgentMessage msg ;    // current message being processed
        AgentMessage lastMessage = new AgentMessage() ;
        AgentStatus tempStatus;
        String processedItem;
        String AgentsWhoKnow = EMPTY_STRING;
        String AgentsWhoMayKnow = EMPTY_STRING;
        boolean onFocuses = false;
        String resultingFocus = EMPTY_STRING;
        public void reset() {
              knownAgents = new Hashtable() ;    // clear all agents
              communities = new Hashtable() ;    // clear all communities
              problems = new Hashtable() ;    // clear all problems
              learned = new Hashtable() ;    // clear all learned
              explanations = new Hashtable() ;    // clear all explanations
              recency = new Hashtable() ;    // clear all recencies!
        }
        public void process() {
              stopped = false ;
              runnit = new Thread(this) ;
              runnit.start() ;
        }
    public void stop() {
            stopped = true;
            runnit.step() ;
}
      // method of Runnable (Thread) interface
      public void run() {
              while (stopped = false) {
                          try {
                                      Thread.sleep((long)SLEEP_DURATION) ;
                          }
                          catch (InterruptedException e)
                          {
                               // interrupted
                          }
                          // do any housekeeping here !!!
                          polling() ;
              }
    }
        public void aEventFired(AgentEvent e) {
                Object arg = e.getArgObject() ;
                mag = (AgentMessage)arg ;
                route(msg) ;
        }
        public class Interpretation {
                        String result = EMPTY_STRING;
                        String remainderRequest = EMPTY_STRING;
                        String afterRequest = EMPTY_STRING;
                        String beforeRequest = EMPTY_STRING;
```

APPENDIX I
Sample Agent Class Prototype
Copyright © 1998 by Babak Hodjat
and Dejima Corporation

```
                    String newRequest = EMPTY_STRING;
                    int index = NONE;
                    public Interpretation() {
                    }
                    public Interpretation(   String Result,
                                             String RemainderRequest,
                                             String AfterRequest,
                                             String BeforeRquest,
                                             String NewRequest) {
                              result = Result;
                              remainderRequest = RemainderRequest;
                              afterRequest = AfterRequest;
                              beforeRequest = BeforeRequest;
                              newRequest = NewRequest;
                    }
          }
          public synchronized void d(String outString) {
                    System.out.println("DEBUG [" + name + "]: " + outString) ;
          }
          public synchronized Interpretation interpretIt(String item, String processedItem, AgentMessage
msg) {
                    //This is an extremely simple minded, text-based interpretation policy.
                    //It can be improved in extensions.
                    int ti;
                    boolean exactSearch;
                    String tempMatch;
                    Interpretation interpretation = new Interpretation() ;
                    for (Enumeration learnedCategories = learned.keys() ; learnedCateguries.hasMoreElements() ;
) {//check learned interpretations
                              tempMatch = (String)learnedCateguries.nextElement() ;
                              if (tempMatch.indexOf(EXACT_MATCH) == 0) {
                                        exactSearch = true;
                                        interpretation.result = tempMatch.substring(EXACT_MATCH.length(), tempMatch.length()} ;
                              } else {
                                        exactSearch = false;
                                        interpretation.result = tempMatch;
                              }
                              if (((interpretation.index = processedItem.indexOf(interpretation.result)} > NONE) &&
                                        ((!exactSearch) ||
                                        (((interpretation.index == 0) ||
                                        (processedItem.charAt(interpretation.index - 1) == ' ')) &&
                                        ((interpretation.index + interpretation.result.length() == processedItem.length() ||
                                        (processedItem.charAt(interpretation.index + interpretation.result.length() == '
')))) {
                                        interpretation.afterRequest = processedItem.substring(interpretation.index +
interpretation.result.length(), processedItem.length()) ;
                                        interpretation.beforeRequest = processedItem.substring(0, interpretation.index) ;
                                        interpretation.remainderRequest = interpretation.beforeRequest +
interpretation.afterRequest;
                                        interpretation.newRequest = processedItem;
                                        interpretation.result = (String)learned.get(tempMatch) ;
                                        return interpretation;
                              }
                    }
                    return null;
          }
          public class NumberInString {
                    int theNumber = NONE;
                    String remainderString = EMPTY_STRING;
                    int index = NONE;
                    int MAX_NUMBEBS = 20;
                    String [] numberStrings = new String [] {  "zero", "one", "two", "three", "four", "five",
"six", "seven", "eight", "nine",
                                                                                         "ten", "eleven", "twelve", "thirteen", "fourteen",
"fifteen", "sixteen", "seventeen",
                                                                                         "eighteen", "ninteen", "twenty") ;
                    public NumberInString() {
                    }
                    public synchronized boolean find(String request) { //*There are much better ways of doing
this, I know!
                              int counter;
                              int temp2;
                              for (counter = MAX_NUMBER_IN_REQUEST; counter >= -10; counter--)
                                        if ((temp2 = request.indexOf(Integer.toString(counter))) > NONE)
```

APPENDIX I
Sample Agent Class Prototype
Copyright © 1998 by Babak Hodjat
and Dejima Corporation

```
                                    if (((temp2 = 0) ||
                                         (request.charAt(temp2 - 1) == ' ')) &&
                                        ((temp2 + Integer.toString(counter).length() == request.length()) ||
                                         (request.charAt(temp2 + Integer.toString(counter).length()) == ' '))) {
                                        theNumber = counter;
                                        remainderString = request.substring(0, temp2) +
                                                          request.substring(temp2 +
Integer.toString(theNumber).length(), request.length()) ;
                                        index = temp2;
                                        return true;
                                    } //else return false;
                            for (int numbers = MAX_NUMBERS; (numbers > NONE) ; numbers--)
                                if (((temp2 = request.indexOf(numberStrings[numbers])) > NONE) &&
                                        ((temp2 == 0) || (request.charAt(temp2 - 1) == ' ')) &&
                                        ((temp2 + numberStrings[numbers].length() == request.length()) ||
                                         (request.charAt(temp2 + numberStrings[numbers].length()) == ' '))
                                    ) {
                                    theNumber = numbers;
                                    remainderString = request.substring(0, temp2) +
                                                      request.substring(temp2 + numbsrStrings[numbers].length(),
request.length()) ;
                                    index = temp2;
                                    return true;
                                }
                            return false;
                        }
                        public synchronized boolean numberBetween(int lowerLimit, int upperLimit) {
                                       return ((theNumber >= lowerLimit) && (theNumber <= upperLimit)) ;
                        }
}
public synchronized void sendMessage( Agent receiver,
                                      String performative,
                                      String content,
                                      string InReplyTo,
                                      String ReplyWith,
                                      String Language) {
                        AgentMessage msg = new AgentMessage(  performative,
                                                              content,
                                                              InReplyTo,
                                                              Language,
                                                              Integer.toString(priority),
                                                              receiver.name,
                                                              ReplyWith,
                                                              name) ;
                        msg.display() ;
                        receiver.aEventFired(new AgentEvent(this, msg)) ;
}
public synchronized void sendMssage(  Agent receiver,
                                      String performative,
                                      String content,
                                      String InReplyTo,
                                      String ReplyWith,
                                      String Language,
                                      int MessagePriority) {
                        AgentMessage msg = new AgentMessage( performative,
                                                             content,
                                                             InReplyTo,
                                                             Language,
                                                             Integer.toString(MessagePriority),
                                                             receiver.name,
                                                             ReplyWith,
                                                             name) ;
                        msg.display() ;
                        receiver.aEventFired(new AgentEvent(this, msg)) ;
}
public synchronized void sendMessage( Agent receiver,
                                      String performative,
                                      String content,
                                      String InReplyTo,
                                      String ReplyWith,
                                      String PriorityString,
                                      String Language) {
                        AgentMessage msg = new AgentMessage( performative,
                                                             content,
```

-continued

APPENDIX I
Sample Agent Class Prototype
Copyright © 1998 by Babak Hodjat
and Dejima Corporation

```
                                        InReplyTo,
                                        Language,
                                        PriorityString,
                                        receiver.name,
                                        ReplyWith,
                                        name) ;
                msg.display() ;
                receiver.aEventFired(new AgentEvent(this, msg)) ;
        }
        public synchronized long getCurrentTime() {
        Calendar rightNow = Calendar.getInstance() ;
        return (rightNow.get(Calendar.MINUTE) + rightNow.get(Calendar.HOUR_OF_DAY) * 60 +
rightNow.get(Calendar.DAY_OF_YEAR) * 1440) ;
        }
        public synchronized void initializations() {}
        public synchronized void startupDefaults() {}
        public synchronized void learn(AgentStatus status, String whichGroup, String whichAgent) {
        //This is an extremely simple minded, text-based learning Algorithm.
        //It can be improved in extensions.
                if (learned.containsKey(status.message.content toLowerCase().trim ()))//resolve contradiction
    (brutally!)
                        learned.remove(status.message.content.toLowerCase().trim ()) ;
                else if (learned.containsKey(EXACT_MATCH + status.message.content.toLowerCase().trim()))
                                learned.remove(EXACT_MATCH + status.message.content.toLowerCase().trim()) ;
                learned.put(EXACT_MATCH + status.message.content.toLowerCase().trim(),
whichGroup.toLowerCase().trim()) ;
        }
        public synchronized void unlearn(String item) {
        //This is an extremely simple minded, test-based un-learning Algorithm.
        //It can be improved in extensions,
                                learned.remove(EXACT_MATCH + item.toLowerCase().trim()) ;
        }
        public synchronized void polling() {
        //Will be executed everytime the agent comes alive.
        }
        public synchronized void processOtherMessages(AgentMessage msg) {
        //for instance commitment replies.
        }
        public synchronized String processIt (String item) {
        //This is an extremely simple minded, text-based process.
        //It can be improved in extensions.
                        return item.toLowercase().trim() ;
        }
        public synchronized String unProcessIt (String item) {
        //This is an extremely simple minded, text-based unprocess.
        //It can be improved in extensions.
                        return item.toLowerCase().trim()
        }
        public synchronized String toWhom(String item, String processedItem, String whichGroup) {
                        return null;
        }
        public synchronized booleen tagged(String item, String symbol, String Name) {
                        return (item.indexOf(symbol + Name + symbol) != NONE) ;
        }
        public synchronized String tag(String item, String delimiter) {
                        return delimiter + item + delimiter;
        }
        public synchronized void perform(AgentMessage msg, Agent sender, boolean optimise) {
                int index;
                Agent agent = null;
                String whichAgent;
                String item = msg.content ;
                if ((msg.performative.equals(THIS_IS_YOURS)) || (msg.performative.equals(DISSATISFIED)))
                        processedItem = processIt(item) ;//Normally should not change item.
                else if (msg.performative.equals(RESTORE))
                                processedItem = unProcessIt(item) ;
                        else processedItem = item.toLowerCase().trim() ;
                Interpretation interpretation = interpretIt(item, processedItem, msg) ;
                // If I don't have any communities under me I should return NOT-MINE
                if (communities.size() == 0) {
                        if (msg.performative.equals(IS_THIS_YOURS))
                                if (interpretation == null)
                                        sendMessage( sender, NOT_MINE, processedItem, msg.inReplyTo, msg.replyWith,
    msg.content) ;
```

-continued

APPENDIX I
Sample Agent Class Prototype
Copyright © 1998 by Babak Hodjat
and Dejima Corporation

```
                    else {
                        msg.language = interpretation.remainderRequest;
                        sendMessage( sender, IT_IS_MINE, processedItem, msg.inReplyTo, msg.replyWith,
    msg.language) ;
                    }
                    return;
                }
                tempStatus = new AgentStatus(   new AgentMessage (msg), EMPTY_STRING,
                                                newAgentMessage(lastMessage), 0, EMPTY_STRING,
                                                EMPTY_STRING, EMPTY_STRING) ;
                while (interpretation != null) {
                    msg.language = interpretation.remainderRequest;
                    Vector agents = (vector)communities.get(interpretation.result) ;
                    if ((whichAgent = toWhom(item, processedItem, interpretation.result)) == null) {
                        int num = agents.size() ;
                        for (index = 0; index < num; index++) {
                            agent = (Agent)agents elementAt(index) ; // First agent?
                            if (tagged(tempStatus.interpretations, IT_IS_MINE, agent.name))
                                interpretation = null;
                            else tempStatus.interpretations = tempStatus.interpretations + tag(agent.name,
    IT_IS_MINE) +
                                                    interpretation.remainderRequest + NUMBER_DELIMITER;
                        }
                    } else if (tagged(tempStatus.interpretations, IT_IS_MINE, whichAgent))
                                interpretation = null;
                            else tempStatus.interpretations = tempStatus.interpretations + tag (whichAgent,
    IT_IS_MINE) +
                                                    interpretation.remainderRequest + NUMBER_DELIMITER;
                    if (interpretation != null) {
                        if (!communities.containsKey(interpretation.result))
                            System.out.println("WARNING! [" + name + "]: Strange Interpretation for +
    msg.content + " ==>, " +
                                                interpretation.result + ":" + learned + "\n") ;
                        interpretation = interpretIt(item, interpretation.remainderRequest, msg) ;
                    }
                }
                if (!problems.containsKey(msg.replyWith))
                    problemns.put(msg.repyWith, tempStatus) ;
                if (tagged(msg.inReplyTo, EMPTY_STRING, COMMIT))
                    sendMessage(agent, THIS_IS_YOURS, msg.content, msg.inReplyTo + tag(name, THIS_IS_YOURS),
    msg.replyWith, msg.language) ;
                    else if (tagged(msg.inReplyTo, EMPTY_STRING, DISSATISFIED))
                    sendMessage(agent, DISSATISFIED, msg.content, msg.inReplyTo + tag(name, THIS_IS_YOURS),
    msg.replyWith, msg.language) ;
                    else
                        for (Enumeration agents = knownAgents.elements() ; agents.hasMoreElements() ; ) {
                            agent = (Agent)agents.nextElement() ;
                            if ((!agent.name.equals(sender.name)) &&
                                    (!getCommunity(agent.name.toLowerCase() .trim()) .equals(EMPTY_STRING)))
                                sendMessage( agent, IS_THIS_YOURS, msg.content,
                                                    msg.inReplyTo + tag(name, IS_THIS_YOURS),
                                                    msg.replyWith, msg.language) ;
                        }
                if (tagged(msg.inReplyTo, EMPTY_STRING, COMMIT)) {
                    Enumeration childAgents = knownAgents.elements() ; // clean-up (only for agents that are not
    involved)
                    Agent tempAgent;
                    for (index = 1; childAgents.hasMoreElements() ; index++) {
                        tempAgent = (Agent)childAgents.nextElement() ;
                        if    ((tempStatus != null) && //if it has been a problem for this agent
                                (!tempAgent.name.equals(sender.name)) &&
                                (!getCommunity(tempAgent.name.toLowerCase() .trim()) .equals(EMPTY_STRING)) &&
                                (!tempAgent.name.equals(agent.name)))//Tell all your children to remove this from
    their problems.
                            sendMessage(tempAgent, FORGET_PROBLEM, msg.content, EMPTY_STRING, msg.replyWith,
    msg.language) ;
                    }
                }
            }
            public synchronized String getCommunity(String targetName) {
            String temp;
            int num;
            int ind;
            Agent agent;
```

-continued

APPENDIX I
Sample Agent Class Prototype
Copyright © 1998 by Babak Hodjat
and Dejima Corporation

```
        Vector agents;
            for (Enumeration cat = communities.keys() ; cat.hasMoreElements() ;) {
                temp = (String)cat.nextElement() ;
                agents = (Vector)communities.get(temp) ;
                num = agents.size() ;
                for (ind = 0; ind < num; ind++) {
                    agent = (Agent)agents.elementAt(ind) ;
                    if (agent.name.toLowerCase() .trim() .equals(targetName)) return temp;
                }
            }
            return EMPTY_STRING;
        }
        public synchronized String unexplain(String targetName) {
        String temp;
                        for (Enumeration cat = explanations.keys() ; cat.hasMoreElements() ;) {
                                temp = (String)cat.nextElement() ;
                                if (targetName.equals((String)explanations.get(temp)))
                                        return temp;
                        }
                        return targeName;
        }
        public synchronized String makeQuestionString(AgentStatus tempStatus, Agent sender) {
                        int index;
                        Agent agent;
                        Enumeration agents = knownAgents.elements() ;
                        String question = EMPTY_STRING;
                        if ((tempStatus.notMineAgentList.indexOf(IT_IS_MINE) > NONE) ||
                                (tempStatus.notMineAgentList.indexOf(MAYBE_MINE) > NONE)) {
                            for (index = 1; agents.hasMoreElements() ; index++) {
                                agent = (Agent)agents.nextElement() ;
                                if    ((!agent.name.equals(sender.name) &&
                                    (!getCommunity(agent.name.toLowerCase() .trim()) .equals(EMPTY_STRING)) &&
                                    (((tempStatus.notMineAgentList.indexOf(tag(agent.name, IT_IS_MINE)) > NONE)) ||
                                    ((tempStatus.notMineAgentList.indexOf(tag(agent.name, MAYBE_MINE)) > NONE)) ||
                                    (tempStatus.notMineAgentList.indexOf(agent.name) < 0))) {
                                        String temp =
(String) explanations.get(getCommunity(agent.name.toLowerCase() .trim())) ;
                                        if (question.indexOf(temp) < 0)
                                            question = question + temp + OPTION_SEPARATOR;
                                }
                            }
                        } else {
                            for (index = 1; agents.hasMoreElements() ; index++) {
                                agent = (Agent)agents.nextElement() ;
                                if    ((!agent.name.equals(sender.name)) &&
                                    (!getCommunity(agent.name.toLowerCase() .trim()) .equals(EMPTY_STRING)) &&
                                    (tempStatus.notMineAgentList.indexOf(tag(agent.name, COMMIT)) == NONE) &&
                                    (tempStatus.notMineAgentList.indexOf(tag(agent.name, NOT_MINE)) == NONE)) {
                                        String temp =
(String)explanations.get(getCommunity(agent.name.toLowerCase() .trim())) ;
                                        if (question.indexOf(temp) < 0)
                                            question = question + temp + OPTION_SEPAPATOR;
                                }
                            }
                            if (question.length() == 0) {
                                agents = knownAgents.elements() ;
                                for (index = 1; agents.hasMoreElements() ; index++) {
                                    agent = (Agent)agents.nextElement() ;
                                    if    ((!agent.name.equals(sender.name)) &&
                                        (!getCommunity(agent.name.toLowerCase() .trim()) .equals(EMPTY_STRING)) &&
                                        (tempStatus.notMineAgentList.indexOf(tag(agent.name.toLowerCase() .trim(),
COMMIT)) < 0)) {
                                            String temp =
(String)explanations.get(getCommunity(agent.name.toLowerCase() .trim())) ;
                                            if ((temp != null) && ((question.length() == 0) || (question.indexOf(temp) ==
NONE)))
                                                question = question + temp + OPTION_SEPARATOR;
                                    }
                                }
                            }
                            return question + IGNORE_OPTION + OPTION_SEPARATOR;
        }
        public synchronized booleen sendThemAll(Agent sender, AgentStatus tempStatus) {
```

APPENDIX I
Sample Agent Class Prototype
Copyright © 1998 by Babak Hodjat
and Dejima Corporation

```
                        int index;
                        boolean result = false;
                        Agent agent;
                        Enumeration agents = knownAgents.elements() ;
                        String question = EMPTY_STRING;
                        if (!onFocuses)
                                return false;
                        for (index = 1; agents.hasMoreElements() ; index++) {
                                agent = (Agent)agents.nextElement() ;
                                if    ((!agent.name.equals(sender.name)) &&
                                      (!getCommunity(agent.name.toLowerCase() .trim()) .equals(EMPTY_STRING)) &&
                                      (((tempStatus.notMineAgentList.indexOf(tag(agent.name, IT_IS_MINE)) > NONE) &&
                                      (priorityMatches(tempStatus, agent.name, IT_IS_MINE))) ||
                                      ((tempStatus.notMineAgentList.indexOf(tag(agent.name, MAYBE_MINE)) > NONE) &&
                                      (priorityMatches(tempStatus, agent.name, MAYBE_MINE))) ||
                                      (tempStatus.notMineAgentList.indexOf(agent.name) == NONE))) {
                                          sendMessage(agent, THIS_IS_YOURS, msg.content, msg.inReplyTo + tag(name,
THIS_IS_YOURS), msg.replyWith, msg.language) ;
                                          result = true;
                                }
                        }
                        return result;
                }
                public synchronized String tweekPriority(int priority) {
                        return Integer.toString(priority) ;
                }
                public synchronized boolean onlyOne() {
                        return false;
                }
                public synchronized boolean onFocus (String AgentsWhoKnow) {
//* This should be selective.
                        if (AgentsWhoKnow.equals(EMPTY_STRING))
                                return false;
                        Agent agent;
                        Enumeration agents = knownAgents.elements() ;
                        String question = EMPTY_STRING;
                        String delim = IT_IS_MINE;
                        resultingFocus = tempStatus.maxLanguage;
                        int index;
                        boolean IDidit = false;
                        for (index = 1; agents.hasMoreElements() ; indx++) {
                                agent = (Agent)agents.nextElement() ;
                                String theName = agent.name;
                                if (tagged(AgentsWhoKnow, IT_IS_MINE, theName)) {
                                        int index = tempStatus.notMineAgentList.indexOf(tag(theName, delim)) + theName.length() +
delim.length() + 1;
                                        String priort = tempStatus.notMineAgentList.substring(index,
tempStatus.notMineAgentList.indexOf(NUMBER_DELIMITER, index)) ;
                                        int index2 = index + priort.length() ;
                                        String requestFocus = focus(tempStatus, theName, delim) ;
                                        if ((tempStatus.notMineAgentList.indexOf(tag(requestFocus, NUMBER_DELIMITER)) = index2)
&&
                                                (checkFocuses(tempStatus, theName, delim, priort)))
                                                IDidit = true;
                                                resultingFocus = merge(msg.content, resultingFocus, requestFocus) ;
                                }
                        }
                        return IDidit;
                }
                public synchronized void processAnswers (Agent sender, AgentStatus tempStatus, AgentMessage msg) {
                        String tempName;
                        String sendItTo;
                        tempStatus.message.language = msg.language;
                        tempStatus.message.content = msg.content;
                        problems.remove(msg.replyWith) ;
                        problems.put(msg.replyWith, tempStatus) ;
                        Agent agent;
                        Enumeration agents = knownAgents.elements() ;
                        int TheyKnowCount = 0;
                        int TheyKnowCount = 0;
                        int index;
                        AgentsWhoKnow = EMPTY_STRING;
                        AgentsWhoMayKnow = EMPTY_STRING;
                        for (index = 1; agents.hasMoreElements() ; index++) {
```

-continued

APPENDIX I
Sample Agent Class Prototype
Copyright © 1998 by Babak Hodjat
and Dejima Corporation

```
                    agent = (Agent)agents.nextElement() ;
                    if      ((!tagged(tempStatus.message.inReplyTo, IS_THIS_YOURS, agent.name)) &&
                            (!tagged(tempStatus.message.inReplyTo, THIS_IS_YOURS, agent.names)) &&
                            (!tagged(tempStatus.message.inReplyTo, RESTORE, agent.name)) &&
                            (!getCommunity(agent.name.toLowerCase() .trim()) .equals(EMPTY_STRING)))
                            if      ((!tagged(msg.inReplyTo, EMPTY_STRING, COMMIT)) &&
                                    (!tagged(tempStatus.notMineAgentList, NOT_MINE, agent.name)) &&
                                    (!tagged(tempStatus.notMineAgentList, MAYBE_MINE, agent.name)) &&
                                    (!tagged(tempStatus.notMineAgentList, IT_IS_MINE, agent.name)))
                                return;
                            else if ((tagged(tempStatus.notMineAgentList, IT_IS_MINE, agent.name)) &&
                                    (priorityMatches(tempStatus, agent.name, IT_IS_MINE))) {
                                        TheyKnowCount++;
                                        AgentsWhoKnow = AgentsWhoKnow + tag(agent.name, IT_IS_MINE) ;
                            } else if ((!agent.name.equals(tempStatus.message.sender)) &&
                                    (!tagged(tempStatus.notMineAgentList, NOT_MINE, agent.name)) &&
                                    (!tagged(tempStatus.notMineAgentList, IT_IS_MINE, agent.name)) &&
                                    ((!tagged(tempStatus.notMineAgentList, MAYBE_MINE, agent.name)) ||
                                    (priorityMatches(tempStatus, agent.name, MAYBE_MINE)))) {
                                        TheyMayKnowCount++;
                                        AgentsWhoMayKnow = AgentsWhoMayKnow + tag(agent.name, IT_IS_MINE) ;
                                }
                    }
//d("tkc: " + TheyKnowCount + "tmkc: " + TheyMayKnowCount + tempStatus.notMineAgentList + ": " +
tempStatus.message.performative+":"+ msg.inReplyTo +":"+ recency) ;
                    onFocuses = onFocus(AgentsWhoKnow) ;
                    tempStatus.processed = true;
                    if    (((TheyKnowCount == 1) && (TheyMayKnowCount == 0)) ||
                            ((TheyKnowCount == 0) && (TheyMayKnowCount == 1))) {
                        if (TheyKnowCount == 1)
                            sendItTo = AgentsWhoKnow.substring(1, AgentsWhoKnow.length() - 1) ;
                        else
                            sendItTo = AgentsWhoMayKnow.substring(1, AgentsWhoMayKnow.length() - 1) ;
                        if    ((!tagged(msg.inReplyTo, EMPTY_STRING, COMMIT)) &&
                                (tempStatus.message.performative.equals(IS_THIS_YOURS))) { //One agent knows!
                            agent = (Agent)knownAgents.get(tempStatus.message.sender) ;
                            problems.remove(msg.replyWith) ;
                            problems.put(msg.replyWith, tempStatus) ;
                            int tt;
                            if (TheyKnowCount == 1) {
                                String tempFocus = focus(tempStatus, sendItTo, IT_IS_MINE) ;
                                sendMessage(agent, IT_IS_MINE, msg.content, msg.inReplyTo, msg.replyWith,
tweekPriority(tempStatus.maxPriority), tempFocus) ;
                            } else {
                                String tempFocus = focus(tempStatus, sendItTo, MAYBE_MINE) ;
                                sendMessage(agent, MAYBE_MINE, msg.content, msg.inReplyTo, msg.replyWith,
tweekPriority(tempStatus.maxPriority), tempFocus) ;
                            }
                        } else if ((tagged(msg.inReplyTo, EMPTY_STRING, COMMIT)) ||
                                    (tempStatus.message.performative.equals(THIS_IS_YOURS))) {
                                if (tagged(msg.inReplyTo, EMPTY_STRING, COMMIT))
                                    msg.inReplyTo = COMMIT;
                                else
                                    msg.inReplyTo = EMPTY_STRING;
                                sendMessage((Agent)knownAgents.get(sendItTo), THIS_IS_YOURS, msg.content,
msg.inReplyTo + tag(name, THIS_IS_YOURS),
                                                msg.replyWith, msg.language) ;
                                if (recency.containsKey(tempName = sendItTo))
                                    recency.remove(tempName) ;
                                recency.put(tempName, msg.replyWith) ;
                        } else
                            if (tempStatus.message.performative.equals(RESTORE)) {
                                problems.remove(msg. replyWith) ;
                                sendMessage((Agent)knownAgents.get(sendItTo), RESTORE, msg.content, tag(name,
RESTORE), msg.replyWith, msg.language) ;
                            } else
                            if (tempStatus.message.performative.equals (DISSATISFIED)) {
                                problems.remove(msg.replyWith) ;
                                sendMessage((Agent)knownAgents.get(sendItTo), DISSATISFIED, msg.content,
tag(name, DISSATISFIED), msg.replyWith, msg.language) ;
                            }
                    } else if ((TheyKnowCount == 0) ||
                                (TheyKnowCount + TheyMayKnowCount > 1)) {
                            //Everyone has said this problem isn't their's, or there's a conflict
```

-continued

APPENDIX I
Sample Agent Class Prototype
Copyright © 1998 by Babak Hodjat
and Dejima Corporation

```
                                if (tempStatus.message.performative.equals(IS_THIS_YOURS)) {
                                        problems.remove(msg.replyWith) ;
                                        problems.put(msg.replyWith, tempStatus) ;
                                }
                                if (tagged(msg.inReplyTo, EMPTY_STRING, COMMIT)) {
                                        if ((TheyMayKnowCount == 1) && (TheyKnowCount == 0)) {
                                                problems.remove(msg.replyWith) ;
                                                if (tagged(msg.inReplyTo, EMPTY_STRING, COMMIT))
                                                        msg.inReplyTo = COMMIT;
                                                sendMessage((Agent)knownAgents.get(AgentsWhoMayKnow.substring(1,
AgentsWhoMayKnow.length() - 1)) , THIS_IS_YOURS,
                                                                msg.content, msg.inReplyTo + tag(name, THIS_IS_YOURS),
msg.replyWith, msg.language) ;
                                                if (recency.containsKey(tempName = AgentsWhoMayKnow.substring(1,
AgentsWhoMayKnow.length() - 1)))
                                                        recency.remove(tempName) ;
                                                recency.put(tempName, msg. replyWith) ;
                                        } else {
                                                if (!sendThemAll(sender, tempStatus)) {
                                                        tempStatus.message.performative = msg.performative;
                                                        tempStatus.message.inReplyTo = msg.inReplyTo;
                                                        sendMessage((Agent)knownAgents.get(MenuAgent.instance.name),
ASK_OPTIONS_FROM_USER,
                                                                        makeQuestionString(tempStatus, sender), msg.inReplyTo,
msg.replyWith, msg.language) ;
                                                        return;
                                                }
                                        }
                                } else if (!tempStatus.message.performative.equals(THIS_IS_YOURS))
                                        if ((TheyMayKnowCount == 0) && (TheyKnowCount == 0))
                                                sendMessage((Agent)knownAgents.get(tempStatus.message.sender),
NOT_MINE, msg.content, msg.inReplyTo,
                                                                msg.replyWith, msg.language) ;
                                        else if ((TheyKnowCount > 1) && (onFocuses))
                                                sendMessage((Agent)knownAgents.get(tempStatus.message.sender)
/**/
IT_IS_MINE, msg.content, msg.inReplyTo,
                                                                msg.replyWith, resultingFocus,
tempStatus.maxPriority) ;
                                        else
                                                sendMessage((Agent)knownAents.get(tempStatus.message.sender),
MAYBE_MINE, msg.content, msg.inReplyTo,
                                                                msg.replyWith, msg.content, tempStatus.maxPriority) ;
/**/
                                else if   ((tempStatus.message.performative.equals(THIS_IS_YOURS)) &&
                                                ((TheyKnowCount > 1) || (TheyMayKnowCount > 1))) {
                                        if (!sendThemAll(sender, tempStatus)) {
                                                sendMessage((Agent)knownAgents.get(tempStatus.message.sender),
MAYBE_MINE, msg.content, msg.inReplyTo,
                                                                msg.replyWith, msg.content,
tempStatus.maxPriority) ;//*
                                        }
                                } else {(
                                                interpretIt(msg.content, msg.content.toLowerCase().trim(), msg) ;
                                                sendMessage((Agent)knownAgents.get(tempStatus.message.sender),
MAYBE_MINE, msg.content, msg.inReplyTo,
                                                                msg.replyWith, msg.content,
tempStatus.maxPriority) ;//*
                                }
                        }
                }
                public synchronized boolean greaterOrEqualRecency(string r1, String r2) {
                        r1 = (String)recency.get(r1) ;
                        r2 = (String)recency.get(r2) ;
                        if ((r1 != null) && (r2 == null))
                                return true
                        if ((r1 == null) && (r2 == null))
                                return true;
                        if ((r1 == null) && (r2 != null))
                                return false;
                        Integer temp1 = new Integer(r1.substring(r1.indexOf("#") + 1, r1.length())) ;
                        Integer temp2 = new Integer(r2.substring(r1.indexOf("#") + 1, r2.length())) ;
                        if    (temp1.intValue() >= temp2.intValue())
                                return true;
```

APPENDIX I
Sample Agent Class Prototype
Copyright © 1998 by Babak Hodjat
and Dejima Corporation

```
                    else return false;
        }
        public synchronized boolean greaterRecency(String r1, String r2) {
                    r1 = (String)recency.get(r1) ;
                    r2 = (String)recency.get(r2) ;
                    if ((r1 != null) && (r2 == null))
                            return true;
                    if ((r1 == null) && (r2 == null))
                            return false;
                    if ((r1 == null) && (r2 != null))
                            return false;
                    Integer temp1 = new Integer(r1.substring(r1.indexOf("#") + 1, r1.length())) ;
                    Integer temp2 = new Integer(r2.substring(r1.lndexOf("#") + 1, r2.length())) ;
                    if (temp1.intValue () >= temp2.intValue())
                                    return true;
                    else return false;
        }
        public synchronized boolean equalRecency(String r1, String r2) {
                    r1 = (String)recency.get(r1) ;
                    r2 = (String)recency.get(r2) ;
                    if ((r1 != null) && (r2 == null))
                            return false;
                    if ((r1 == null) && (r2 == null))
                            return true;
                    if ((r1 == null) && (r2 != null))
                            return false;
                    Integer temp1 = new Integer(r1.substring(r1.IndexOf("#") + 1, r1.length())) ;
                    Integer temp2 = new Integer(r2.substring(r1.IndexOf("#") + 1, r2.length())) ;
                    if (temp1.intValue() = temp2.intValue())
                                    return true;
                    else return false;
        }
        public synchronized String focus(AgentStatus tempStatus, String theName, String delim) {
                int index = tempStatus.notMineAgentList.indexOf(tag(theName, delim)) + theName.length() +
delim.length() + 1;
                String priot = tempStatus.notMineAgentList.substring(index,
tempStatus.notMineAgentList.indexOf(NUMBER_DELIMITER, index)) ;
                int index2 = index + priot.length() + 1;
                return tempStatus.notMineAgentList.substring(index2,
tempStatus.notMineAgentList.indexOf(NUMBER_DELIMITER, index2)) ;
        }
        public synchronized boolean checkFocuses(AgentStatus tempStatus, String theName, String delim,
String priot) {
                String remainder;
                int index;
                if (delim.equals(IT_IS_MINE))
                        remainder = AgentsWhoKnow;
                else
                        remainder = AgentsWhoMayKnow;
                if ((remainder.length() == 0) && (!theName.equals(tempStatus.maxPriorityAgentName))) {
                        String tempFocus2 = focus(tempStatus, theName, delim)
                        if    ((!theName.equals(tempStatus.maxPriorityAgentName)) &&
                                ((!betterFocus(tempFocus2, tempStatus.maxLanguage)) &&
                                (!equalFocus(tempFocus2, tempStatus.maxLanguage))))
                            return false;
                        return true;
                }
                while (reminder.length() != 0) {
                        String check = remainder.substring(1, (index = remainder.indexOf(IT_IS_MINE, 2))) ;
                        remainder = remainder.substring(index + 1, remainder.length()) ;
                        String tempFocus1 = focus(tempStatus, check, delim) ;
                        String tempFocus2 = focus(tempStatus, theName, delim) ;
                        if   ((!theName.equals(check)) &&
                            (!betterFocus(tempFocus1, tempFocus2)) &&
                            (!equalFocus(tempFocus1, tempFocus2)))
                            return false;
                }
                return true;
        }
        public synchronized boolean priorityMatches(AgentStatus tempStatus, String theName, String
delim) {
                String requestFocus = focus (tempStatus, theName, delim) ;
                int index = tempStatus.notMineAgentList.indexOf(tag(theName, delim)) + theName.length() +
delim.length() + 1;
```

-continued

APPENDIX I
Sample Agent Class Prototype
Copyright © 1998 by Babak Hodjat
and Dejima Corporation

```
            String priot = tempStatus.notMineAgentList.substring(index,
tempStatus.notMineAgentList.indexOf(NUMBER_DELIMITER, index)) ;
            int index2 = index + priot.length() ;
                if ((tempStatus.notMinAgentList.indexOf(tag(requestFocus, NUMBER_DELIMITER)) == index2) &&
                        (checkFocuses(tempStatus, theName, delim, priot)))
                    return true;
                else {
                    if (priot.equals(Integer.toString(tempStatus.maxPriority))) {
                        if ((recency.containsKey(theName)) ||
(recency.containsKey(tempStatus.maxPriorityAgentName))) ||
                                if (greaterOrEqualRecency(theName, tempStatus.maxPriorityAgentName))
                                    return true;
                                else return false;
                            return true;
                    }
                    return false;
                }
        }
    }
    public synchronized void dissatisfaction(AgentMessage msg) {
                    processIt(msg.content) ;
                    Enumeration cat = communities.keys() ;
                    String question = EMPTY_STRING;
                    for (int index = 1; cat.hasMoreElements() ; index++) {
                            String temp = (String)explanations.get((String)cat.nextElement()) ;
                            if (question.IndexOf(temp) < 0)
                                question = question + temp + OPTION_SEPARATOR;
                    }
                    tempStatus = new AgentStatus(new AgentMessage(msg), EMPTY_STRING, new
AgentMessage(lastMessage), 0, EMPTY_STRING,
                                                                                    EMPTY_STRING, EMPTY_STRING) ;
                    if (!problems.containsKey(msg.replyWith))
                            problems.put(asg.replyWith, tempStatus) ;
                    sendMessage((Agent)knownAgents.get(MenuAgent.instance.name), ASK_OPTIONS_FROM_USER,
question + IGNORE_OPTION + OPTION_SEPAPATOR,
                                                                                    msg.inReplyTo, msg.replyWith, msg.language) ;
    }
    public synchronized void receivedAdvertise() {      // Agent wants to tell me it can handle
questions concerning content.
        Agent sender = (Agent)knownAgents.get(msg.sender) ;
                if (!getCommunity(msg.content.toLowerCase() .trim()) .equals(EMPTY_STRING)) {
                        Vector agents = (Vector)comunities.get(msg.content.toLowerCase() .trim()) ;
                        agents.addElement(sender) ;
                } else {
                        Vector agents = new Vector() ;
                        communities.put(msg.content.toLowerCase() .trim(), agents) ;
                        agents.addElement(sender) ;
                }
                learned.put(EXACT_MATCH + msg.content.toLowerCase() .trim(),
msg.content.toLowerCase() .trim()) ;
                if (!msg.ontology.equals(EMPTY_STRING))
                        explanations.put(msg.content.toLowerCase() .trim(), msg.ontology) ;
                else
                        explanations.put(msg.content.toLowerCase() .trim(), msg.content.toLowerCase() .trim()) ;
    }
    public synchronized void receivedUnAdvertise() {      // Agent wants me to remove it from the
community.
        Agent sender = (Agent)knownAgents.get(msg.sender) ;
                if (!getCommunity(msg.content.toLowerCase() .trim()) .equals(EMPTY_STRING)) {
                        Vector agents = (Vector)communities.get(msg.content.toLowerCase() .trim()) ;
                        agents.removeElement(sender) ;
                        if (agents.size() == 0) communities.remove(msg.content.toLowerCase() .trim()) ;
                }
                if (explanations.containsKey(msg.content.toLowerCase() .trim()))
                        explanations.remove(msg.content.toLowerCase() .trim()) ;
    }
    public synchronized void receivedInterpretationRequest() {
        // Agent says this item is mine and I should process and route it or is asking whether this
item is mine or not.
        Agent sender = (Agent)knownAgents.get(msg.sender) ;
        Agent agent;
            if (problems.containsKey(msg.replyWith))
                if (!tagged(msg.inReplyTo, EMPTY_STRING, COMMIT)) {
                        if (tempStatus.processed) {
                            tempStatus.message = new AgentMessage(msg) ;
```

APPENDIX I
Sample Agent Class Prototype
Copyright © 1998 by Babak Hodjat
and Dejima Corporation

```
                        if ((msg.performative.equals(THIS_IS_YOURS)) ||
(msg.performative.equals(DISSATISFIED)))
                                            processedItem = processIt(msg.content) ;//Normally should not change item.
                                    else if (msg.performative.equals(RESTORE))
                                                    processedItem = unProcessIt(msg.content) ;
                                            else processedItem = msg.content.toLowerCase() .trim() ;
                            processAnswers(sender, tempStatus, msg) ;
                            return;
                        } else problems.remove(msg.replyWith) ;
                } else {
                        tempStatus.message.inReplyTo += COMMIT ;
                        if ((msg.performative.equals(THIS_IS_YOURS)) || (msg.performative.equals(DISSATISFIED)))
                                    processedItem = processIt(msg.content) ;//Normally should not change item.
                        else if (msg.performative.equals(RESTORE))
                                            processedItem = unProcessIt(msg.content) ;
                                    else processedItem = msg.content.toLowerCase() .trim() ;
                        processAnswers(sender, tempStatus, msg) ;
                        return;
                }
                AgentMessage tempMsg = new AgentMessage(msg) ;
                perform(msg, sender, OPTIMISE) ;
        }
        public synchronized void receivedNotMine() {     // agent says this item does not belong to it.
        Agent sender = (Agent)knownAgents.get(msg.sender) ;
                if (problems.containsKey(msg.replyWith)) {
                        if (!tagged(tempStatus.interpretations, IT_IS_MINE, sender.name))
                                    tempStatus.notMineAgentList = tempStatus.notMineAgentList + tag (sender. name,
NOT_MINE) ;
                        else {
                                int temp = tempStatus.interpretations.IndexOf(tag(sender.name, IT_IS_MINE)) ;
                                String requestFocus = temepStatus.interpretations.substring(temp + sender.name.length() +
2 * IT_IS_MINE.length(), tempStatus.interpretations.indexOf(NUMBER_DELIMITER, temp)) ;
                                insertOutcome(IT_IS_MINE, priority, requestFocus) ;
                        }
                        processAnswers(sender, tempStatus, msg) ;
                } else System.out.println("WARNING! [" + name + "]: A Not-Mine! received from " +
sender.name + " for an unknown problem: " +
                                                                                    msg.content + ":" + msg.replyWith) ;
        }
        public synchronized boolean betterFocus(String newFocus, String oldFocus) {
                return ((newFocus.length() < oldFocus.length()) &&
                        ((newFocus.equals(EMPTY_STRIHG)) || (oldFocus.indexOf(newFocus) > NONE))
                        ) ;
        }
        public synchronized boolean equalFocus(String newFocus, String oldFocus) {
                return ((!newFocus.equals(oldFocus)) &&
                        ((newFocus.IndexOf(oldFocus) == NONE) && (oldFocus.IndexOf(newFocus) = NONE))
                        ) ;
        }
        public synchronized void cleanList(String theName) {
        int index = tempStatus.notMineAgentList.IndexOf(tag(theName, IT_IS_MINE)) ;
        if (index == NONE)
                index = tempStatus.notMineAgentList.indxOf(tag(theName, MAYBE_MINE)) ;
        int ind2 = 1 + tempStatus.notMineAgentList.indexOf(NUMBER_DELIMITER,
tempStatus.notMineAgentList.indexOf(NUMBER_DELIMITER, index) + NUMBER_DELIMITER.length()) ;
//d("WAS!" + tempStatus.notMineAgentList) ;
        tempStatus.notMineAgentList = tempStatus.notMineAgentList.substring(0, index) +
                                                                            tempStatus.notMineAgentList.substring(ind2,
tempStatus.notMineAgentList.length()) ;
        tempStatus.notMineAgentList = tempStatus.notMineAgentList +
                                                                            tag(theName, NOT_MINE) ;
//d("BECAME!" + tempStatus.notMineAgentList) ;
        }
        public synchronized void insertOutcome(String tempPerformative, int mp, String requestFocus) {
        Agent sender = (Agent)knownAgents.get(msg.sender) ;
                        if   ((tempStatus.maxPriority < mp) ||
                                ((tempStatus.maxPriority == mp) &&
                                ((greaterRecency(sender.name, tempStatus.maxPriorityAgentName)) ||
                                ((tempStatus.maxPriority == mp) && (equalRecency(sender.name,
tempStatus.maxPriorityAgentName)) && (requestFocus.equals(tempStatus.maxLanguage))) ||
                                ((betterFocus(requestFocus, tempStatus.maxLanguage)) &&
                                (tempStatus.notMineAgentList.indexOf(tag(requestFocus, NUMBER_DELIMITER)) = NONE)))) ||
                                ((onlyOne() == false) &&
                                (betterFocus(requestFocus, tempStatus.maxLanguage))
```

-continued

APPENDIX I
Sample Agent Class Prototype
Copyright © 1998 by Babak Hodjat
and Dejima Corporation

```
                                )) {
                                        if      ((tempStatus.maxPriority >= mp) && (onlyOne() == false) &&
                                                (!((tempStatus.maxPriority == mp) &&
                                                ((greaterRecency(sender.name, tempStatus.maxPriorityAgentName)) ||
                                                ((tempStatus.maxPriority == mp) && (equalRecency(sender.name,
tempStatus.maxPriorityAgentName)) && (requestFocus.equals(tempStatus.maxLanguage)))
                                                ))) &&
                                                (betterFocus(requestFocus, tempStatus.maxLanguage)))
                                                cleanList(tempStatus.maxPriorityAgentName) ;
                                                tempStatus.notMineAgentList =         tempStatus.notMineAgentList +
                                                                                      tag(sender.name, tempPerfomative) +
                                                                                      mp + NUMBER_DELIMITER + requestFocus +
NUMBER_DELIMITER;
                                                tempStatus.maxPriority = mp;
                                                tempStatus.maxLanguage = requestFocus;
                                                tempStatus.maxPriorityAgentName = sender.name;
                                } else tempStatus.notMineAgentList =   tempStatus.notMineAgentList +
                                                                       tag(sender.name, NOT_MINE) ;
                }
                public synchronized String merge(String source, String s1, String s2) {
                        String tempResult = EMPTY_STRING;
//d("WAS:" +s1 +":"+ s2) ;
                        if (!source.equals(EMPTY_STRING)) {
                                int i = 0;
                                while   ((i < s1.length()) && (i < s2.length()) &&
                                        (s1.charAt(i) == source.charAt(i)) &&
                                        (s2.charAt(i) == source.charAt(i)))
                                        i++;
                                tempResult += source.substring(0, i) ;
                                i = source.length() - 1;
                                int i1 = s1.length() - 1;
                                int i2 = s2.length() - 1;
                                while   ((i1 > 0) && (i2 > 0) &&
                                        (s1.charAt(i1) == source.charAt(i)) &&
                                        (s2.charAt(i2) == source.charAt(i))) {
                                        i--; i1--; i2--;
                                }
                                tempResult += source.substring(i + 1, source.length()) ;
                        }
//d("BECAME:" + tempResult) ;
                        return tempResult;
                }
                public synchronized void receivedMine() {       // agent says this item may belong to it or agent
says this item does belong to it.
                        Agent sender = (Agent)knownAgents.get(msg.sender) ;
                        int temp;
                        String requestFocus;
                                if (problems.containsKey(msg.replyWith)) {
                                        if      ((!tagged(tempStatus.notMineAgentList, IT_IS_MINE, msg.sender)) &&
                                                (!tagged(tempStatus.notMineAgentList, MAYBE_MINE, msg.sender))) {
                                                int mp = Integer.valueOf(msg.ontology).intValue() ;
                                                String tempPerformative;
                                                if (!tagged(tempStatus.interpretations, IT_IS_MINE, sender.name)) {
                                                        requestFocus = msg.lanquage;
                                                        if (msg.performative.equals(MAYBE_MINE)) tempPerformative = MAYBE_MINE;
                                                        else tempPerformative = IT_IS_MINE;
                                                } else {
                                                        tempPerformative = IT_IS_MINE;
                                                        mp = priority;
                                                        temp = tempStatus.interpretations.indexOf(tag(sender.name, IT_IS_MINE)) ;
                                                        requestFocus = tempStatus.interpretations.substring(temp + sender.name.length() + 2
* IT_IS_MINE.length(), tempStatus.interpretations.indexOf(NUMBER_DELIMITER, temp)) ;
                                                        if (!requestFocus.equals(msg.language))
                                                                if ((temp = requestFocus.indexOf(msg.language)) > NONE)
                                                                        requestFocus = requestFocus.substring(0, temp) + requestFocus.substring(temp +
msg.language.length(), requestFocus.length()) ;
                                                                else if ((temp = msg.language.indexOf(requestFocus)) > NONE)
                                                                        requestFocus = msg.language.substring(0, temp) +
msg.language.substring(temp + requestFocus.length(), msg.language.length()) ;
                                                                else if (!requestFocus.equals(msg.language))
                                                                        requestFocus = merge(msg.content, requestFocus, msg.language) ;
                                                }
                                                insertOutcome(tempPerformative, mp, requestFocus) ;
                                                processAnswers(sender, tempStatus, msg) ;
```

APPENDIX I
Sample Agent Class Prototype
Copyright © 1998 by Babak Hodjat
and Dejima Corporation

```
                } else sendMessage((Agent)knownAgents.get(tempStatus.message.sender), MAYBE_MINE,
msg.content, msg.inReplyTo,
                                                msg.replyWith, msg.language, tempStatus.maxPriority) ;
                } else System.out.println("WARNING [" + name + "]: A Maybe-Mine! or It-is-Mine! received
from " + sender.name + " for an unknown problem. " +
                                                                msg.content + ":" + msg.replyWith) ;
        }
        public synchronized void receivedLearn() {     // agent says I should learn (or unify the effect
of these two requests)
                int index;
                Agent sender = (Agent)knownAgents.get(msg.sender) ;
                        if (!problems.containsKey(msg.replyWith))
                                tempStatus = new AgentStatus(new AgentMessage(msg) , EMPTY_STRING, new
AgentMessage(lastMessage), 0, EMPTY_STRING, EMPTY_STRING,
                                                                                        EMPTY_STRING) ;
                        String item = msg.content;
                        String processedItem = item.toLowerCase() .trim()
                        Interpretation interpretation = interpretIt(item, processedItem, msg) ;
                        String whichAgent = toWhom(item, processedItem, interpretation.result) ;
                        learn(tempStatus, interpretation.result, whichAgent) ;
                            Enumeration agents = knownAgents.elements() ;
                            Agent tempAgent;
                            for (index = 1; agents.hasMoreElements() ; index++) {
                                tempAgent = (Agent)agents.nextElement() ;
                                sendMessage( tempAgent, UN_LEARN, processedItem, EMPTY_STRING, msg.replyWith,
msg.language) ;
                            }
                        problems.remove(msg.replyWith) ; //remove registered problem.
                }
        public synchronized void receivedUnLearn() {     // agent says I should forget what I've learned
about a certain request.
                int index;
                Agent sender = (Agent)knownAgents.get(msg.sender) ;
                        if (learned.containsKey(EXACT_MATCH + msg.content.toLowerCase() .trim())) {
                                String item = msg.content.toLowercase() .trims() ;
                                Interpretation interpretation;
                                while ((interpretation = interpretIt(items, item, msg)) != null) {
                                        Vector agents = (Vector)communities.get(interpretation.result) ;
                                        int num = agents.size() ;
                                        for (index = 0; index < num; index++)
                                                if (sender == (Agent)agents.elementAt(index)) {
                                                        unlearn(item) ;
                                                        return;
                                                }
                                        item = interpretation.remainderRequest;
                                }
                        }
                }
        public synchronized void receivedDissatisfied() (     // agent says a conflict has occured on a
certain request.
                        String item = msg.content ;
                        String processedItem = item.toLowerCase() .trims() ;
                        // If I don't have any communities under me I should disregard command
                        if ((communities.size() == 0) && (interpretIt(item, processedItem, msg) == null))
                                return;
                        dissatisfaction(msg) ;
                        return;
                }
        public synchronized void receivedForgetProblem() {     //agent says I should disregard a certain
problem.
                        problems.remove(msg.replyWith) ; //remove reqistered problem.
                }
                public synchronized void receivedUserResponse() {
                Agent sender = (Agent) knownAgents.get(msg.sender) ;
                Agent agent;
                        if (problems.containsKey(msg.replyWith)) {
                                tempStatus = new AgentStatus((AgentStatus)problems.get(msg.replyWith)) ;
                                if (!msg.content.equals(IGNORE_OPTION)) {
                                        String userResponse = unexplain(msg.content) ;
                                        Interpretation interpretation;
                                        if (!knownAgents.containsKey(userResponse))
                                                if ((interpretation = interpretIt(userResponse, UserResponse.toLowerCase() .trim(),
msg)) != null)
                                                        userResponse = interpretation.result;
```

APPENDIX I
Sample Agent Class Prototype
Copyright © 1998 by Babak Hodjat
and Dejima Corporation

```java
                        else
                            System.out.println("WARNING! [" + name + "]: Wrong user input: " + msg.content) ;
                    learn(tempStatus, userResponse, EMPTY_STRING) ;
                    for (Enumeration agents = knownAgents.elements() ; agents.hasMoreElements() ; ) {
                            agent = (Agent)agents.nextElement() ;
                            sendMessage( agent, UN_LEARN, tempStatus.messsage.content, EMPTY_STRING,
                                                    tempStatus.message.replyWith, EMPTY_STRING) ;
                    }
                    perform(tempStatus.message, sender, !OPTIMISE) ;
                }
            }
        }
    }
    public synchronized void route (AgentMessage msg) {
        if (problems.containsKey(msg.replyWith))
            tempStatus = new AgentStatus((AgentStatus)problems.get(msg.replyWith)) ;
        processOtherMessages(msg) ;
        if (msg.performative.equals(ADVERTISE)) {
                receivedAdvertise() ;
                return;
        } else
        if   (msg.performative.equals(UN_ADVERTISE)) {
                receivedUnAdvertise() ;
                return;
        } else
        if   (((msg.performative.equals(THIS_IS_YOURS)) ||
                (msg.performative.equals(RESTORE)) ||
                (msg.performative.equals(COMMIT)) ||
                (msg.performative.equals(IS_THIS_YOURS))) &&
                (!tagged(msg.inReplyTo, THIS_IS_YOURS, name)) && // Deadlock prevention
                (!tagged(msg.inReplyTo, RESTORE, name)) &&
                (!tagged(msg.inReplyTo, IS_THIS_YOURS, name))) {
            receivedInterpretationRequest() ;
            return;
        } else
        if (msg.performative.equals(NOT_MINE)) {
                receivedNotMine() ;
                return;
        } else
        if   ((msg.performative.equals(MAYBE_MINE)) ||
                (msg.performative.equals(IT_IS_MINE))) {
                receivedMine() ;
                return;
        } else
        if (msg.performative.equals(LEARN)) {
                receivedLearn() ;
                return;
        } else
        if (msg.performative.equals(UN_LEARN)) {
                receivedUnLearn() ;
                return;
        } else
        if ((msg.performative.equals(DISSATISFIED)) &&
                (!tagged(msg.inReplyTo, DISSATISFIED, name)) &&
                (!problems.containsKey(msg.replyWith))) {
                msg.inReplyTo += tag(name, DISSATISFIED) ;
                receivedDissatisfied() ;
                return;
        } else
        if (msg.performative.equals(FORGET_PROBLEM)) {
                if (problems.containsKey(msg.replyWith) &&
                        (tempStatus.message.content.equals(msg.content)))
                    receivedForgetProblem() ;
                return;
        } else
        if (msg.performative.equals(USER_RESPONSE)) {
                receivedUserResponse() ;
                return;
        }
    }
}
//************************
//Title:     AAOSA3
package AAOSA3;
public interface AAOSAConstants {
```

APPENDIX I
Sample Agent Class Prototype
Copyright © 1998 by Babak Hodjat
and Dejima Corporation

```
//Standard AAOSA Performatives
    static final String REGISTER = "}";
    static final String ADVERTISE = "";
    static final String UN_ADVERTISE = "@";
    static final String THIS_IS_YOURS = "=";
    static final String IS_THIS_YOURS = "?";
    static final String COMMIT = "!";
    static final String DISSATISPIED = "%";
    static final String RESTORE = "<";
    static final String IT_IS_MINE = "+";
    static final String MAYBE_MINE = "#";
    static finsl String NOT_MINE = "-";
    static final String LEARN = "&";
    static final String UN_LEARN = "~";
    static final String FORGET_PROBLEM = ":";
    static final String USER_RESPONSE = ">";
    statin final String ASK_OPTIONS_FROM_USER = "^";
    static final String ASK_NUMBER_FROM_USER = "";
    //Agent specfic performatives:
    static final String EXECUTE = "'ex'";
    static final String MORE = "'mo'";
    static final String LESS = "'le'";
    static final String JUMP = "'ju'";
    static final String ON = "'on'";
    static final String OFF = "'off'";
    static final String RESTORE_JUMP = "'re'";
    static final String STOP = "'[]'";
    static final String FORWARD = "'>>'";
    static final String REWIND = "'<<'";
    static final String PAUSE = "'||'";
    static final String UNPAUSE = "'(('";
    static final String PLAY = "'=>'";
    statio final String RECORD = "'<>'";
    static final String START_TIME_DATE = "'st'";
    static final String TIME_DATE = "'td'";
    static final String CLEAR_TEXT = "'ct'";
    static final String REMOVE_WINDOW = "'rw'";
    static final String ADD_WINDOW = "'aw'";
    //internal performatives
    static final String EXACT_MATCH = "=";
    //Menu Constants
    static final String IGNORE_OPTION = "Ignore it";
    //Handy Constants
    static final int SLEEP_DURATION = 100; // In miliseconds
    static final int MAX_NUMBER_IN_REQUEST = 9999;
    static final String EMPTY_STRING = "";
    static final String NUMBER_DELIMITER = ";";
    static final String OPTION_SEPARATOR = "||";
    static final int NONE = -1;
    static final boolean OPTIMISE = true;
}
```

APPENDIX II
Sample Text Input Agent
Copyright © 1998 by Babak Hodjat
and Dejima Corporation

```
package AAOSA3;
import java.awt.event.*;
import java.awt.*;
public class TextInputAgent extends AAOSAAgent{
    static final String MY_NAME = "TextInput";
    static TextInputAgent instance = null; //singleton
    public TextField textField1; //passed on by caller!
    boolean CommitIt = false;
    boolean NotSatisfied = false;
    long PollCount = 1;
    long PauseCount = 10; //1 second
    long RequestID = 1;
```

-continued

APPENDIX II
Sample Text Input Agent
Copyright © 1998 by Babak Hodjat
and Dejima Corporation

```
    String prevCommand = EMPTY_STRING;
    String lastCommand = EMPTY_STRING;
    //in Singleton design pattern, used to get single instance
    static public TextInputAgent Instance () {
            if (instance == null) {
                instance = new TextInputAgent(MY_NAME);
            }
            return instance;
    }
    public static synchronized void register(AgentEvent e) {
            if (instance == null) instance = new TextInputAgent() ;
            if
(!instance.knownAgents.containsKey(((Agent)e.getSource()).getName()
)) {
instance.knownAgents.put(((Agent)e.getSource()).getName(),
e.getSource());
                ((Agent)e.getSource()).addAgentEventListener(instance);
                instance.addAgentEventListener((Agent)e.getSource());
            } else System.out.println("Agent " + instance.name + " did
not register " + ((Agent)e.getSource()).getName());
    }
    public TextInputAgent() { name = MY_NAME;}
    public TextInputAgent(String Name) {Super(Name) ;}
    public synchronized void initializations() {
            msg = new AgentMessage(REGISTER, name , null , null, null,
null) ;
            AgentEvent e = new AgentEvent(this, msg) ;
            InputAgent.instance.register(e) ;    // register agent with
InputAgent
            TVActuator.instance.register(e) ;
            textField1.setText(EMPTY_STRING) ;
            ProgramAddAgent.instance.register(e) ;
            MenuAgent.instance.register(e) ;
            super.initializations() ;
    }
    public synchronized void processOtherMessages(AgentMessage msg) {
            if (msg.performative.equals(CLEAR_TEXT)) {
                    textField1.setText(EMPTY_STRING) ;
                    prevCommand = EMPTY_STRING;
                    CommitIt = false;
                    NotSatisfied = false;
                    RequestID++;
            }
    }
    public synchronized void receivedMine() {    // agent says this
item may belong to it or agent says this item does belong to it.
        CommitIt = false;
        NotSatisfied = false;
        RequestID++;
    }
    void textField1_keyReleased(KeyEvent e) {
            PollCount = 1;
            if ((!textField1.getText().equals(EMPTY_STRING)) &&
(((e.getKeyCode() == e.VK_ENTER) || // User wants job done "now!"
            (textField1.getText() .toLowerCase() .trim() .indexOf("do
it") > NONE) ||
            (textField1.getText() .toLowerCase() .trim() .indexOf("come
on") >NONE) ||
            (textField1.getText() .toLowerCase() .trim() .indexOf("hurry
up") > NONE))))    //User expressing dissatisfaction
                CommitIt = true;
        else if (e.getKeyCode() == e.VK_ESCAPE)    //User expressing
dissatisfaction
                NotSatisfied = true;
    }
    public synchronized void polling() {
            if ((!textField1.getText() .equals(prevCommand)) &&
(!textField1.getText() .trim() .equals(EMPTY_STRING)) &&
                    ((PollCount++ % PauseCount) == 0)   ) {//send it
                    if
(textField1.getText() .toLowerCase() .trim() .indexOf("undo") > NONE)
                            sendMessage(
(Agent)knownAgents.get(InputAgent.instance.name), RESTORE,
lastCommand, tag(name, RESTORE), "#" + (RequestID - 1),
```

APPENDIX II
Sample Text Input Agent
Copyright © 1998 by Babak Hodjat
and Dejima Corporation

```
EMPTY_STRING);
                else if
((textField1.getText() .toLowerCase() .trim() .indexOf("again") >
NONE) ||
(textField1.getText() .toLowerCase() .trim() .indexOf("one more time") >
NONE) ||
(textField1.getText() .toLowerCase() .trim(). indexOf("once more") >
NONE))
                        sendMessage(
(Agent)knownAgents.get(InputAgent.instance.name), THIS_IS_YOURS,
lastCommand, tag(name, THIS_IS_YOURS), "#" + (RequestID - 1),
EMPTY_STRING);
                else if
(textField1.getText() .toLowerCase() .trim() .indexOf("sync") > NONE) {
                        Test.TVVCR.sync();
                        Test.TVVCR.execute("V",
Test.volumeLevel.intValue()) ;
                        if (Test.soundStatus == false)
                            Test.TVVCR.execute("V0", -1);
                        Test.TVVCR.execute("CL",
Test.colorLevel.intValue());
                        Test.TVVCR.execute("CT",
Test.volumeLevel.intValue());
                        Test.TVVCR.execute("B",
Test.brightnessLevel.intValue());
                        Test.TVVCR.execute("C",
Test.channelNumber.intValue());
                        textField1.setText(EMPTY_STRING);
                        prevCommand = EMPTY_STRING;
                        CommitIt = false;
                        NotSatisfied = false;
                        RequestID++;
                } else {
                    prevCommand = textField1.getText();
                    lastCommand = prevCommand;
                sendMessage (
(Agent)knownAgents.get(InputAgent.instance.name), THIS_IS_YOURS,
prevCommand, tag(name, THIS_IS_YOURS), "#" + RequestID,
EMPTY_STRING) ;
                }
            } else
            if (CommitIt) {
                if (!textField1.getText() .equals(prevCommand)) //if
not sent before
                sendMessage(
(Agent)knownAgents.get(InputAgent.instance.name), THIS_IS_YOURS,
textField1.getText(), tag(name, THIS_IS_YOURS), "#" + RequestID,
EMPTY_STRING) ;
                CommitIt = false;
                prevCommand = textField1.getText() ;
                lastCommand = prevCommand;
                sendMessage(
(Agent)knownAgents.get(InputAgent.instance.name), COMMIT,
prevCommand, tag(name, COMMIT), "#" + (RequestID - 1),
EMPTY_STRING) ;
            } else
            if (NotSatisfied) {
                NotSatisfied = false;
                textField1.setText(lastCommand) ;
                textField1.selectAll() ;
                prevCommand = lastCommand;
                textField1.validate() ;
                sendMessage(
(Agent)knownAgents.get(InputAgent.instance.name), RESTORE,
lastCommand, tag(name, RESTORE), "#" + (RequestID - 1),
EMPTY_STRING) ;
                sendMessage(
(Agent)knowAgents.get(InputAgent.instance.name), DISSATISFIED,
lastCommand, tag(name, DISSATISFIED), "#" + RequestID,
EMPTY_STRING) ;
            }
        }
}
```

APPENDIX III
Sample Input Regulator Agent
Copyright © 1998 by Babak Hodjat
and Dejima Corporation

```
package AAOSA3;
public class InputAgent extends AAOSAAgent{
    static final String MY_NAME = "Input1";
    static final int MY_PRIORITY = 100;
    static final String MY_COMMUNITY = "Input";
    static InputAgent instance = null; //singleton
    static public InputAgent Instance() {
            if (instance == null)
                    instance = new InputAgent(MY_NAME);
            }
            return instance;
    }
    public static synchronized void register(AgentEvent e) {
            if (instance == null) instance = new InputAgent() ;
            if
(!instance.knownAgents.containsKey(((Agent)e.getSource()) .getName()
)) {
instance.knownAgents.put(((Agent)e.getSource()) .getName(),
e.getSource());
                    ((Agent)e.getsource()) .addAgentEventListener(instance);
                    instance.addAgentEventListener((Agent)e.getSource());
            } else System.out.println("Agent " + instance.name + " did
not register " + ((Agent)e.getsource()) .getName());
    }
    public InputAgent() { name = MY_NAME; priority = MY_PRIORITY;}
    public InputAgent(String Name) {super(Name, MY_PRIORITY);}
    public synchronized boolean onlyOne() {
        return true;
    }
        public synchronized void initializations() {
            AgentMessage msg = new AgentMessage(REGISTER, name, null,
    null, null , null) ;
            AgentEvent e = new AgentEvent(this, msg) ;
            ActionAgent.instance.register(e) ;
            TextInputAgent.instance.register(e) ;
            MenuAgent.instance.register(e) ;
            ProgramAgent.instance.register(e) ;
//              learned.put(EXACT_MATCH + "do",
ActionAgent.instance.MY_COMMUNITY.toLowerCase() .trim()); //default
interpretations
            learned.put("programming",
ProgramAgent.instance.MY_COMMUNITY.toLowerCase() .trim());
            learned.put("schedule",
ProgramAgent.instance.MY_COMMUNITY.toLowerCase() .trim());
            learned.put("remember",
ProgramAgent.instance.MY_COMMUNITY.toLowerCase() .trim());
            super.initializations();
    }
}
```

APPENDIX IV
Sample TV Actuator Agent
Copyright © 1998 by Babak Hodjat
and Dejima Corporation

```
package AAOSA3;
import java.awt.*;
import jclass.bwt.*;
import borland.jbcl.layout.*;
public class TVActuator extends AAOSAAgent{
    static TVActuator instance = null ;
    static final String MY_NAME = "TVActuator";
    Panel TV = new Panel() ;
    JCSlider Volume = new JCSlider() ;
    JCSlider Lights = new JCSlider() ;
    JCSlider Brightness = new JCSlider() ;
    JCSlider Contrast = new JCSlider() ;
    JCSlider Color = new JCSlider() ;
    JCCheckbox SoundOff = new JCCheckbox() ;
```

APPENDIX IV
Sample TV Actuator Agent
Copyright © 1998 by Babak Hodjat
and Dejima Corporation

```
    JCCheckbox LightsOn = new JCCheckbox() ;
    JCCheckbox PowerOn = new JCCheckbox() ;
    XYLayout xYLayout = new XYLayout() ;
    Label tvchannelLabel = new Label() ;
    Label vcrFunctionLabel = new Label() ;
    Label vcrPauseLabel = new Label() ;
    Label vcrChannelLabel = new Label() ;
    Label dvdFunctionLabel = new Label() ;
    Label dvdPauseLabel = new Label() ;
    Label windowChannelLabel = new Label() ;
    jclass.bwt.JCSeparator jCSeparator1 = new
jclass.bwt.JCSeparator() ;
    jclass.bwt.JCSeparator jCSeparator2 = new
jclass.bwt.JCSeparator() ;
    jclass.bwt.JCSeparator jCSeparator3 = new
jclass.bwt.JCSeparator() ;
    jclass.bwt.JCSeparator jCSeparator4 = new
jclass.bwt.JCSeparator() ;
    jclass.bwt.JCSeparator jCSeparator5 = new
jclass.bwt.JCSeparator() ;
    //in Singleton design pattern, used to get single instance
    static public TVActuator Instance() {
                if (instance == null) {
                    instance = new TVActuator(MY_NAME) ;
                }
                return instance;
    }
    public static synchronized void register(AgentEvent e) {
                if (instance == null) instance = new TVActuator() ;
                if
(!instance.knownAgents.containsKey(((Agent)e.getsource()) .getName()
)) {
instance.knownAgents.put(((Agent)e.getSource()) .getName(),
e.getsource()) ;
                    ((Agent)e.getsource()) .addAgentEventListener(instance) ;
                    instance.addAgentEventListener((Agent)e.getSource()) ;
                } else System.out.println("Agent " + instance.name + " did
not register " + ((Agent)e.getSource()) .getName()) ;
    }
    public TVActuator() { name = MY NAME;
        try {
            jbInit() ;
        }
        catch (Exception e) {
            e.printStackTrace() ;
        }}
    public TVActuator(String Name) { super(Name) ;
        try {
            jbInit() ;
        }
        catch (Exception e) {
            e.printStackTrace() ;
        } }
    public synchronized void initializations() {
                AgentMessage msg = new AgentMessage(REGISTER, name , null,
null, null, null) ;
                AgentEvent e = new AgentEvent(this, msg) ;
                VideoAgent.instance.register(e) ;
                DVDAgent.instance.register(e) ;
                WindowAgent.instance.register(e) ;
                PowerAgent.instance.register(e) ;
                SoundAgent.instance.register(e) ;
                LightsAgent.instance.register(e) ;
                BrightnessAgent.instance.register(e) ;
                ContrastAgent.instance.register(e) ;
                ColorAgent.instance.register(e) ;
                ChannelAgent.instance.register(e) ;
                TextInputAgent.instance.register(e) ;
                super.initializations() ;
    }
    public synchronized void startupDefaults () {
        displayEverything() ;
    }
    public synchronized void displayEverything() {
```

-continued

APPENDIX IV
Sample TV Actuator Agent
Copyright © 1998 by Babak Hodjat
and Dejima Corporation

```
                        if (Test.soundStatus == true)
                                SoundOff.setState(0) ;
                        else
                                SoundOff.setState(1) ;
                        if (Test.powerStatus == true)
                                PowerOn.setState(1) ;
                        else
                                PowerOn.setState(0) ;
                        Volume.setValue(Test.volumeLevel.intValue()) ;
                        if (Test.lightsStatus == true)
                                LightsOn.setState(1) ;
                        else
                                LightsOn.setState(0) ;
                        Lights.setValue(Test.lightsLevel.intValue()) ;
                        Color.setValue(Test.colorLevel.intValue()) ;
                        Contrast.setValue(Test.contrastLevel.intValue()) ;
                        Brightness.setValue(Test.brightnessLevel.intValue()) ;
                        tvchannelLabel.setText("Channel " +
Test.channelNumber.toString()) ;
                                vcrFunctionLabel.setText("VCR: STOP            ") ;
                        if (Test.recordStatus == true)
                                vcrFunctionLabel.setText("VCR: RECORD    ") ;
                        if (Test.playStatus == true)
                                vcrFunctionLabel.setText("VCR: PLAY      ") ;
                        if (Test.rewindStatus == true)
                                vcrFunctionLabel.setText("VCR: REWIND    ") ;
                        if (Test.forwardStatus == true)
                                vcrFunctionLabel.setText("VCR: FORWARD ") ;
                        if (Test.pauseStatus == true)
                                vcrPauseLabel.setText("PAUSE") ;
                                else
                                vcrPauseLabel.setText("       ") ;
                        vcrChannelLabel.setText ("Channel " +
Test.videoChannelNumber.toString()) ;
                        if (Test.windowStatus == true)
                                windowChannelLabel.setText("PIP:    ON    "/* +
Test.windowChannelNumber.toString()*/) ;
                        else
                                windowChannelLabel.setText("PIP:    OFF   ") ;
                        dvdFunctionLabel.setText("DVD: STOP      ") ;
                        if (Test.dvdplayStatus == true)
                                dvdFunctionLabel.setText("DVD: PLAY    ") ;
                        if (Test.dvdrewindStatus == true)
                                dvdFunctionLabel.setText("DVD: REWIND ") ;
                        if (Test.dvdforwardStatus == true)
                                dvdFunctionLabel.setText("DVD: FORWARD") ;
                        if (Test.dvdpauseStatus == true)
                                dvdPauseLabel.setText ("PAUSE") ;
                                else
                                dvdPauseLabel.setText("       ") ;
    }
    public synchronized void processOtherMessages(AgentMessage msg) {
                if (msg.performative.equals(EXECUTE)) {
                        if (msg.content.indexOf(PowerAgent.instance.name) == 0)
{//POWER
                                if (msg.content.indexOf(ON) ==
PowerAgent.instance.name.length()) {//ON
                                        System.out.println("===>Executing: POWER ON†n") ;
                                        Test.TVVCR.execute("PW", -1) ;
                                } else
                                if (msg.content.indexOf(OFF) ==
PowerAgent.instance.name.length()) {//OFF
                                        System.out.println("===>Executing: POWER OFF\n") ;
                                        Test.TVVCR.execute("PWO", -1) ;
                                } else d("WARNING! Wrong message content: " +
msg.content) ;
                        } else
                        if (msg.content.indexOf(goundAgent.instance.name) == 0)
{//SOUND
                                if (msg.content.indexOf(ON) ==
SoundAgent.instance.name.length()) {//ON
                                        System.out.println("===>Executing: SOUND ON\n") ;
                                        Test.TVVCR.execute("V0", -1) ;
                                } else
```

-continued

APPENDIX IV
Sample TV Actuator Agent
Copyright © 1998 by Babak Hodjat
and Dejima Corporation

```
                    if (msg.content.indexOf(OFF) ==
SoundAgent.instance.name.length()) {//OFF
                          System.out.println("===)Executing: SOUND OFF\n") ;
                          Test.TVVCR.execute("V0", -1) ;
                    } else
                    if (msg.content.indexOf(MORE) ==
SoundAgent.instance.name.length()) {//MORE
                          System.out.println("===)Executing: SOUND MORE\n") ;
                          Test.TVVCR.execute("V", 1) ;
                    } else
                    if (msg.content.indexOf(LESS) ==
SoundAgent.instance.name.length()) {//LESS
                          System.out.println("===>Executing: SOUND LESS\n") ;
                          Test.TVVCR.execute("V", -1) ;
                    } else
                    if (msg.content.indexOf(JUMP) ==
SoundAgent.instance.name.length()) {//JUMP
                          Integer jumpValue = new
Integer(msg.content.substring(msg.content.indexOf(JUMP) +
JUMP.length(), msg.content.length())) ;
                          System.out.println("===>Executing: SOUND JUMP TO " +
jumpValue.toString() + "\n") ;
                          Test.TVVCR.execute("V", Test.volumeLevel.intValue() -
Test.previousVolumeLevel.intValue()) ;
                    } else d("WARNING! Wrong message content: " +
msg.content) ;
              } else
              if (msg.content.indexOf(LightsAgent.instance.name) ==
0) {//LIGHTS
                    if (msg.content.indexOf(ON) ==
LightsAgent.instance.name.length()) {//ON
                          System.out.println("===>Executing: LIGHTS ON\n") ;
                    } else
                    if (msg.content.indexOf(OFF) ==
LightsAgent.instance.name.length()) {//OFF
                          System.out.println ("===>Executing: LIGHTS OFF\n") ;
                    } else
                    if (msg.content.indexOf(MORE) ==
LightsAgent.instance.name.length()) {//MORE
                          System.out.println("===>Executing: LIGHTS MORE\n") ;
                    } else
                    if (msg.content.indexOf(LESS) ==
LightsAgent.instance.name.length()) {//LESS
                          System.out.println("===>Executing: LIGHTS LESS\n") ;
                    } else
                    if (msg.content.indexOf(JUMP) ==
LightsAgent.instance.name.length()) {//JUMP
                          Integer jumpValue = new
Integer(msg.content.substring(msg.content.indexOf(Jump) +
JUMP.length(), msg.content.length())) ;
                          System.out.println("===>Executing: LIGHTS JUMP TO" +
jumpValue.toString() + "\n") ;
                    } else d("WARNING! Wrong message content: " +
msg.content) ;
              } else
              if (msg.content.indexOf(ColorAgent.instance.name) == 0)
{//COLOR
                    if (msg.content.indexOf(MORE) ==
ColorAgent.instance.name.length()) {//MORE
                          System.out.println("===>Executing: COLOR MORE\n") ;
                          Test.TVVCR.execute("CL", 1) ;
                    } else
                    if (msg.content.indexOf(LESS) ==
ColorAgent.instance.name.length()) {//LESS
                          System.out.println("===>Executing: COLOR LESS\n") ;
                          Test.TVVCR.execute("CL", -1) ;
                    } else
                    if (msg.content.indexOf(JUMP) ==
ColorAgent.instance.name.length()) {//JUMP
                          Integer jumpValue = new
Integer(msg.content.substring(msg.content.indexOf(JUMP) +
JUMP.length(), msg.content.length())) ;
                          System.out.println("===>Executing: COLOR JUMP TO " +
jumpValue.toString() + "\n") ;
```

APPENDIX IV
Sample TV Actuator Agent
Copyright © 1998 by Babak Hodjat
and Dejima Corporation

```
                    Test.TVVCR.execute ("CL",
Test.colorLevel.intValue()-Test.previousColorLevel.intValue ()) ;
                    } else d("WARNING! Wrong message content: " +
msg.content) ;
                } else
                if (msg.content.indexOf(ContrastAgent.instance.name) ==
0) {//CONTRAST
                    if (msg.content.indexOf(MORE) ==
ContrastAgent.instance.name.length()) {//MORE
                        System.out.println("===>Executing: CONTRAST
MORE\n") ;
                        Test.TVVCR.execute("CT", -1) ;
                    } else
                    if (msg.content.indexOf(LESS) ==
ContrastAgent.instance.name.length()) {//LESS
                        System.out.println("===>Executing: CONTRAST
LESS\n") ;
                        Test.TVVCR.execute("CT", -1) ;
                    } else
                    if (msg.content.indexOf(JUMP) ==
ContrastAgent.instance.name.length()) {//JUMP
                        Integer jumpValue = new
Integer (msg.content.substring(msg.content.indexOf(JUMP) +
JUMP.length(), msg.content.length())) ;
                        System.out.println("===>Executing: CONTRAST JUMP TO" +
jumpValue.toString() + "\n") ;
                        Test.TVVCR.execute ("CT",
Test.volumeLevel.intValue() - Test.previousVolumeLevel.intValue()) ;
                    } else d("WARNING! Wrong message content: " +
msg.content) ;
                } else
                if (msg.content.indexOf(BrightnessAgent.instance.name) ==
0) {//BRIGHTNESS
                    if (msg.content.indexOf(MORE) ==
BrightnessAgent.instance.name.length()) {//MORE
                        System.out.println ("===>Executing: BRIGHTNESS
MORE\n") ;
                        Test.TVVCR.execute("B", 1) ;
                    } else
                    if (msg.content.indexOf(LESS) ==
BrightnessAgent.instance.name.length()) {//LESS
                        System.out.println("===>Executing: BRIGHTNESS
LESS\n") ;
                        Test.TVVCR.execute("B", -1) ;
                    } else
                    if (msg.content.indexOf(JUMP) ==
BrightnessAgent.instance.name.length()) {//JUMP
                        Integer jumpValue = new
Integer(msg.content.substring(msg.content.indexOf(JUMP) +
JUMP.length(), msg.content.length())) ;
                        System.out.println("===>Executing: BRIGHTNESS JUMP
TO " + jumpValue.toString() + "\n") ;
                        Test.TVVCR.execute("B",
Test.brightnessLevel.intValue() -
Test.previousBrightnessLevel.intValue()) ;
                    } else d("WARNING! Wrong message content: " +
msg.content) ;
                } else
                if (msg.content.indexOf(TelevisionAgent.instance.name) ==
0) {//TELEVISION
                    if (msg.content.indexOf(MORE) ==
TelevisionAgent.instance.name.length()) {//MORE
                        System.out.println("===>Executing: TELEVISION
CHANNEL NEXT\n") ;
                        Test.TVVCR.execute ("C",
Test.channelNumber.intValue()) ;
                    } else
                    if (msg.content.indexOf(LESS) ==
                        TelevisionAgent.instance.name.length()) {//LESS
                        System.out.println("===>Executing: TELEVISION
CHANNEL PREVIOUS\n") ;
                        Test.TVVCR.execute ("C",
Test.channelNumber.intValue()) ;
                    } else
```

-continued

APPENDIX IV
Sample TV Actuator Agent
Copyright © 1998 by Babak Hodjat
and Dejima Corporation

```
                        if (msg.content.indexOf(JUMP) ==
TelevisionAgent.instance.name.length()) {//JUMP
                                Integer jumpValue = new
Integer(msg.content.substring(msg.content.indexOf(JUMP) +
JUMP.length(), msg.content.length())) ;
                                System.out.println("===>Executing: TELEVISION
CHANNEL JUMP TO " + jumpValue.toString() + "\n") ;
                                Test.TVVCR.execute ("C",
Test.channelNumber.intValue()) ;
                        } else d("WARNING! Wrong message content: " +
msg.content) ;
                    } else
                    if (msg.content.indexOf(VideoAgent.instance.name) == 0)
{//VIDEO
                        if (msg.content.indexOf(RECORD) ==
VideoAgent.instance.name.length()) {//RECORD
                                System.out.println("===>Executing: VIDEO
RECORD\n") ;
                                Test.TVVCR.execute("R", -1) ;
                        } else
                        if (msg.content.indexOf(PLAY) ==
VideoAgent.instance.name.length()) {//PLAY
                                System.out.println("===>Executing: VIDEO PLAY\n") ;
                                Test.TVVCR.execute("PL", -1) ;
                        } else
                        if (msg.content.indexOf(PAUSE) ==
VideoAgent.instance.name.length()) {//PAUSE
                                System.out.println("===>Executing: VIDEO PAUSE\n") ;
                                Test.TVVCR.execute("P", -1) ;
                        } else
                        if (msg.content.indexOf(UNPAUSE) ==
VideoAgent.instance.name.length()) {//UNPAUSE
                                System.out.println("===>Executing: VIDEO
UNPAUSE\n") ;
                                vcrPauseLabel.setText("            ") ;
                                Test.TVVCR.execute("S", -1) ;
                        } else
                        if (msg.content.indexOf(STOP) ==
VideoAgent.instance.name.length()) {//STOP
                                System.out.println("===>Executing: VIDEO STOP\n") ;
                                vcrFunctionLabel.setText("VCR: STOP    ") ;
                                Test.TVVCR.execute("S", -1) ;
                                Test.TVVCR.execute("C",
Test.channelNumber.intValue()) ;
                        } else
                        if (msg.content.indexOf(REWIND) ==
VideoAgent.instance.name.length()) {//REWIND
                                System.out.println("===>Executing: VIDEO
REWIND\n")
                                Test.TVVCR.execute("RW", -1) ;
                        } else
                        if (msg.content.indexOf(FORWARD) ==
VideoAgent.instance.name.length()) {//FORWARD
                                System.out.println("===>Executing: VIDEO
FORWARD\n") ;
                                Test.TVVCR.execute("F", -1) ;
                        } else
                        if (msg.content.indexOf(MORE) ==
VideoAgent.instance.name.length()) {//MORE
                                System.out.println("===>Executing: VIDEO CHANNEL
NEXT\n")
                                Test.TVVCR.execute ("CV",
Test.videoChannelNumber.intValue()) ;
                        } else
                        if (msg.content.indexOf(LESS) ==
VideoAgent.instance.name.length()) {//LESS
                                System.out.println("===>Executing: VIDEO CHANNEL
PREVIOUS\n") ;
                                Test.TVVCR.execute("CV",
Test.videoChannelNumber.intValue()) ;
                        } else
                        if (msg.content.indexOf(JUMP) ==
VideoAgent.instance.name.length()) {//JUMP
                                Integer jumpValue = new
```

-continued

APPENDIX IV
Sample TV Actuator Agent
Copyright © 1998 by Babak Hodjat
and Dejima Corporation

```
Integer(msg.content.substring(msg.content.indexOf(JUMP) +
JUMP.length(), msg.content.length())) ;
                        System.out.println("===>Executing: VIDEO CHANNEL
JUMP TO " + jumpValue.toString() + "\n") ;
                        Test.TVVCR.execute ("CV",
Test.videoChannelNumber.intValue()) ;
                } else d("WARNING! Wrong message content: " +
msg.content) ;
            } else
            if (msg.content.indexOf(WindowAgent.instance.name) ==
0) {//WINDOW
                if (msg.content.indexOf(ADD_WINDOW) ==
WindowAgent.instance.name.length()) {//ADD
                        System.out.println("===>Executing: WINDOW ADD\n") ;
                        Test.TVVCR.pipDisplay(true) ;
                } else
                if (msg.content.indexOf(REMOVE_WINDOW) ==
WindowAgent.instance.name.length()) {//REMOVE
                        System.out.println("===>Executing: WINDOW
REMOVE\n") ;
                        Test.TVVCR.pipDisplay(false) ;
                } else
                    if (msg.content.indexOf(MORE) ==
WindowAgent.instance.name.length()) {//MORE
                        System.out.println("===>Executing: WINDOW CHANNEL
NEXT\n") ;
                        Test.TVVCR.pipChannelNext() ;
                } else
                    if (msg.content.indexOf(LESS) ==
WindowAgent.instance.name.length()) {//LESS
                        System.out.println("===>Executing: WINDOW CHANNEL
PREVIOUS\n") ;
                        Test.TVVCR.pipChannelPrev() ;
                } else
                    if (msg.content.indexOf(JUMP) ==
WindowAgent.instance.name.length()) {//JUMP
                        Integer jumpValue = new
Integer(msg.content.substring(msg.content.indexOf(JUMP) +
JUMP.length(), msg.content.length())) ;
                        System.out.println("===>Executing: WINDOW CHANNEL
JUMP TO " + jumpValue.toString() + "\n") ;
                Test.TVVCR.pipSetChannel(Test.windowChannelNumber.intvalue() -Test.
previousWindowChannelNumber.intValue ()) ;
                } else d("WARNING! Wrong message content: " +
msg.content) ;
            } else
            if (msg.content.indexOf(DVDAgent.instance.name) == 0)
{//DVD
                if (msg.content.indexOf(PLAY) ==
DVDAgent.instance.name.length()) {//PLAY
                        System.out.println("===>Executing: DVD PLAY\n") ;
                        Test.TVVCR.selectDvd() ;
                        Test.TVVCR.dvdPlay() ;
                } else
                    if (msg.content.indexOf(PAUSE) ==
DVDAgent.instance.name.length()) {//PAUSE
                        System.out.println("===>Executing: DVD PAUSE\n") ;
                        Test.TVVCR.dvdPause() ;
                } else
                    if (msg.content.indexOf(UNPAUSE) ==
DVDAgent.instance.name.length()) {//UNPAUSE
                        System.out.println("===>Executing: DVD UNPAUSE\n") ;
                        dvdPauseLabel.setText("            ") ;
                        Test.TVVCR.dvdPlay() ;
                } else
                    if (msg.content.indexOf(STOP) ==
DVDAgent.instance.name.length()) {//STOP
                        System.out.println("===>Executing: DVD STOP\n") ;
                        Test.TVVCR.dvdStop() ;
                        Test.TVVCR.dvdStop() ;
                        Test.TVVCR.execute("C",
Test.channelNumber.intValue()) ;
                } else
                    if (msg.content.indexOf(REWIND) ==
```

-continued

APPENDIX IV
Sample TV Actuator Agent
Copyright © 1998 by Babak Hodjat
and Dejima Corporation

```
DVDAgent.instance.name.length()) {//REWIND
                              System.out.println("===>Executing: DVD REWIND\n") ;
                              Test.TVVCR.dvdScanReverse() ;
                       } else
                       if (msg.content.indexOf(FORWARD) ==
DVDAgent.instance.name.length()) {//FORWARD
                              System.out.println("===>Executing: DVD FORWARD\n") ;
                              Test.TVVCR.dvdScanForward() ;
                       } else
                              d("WARNING! Wrong message content: " +
msg.content) ;
                       }
                       displayEverything() ;
                       sendMessage(
(Agent)knownAgents.get(TextInputAgent.instance.name), CLEAR_TEXT,
EMPTY_STRING, EMPTY_STRING, msg.replyWith, EMPTY_STRING) ;
                }
        }
    public synchronized void jbInit() throws Exception{
        TV.setEnabled(false) ;
        TV.setForeground(SystemColor.inactiveCaption) ;
        TV.setLocale(new java.util.Locale("en", "GB", EMPTY_STRING)) ;
        TV.setLocation(new Point(50, 50)) ;
        TV.setSize(new Dimension(537, 300)) ;
        TV.setLayout(xYLayout1) ;
        Volume.setEnabled(false) ;
        Volume.setMaximum(Test.volumeMax) ;
        Volume.setMinimum(0) ;
        Volume.setMaximumLabelString(Integer.toString(Test.volumeMax)) ;
        Volume.setMinimumLabelString("Volume          0") ;
        Volume.setValue(0) ;
        Lights.setEnabled(false) ;
        Lights.setMaximum(Test.lightsMax) ;
        Lights.setMinimum(0) ;
        Lights.setMaximumLabelString(Integer.toString(Test.lightsMax)) ;
        Lights.setMinimumLabelString("Lights          0") ;
        Lights.setValue(0) ;
        Color.setEnabled(false) ;
        Color.setMaximum(Test.colorMax) ;
        Color.setMinimum(0) ;
        Color.setMaximumLabelString(Integer.toString(Test.colorMax)) ;
        Color.setMinimumLabelString("Color           0") ;
        Color.setValue(0) ;
        Contrast.setEnabled(false) ;
        Contrast.setMaximum(Test.contrastMax) ;
        Contrast.setMinimum(0) ;
Contrast.setMaximumLabelString(Integer.toString(Test.contrastMax)) ;
        Contrast.setMinimumLabelString("Contrast            0") ;
        Contrast.setValue(0) ;
        Brightness.setEnabled(false) ;
        Brightness.setMaximum(Test.brightnessMax) ;
        Brightness.setMinimum(0) ;
Brightness.setMaximumLabelString(Integer.toString(Test.brightnessMax)) ;
        Brightness.setMinimumLabelString("Brightness          0") ;
        Brightness.setValue(0) ;
        SoundOff.setState(0) ;
        LightsOn.setState (1) ;
        SoundOff.setLabel("mute") ;
        LightsOn.setLabel("lights on") ;
        PowerOn.setState(0) ;
        PowerOn.setLabel("power") ;
        tvchannelLabel.setEnabled(false) ;
        tvchannelLabel.setFont(new Font("Dialog", 0, 20)) ;
        tvchannelLabel.setText("Channel            ") ;
        vcrFunctionLabel.setEnabled(false) ;
        vcrFunctionLabel.setFont(new Font ("Dialog", 0, 20)) ;
        vcrFunctionLabel.setText("VCR:           ") ;
        dvdFunctionLabel.setEnabled(false) ;
        dvdFunctionLabel.setFont(new Font("Dialog", 0, 20)) ;
        dvdFunctionLabel.setText("DVD:           ") ;
        vcrPauseLabel.setEnabled(false) ;
        vcrPauseLabel.setFont(new Font ("Dialog", 0, 20)) ;
        vcrPauseLabel.setText("           ") ;
        dvdPauseLabel.setEnabled(false) ;
```

-continued

APPENDIX IV
Sample TV Actuator Agent
Copyright © 1998 by Babak Hodjat
and Dejima Corporation

```
            dvdPauseLabel.setFont(new Font("Dialog", 0, 20)) ;
            dvdPauseLabel.setText("           ") ;
            vcrChannelLabel.setEnabled(false) ;
            vcrChannelLabel.setFont(new Font("Dialog", 0, 20)) ;
            vcrChannelLabel.setText("Channel          ") ;
            windowChannelLabel.setEnabled(false) ;
            windowChannelLabel.setFont(new Font ("Dialog", 0, 20)) ;
            windowChannelLabel.setText("PIP: NONE    ") ;
            this.setSize(new Dimension(632, 666)) ;
            TV.add(Volume, new XYConstraints(85, 5, -1, -1)) ;
            TV.add(Lights, new XYConstraints(85, 500, -1, -1)) ;
            TV.add(Color, new XYConstraints(85, 55, -1, -1)) ;
            TV.add(Contrast, new XYConstraints(85, 105, -1, -1)) ;
            TV.add(Brightness, new XYConstraints(85, 155, -1, -1)) ;
            TV.add(SoundOff, new XYConstraints(352, 5, -1, -1)) ;
            TV.add(LightsOn, new XYConstraints(352, 500, -1, -1)) ;
            TV.add(PowerOn, new XYConstraints(352, 430, -1, -1)) ;
            TV.add(tvchannelLabel, new XYConstraints(22, 205, -1, -1)) ;
            TV.add(vcrFunctionLabel, new XYConstraints(22, 258, -1, -1)) ;
            TV.add(vcrPauseLabel, new XYConstraints(322, 258, -1, -1)) ;
            TV.add(vcrChannelLabel, new XYConstraints(22, 285, -1, -1)) ;
            TV.add(dvdFunctionLabel, new XYConstraints(22, 330, -1, -1)) ;
            TV.add(dvdPauseLabel, new XYConstraints(322, 330, -1, -1))
            TV.add(windowChannelLabel, new XYConstraints(22, 370, -1, -1)) ;
            TV.add(jCSeparator1, new XYConstraints(26, 250, 352, 11)) ;
            TV.add(jCSeparator2, new XYConstraints(26, 320, 352, 11)) ;
            TV.add(jCSeparator3, new XYConstraints(26, 360, 352, 11)) ;
            TV.add(jCSeparator4, new XYConstraints(26, 400, 352, 11)) ;
            TV.add(jCSeparator5, new XYConstraints(2, 460, 440, 40)) ;
            this.setTitle("Device representation window") ;
            this.setBounds(100, 100, 400, 550) ;
            this.add(TV) ;
            this.pack() ;
            this.toBack() ;
            this.show() ;
        }
}
```

What is claimed is:

1. A computer-implemented method for processing a subject message, by a network of agents including an initiator agent and at least one agent downchain of said initiator agent, each agent in said network having a view of its own domain of responsibility, comprising the steps of said initiator agent:

querying at least one of the agents downchain of said initiator agent in said network whether the queried agent considers said subject message to be in the queried agent's domain of responsibility;

resolving any conflicting responses from said queried agents, which responses meet threshold quality criteria, to identify a prevailing group of at least one of said downchain agents to whom said subject message should be passed; and instructing at least one agent in said prevailing group to handle said subject message.

2. A method according to claim 1, wherein said network of agents is organized as a hyperstructure of agents.

3. A method according to claim 1, wherein said prevailing group of at least one agent is a community of at least one agent.

4. A method according to claim 3, further comprising the steps of said initiator agent:

receiving at least one query response from said queried agents; and discarding as a satisfactory claim, prior to said step of instructing, any of said query responses which claim said subject message but fail said threshold quality criteria.

5. A method according to claim 4, wherein each of said query responses has associated therewith an indication of a priority level of the agent which originated said query response, and wherein said step of discarding comprises the step of discarding as a satisfactory claim, each of said query responses whose associated priority level is below a predetermined threshold.

6. A method according to claim 5, wherein each of said query responses further has associated therewith an indication of confidence with which the agent originating said query response claims said subject message.

7. A method according to claim 1, wherein in said initiator agent considers all responses from said queried agents to meet said threshold quality criteria.

8. A method according to claim 1, wherein said responses identify without contradiction a claiming group of at least one agent which claim said subject message as being in their respective domains of responsibility, and wherein said step of resolving any conflicting responses to identify a prevailing group of at least one agent comprises the step of identifying said claiming group as being said prevailing group.

9. A method according to claim 1, wherein said responses include a plurality of responses in which respective claiming agents each claim said subject message as being in the domain of responsibility of the respective claiming agent, said claims being mutually exclusive, each response in said plurality of responses having a respective quality level associated therewith, wherein said step of resolving any conflicting responses comprises the step of comparing the quality levels of the responses in said plurality of responses.

10. A method according to claim 9, wherein each of said quality levels includes a priority measure of the respective claiming agent and further includes a measure of confidence with which the respective claiming agent claims said subject message.

11. A method according to claim 10, wherein the measure of confidence of a respective claiming agent comprises an indication of whether the respective claiming agent considers that a contradiction exists among further agents downchain of the respective claiming agent.

12. A method according to claim 9, wherein said responses further include a further response which claims said subject message as being in the domain of responsibility of a further agent downchain of said initiator agent, said further response not being mutually exclusive with any of the responses in said plurality of responses.

13. A method according to claim 1, wherein said responses include a plurality of responses in which respective claiming agents each claim said subject message as being in the domain of responsibility of the respective claiming agent, said claims being mutually exclusive, wherein said step of resolving any conflicting responses comprises the step of evaluating how recently each of said claiming agents was instructed by said initiator to handle a prior message.

14. A method according to claim 1, wherein said responses include a plurality of responses in which respective claiming agents each claim said subject message as being in the domain of responsibility of the respective claiming agent, each response in said plurality of responses having a respective quality level associated therewith, said claims being mutually exclusive, and wherein said step of resolving any conflicting responses comprises the steps of:

comparing the quality levels of the responses in said plurality of responses; and evaluating how recently each of said claiming agents was instructed by said initiator to handle a prior message.

15. A method according to claim 1, wherein said step of instructing at least one agent in said prevailing group to handle said subject message comprises the step of instructing said prevailing group to handle said subject message.

16. A method according to claim 1, further comprising the steps of a first one of said queried agents, in response to said query:

determining whether said subject message is within said first agent's domain of responsibility;

and where said subject message is within said first agent's domain of responsibility, returning a response to said initiator agent claiming said subject message.

17. A method according to claim 1, further comprising the steps of a first one of said queried agents, in response to said query:

determining whether said subject message is within said first agent's domain of responsibility;

and where said subject message is not within said first agent's domain of responsibility and said first agent has no further downchain agents, returning a response to said initiator agent disclaiming said subject message.

18. A method according to claim 1, further comprising the steps of a first one of said queried agents, in response to said query:

determining whether said subject message is within said first agent's domain of responsibility;

and where said subject message is not within said first agent's domain of responsibility but said first agent has further agents downchain of said first agent, querying at least one of said further agents whether the further agent considers said subject message to be in the further agent's domain of responsibility.

19. A method according to claim 18, further comprising the steps of said first agent:

receiving at least one further response from said further agents;

evaluating said further responses to determine whether any claim said subject message and also satisfy predetermined quality criteria; and where none of said further responses claim said subject message and also satisfy said predetermined quality criteria, returning a response to said initiator agent disclaiming said subject message as being within said first agent's domain of responsibility.

20. A method according to claim 19, wherein each of said further responses has associated therewith an indication of a priority level of the agent which originated said further response, and wherein said step of evaluating comprises the step of requiring a minimum priority level.

21. A method according to claim 20, wherein each of said further responses further has associated therewith an indication of confidence with which the agent originating said further response claims said subject message.

22. A method according to claim 19, wherein in said step of evaluating said further responses to determine whether any claim said subject message and also satisfy predetermined quality criteria, said first agent considers a given response to satisfy said predetermined quality criteria whenever said first agent has received said given response.

23. A method according to claim 18, further comprising the steps of said first agent:

receiving at least one further response from said further agents;

evaluating said further responses to determine which if any claim said subject message and also satisfy predetermined quality criteria; and where at least one of said further responses claims said subject message and also satisfies said predetermined quality criteria, returning a response to said initiator agent claiming said subject message as being within said first agent's domain of responsibility.

24. A method according to claim 23, wherein one of said further responses which claim said subject message and also satisfies said predetermined quality criteria claims said subject message with a high level of confidence.

25. A method according to claim 23, wherein one of said further responses which claim said subject message and also satisfies said predetermined quality criteria claims said subject message with less than a high level of confidence.

26. A method according to claim 23, wherein none of said further responses which claim said subject message and also satisfies said predetermined quality criteria claims said subject message with more than a medium level of confidence.

27. A method according to claim 1, farther comprising the step of said at least one agent in said prevailing group producing an output of said network in response to receipt of said instruction from said initiator agent.

28. A method according to claim 1, further comprising the step of said at least one agent in said prevailing group, in response to receipt of said instruction from said initiator agent, instructing a predetermined further agent downchain of said first agent to handle said subject message.

29. A method according to claim 1, further comprising the steps of a first one of said queried agents, in response to said query:

querying at least one further agent downchain of said first agent whether the further agent considers said subject message to be in the further agent's domain of responsibility;

receiving a plurality of further conflicting responses from said further agents each satisfying predetermined quality criteria and claiming that said subject message is within the further agent's domain of responsibility; and returning a response to said initiator agent claiming said subject message as being within said first agent's domain of responsibility, further comprising said first agent:

receiving said instruction from said initiator agent;

in response to said instruction, resolving said further conflicting responses to identify a further prevailing group of at least one of said further agents to whom said subject message should be passed; and instructing at least one agent in said further prevailing group to handle said subject message.

30. A method according to claim 29, further comprising the step of said first agent learning that future messages having a predetermined characteristic which matches that of said subject message are within the domain of responsibility of said at least one agent in said further prevailing group.

31. A method according to claim 30, further comprising the step of said first agent instructing at least one of the agents in said network which can instruct said first agent to handle a message, to unlearn any interpretation policy which calls for the second agent to route to said first agent messages having said predetermined characteristic.

\* \* \* \* \*